(12) United States Patent
Zavracky et al.

(10) Patent No.: US 6,476,784 B2
(45) Date of Patent: *Nov. 5, 2002

(54) PORTABLE DISPLAY SYSTEM WITH MEMORY CARD READER

(75) Inventors: Matthew Zavracky, North Attleboro, MA (US); Jeffrey Jacobsen, Hollister, CA (US); Frederick P. Herrmann, Sharon; Wen-Foo Chern, Wayland, both of MA (US); Hiap L. Ong, Taipai (TW); John C. C. Fan, Chestnut Hill, MA (US); Bor-Yeu Tsaur, Lexington, MA (US); Alan Richard, Wrentham, MA (US)

(73) Assignee: Kopin Corporation, Taunton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/004,706

(22) Filed: Jan. 8, 1998

(65) Prior Publication Data

US 2001/0045928 A1 Nov. 29, 2001

Related U.S. Application Data

(63) Continuation-in-part of application No. 08/961,744, filed on Oct. 31, 1997.

(51) Int. Cl.[7] .................................................. G09G 3/36
(52) U.S. Cl. ............................ 345/88; 345/169; 345/87
(58) Field of Search ........................... 345/88, 87, 204, 345/102, 169, 901, 905, 82, 83

(56) References Cited

U.S. PATENT DOCUMENTS

| 4,010,322 A | 3/1977 | Nathanson .................. 358/233 |
| 4,159,417 A | * 6/1979 | Rubincam .................... 235/375 |

(List continued on next page.)

FOREIGN PATENT DOCUMENTS

| EP | 0 720 338 A2 | 7/1996 |
| EP | 0 772 068 A1 | 6/1997 |
| EP | 0 864 917 A1 | 9/1998 |

* cited by examiner

Primary Examiner—Richard Hjerpe
Assistant Examiner—Kimnhung Nguyen
(74) Attorney, Agent, or Firm—Hamilton, Brook, Smith & Reynolds, P.C.

(57) ABSTRACT

An active matrix color sequential liquid crystal display has an active matrix circuit, a counterelectrode panel and an interposed layer of liquid crystal. The active matrix circuit has an array of transistor circuits formed in a first plane. Each transistor circuit is connected to a pixel electrode in an array of pixel electrodes having a small area. The display is housed in a portable display device having a docking port for a memory card used to input video data for the display.

31 Claims, 44 Drawing Sheets

U.S. PATENT DOCUMENTS

| | | | |
|---|---|---|---|
| 4,258,387 A | 3/1981 | Lemelson et al. | 358/85 |
| 4,336,524 A | 6/1982 | Levine | 340/311.1 |
| 4,532,506 A | 7/1985 | Kitazima et al. | 340/784 |
| 4,573,766 A | 3/1986 | Bournay, Jr. et al. | 350/345 |
| 4,630,895 A | 12/1986 | Abdala, Jr. et al. | 350/345 |
| 4,636,866 A | 1/1987 | Hattori | 358/236 |
| 4,695,129 A | 9/1987 | Faessen et al. | 350/96.25 |
| 4,704,740 A | 11/1987 | McKee et al. | 455/348 |
| 4,714,980 A | 12/1987 | Hara | 361/395 |
| 4,814,876 A | 3/1989 | Horio et al. | 358/160 |
| 4,837,817 A | 6/1989 | Maemori | 358/224 |
| 4,856,045 A | 8/1989 | Hoshina | 379/53 |
| 4,856,088 A | 8/1989 | Oliwa et al. | 455/349 |
| 4,873,576 A | 10/1989 | Hattori et al. | 358/224 |
| 4,916,441 A | 4/1990 | Gombrich | 340/712 |
| 4,917,469 A | 4/1990 | Ross | 350/332 |
| 4,928,300 A | 5/1990 | Ogawa et al. | 379/53 |
| 4,934,773 A | 6/1990 | Becker | 350/6.6 |
| 4,959,642 A | 9/1990 | Sharples | 340/716 |
| 4,977,456 A | 12/1990 | Furuya | 358/213.13 |
| 4,985,697 A * | 1/1991 | Boulton | 340/750 |
| 5,003,300 A | 3/1991 | Wells | 340/705 |
| 5,008,658 A | 4/1991 | Russay et al. | 340/784 |
| 5,008,788 A | 4/1991 | Palinkas | 362/231 |
| 5,012,274 A | 4/1991 | Dolgoff | 340/702 |
| 5,023,931 A | 6/1991 | Streck et al. | 455/21 |
| 5,042,918 A | 8/1991 | Suzuki | 359/59 |
| 5,048,077 A | 9/1991 | Wells et al. | 379/96 |
| 5,077,784 A | 12/1991 | Fujita et al. | 379/53 |
| 5,079,627 A | 1/1992 | Filo | 358/85 |
| 5,087,113 A * | 2/1992 | Sakono et al. | 359/59 |
| 5,106,179 A | 4/1992 | Kamaya et al. | 351/158 |
| 5,111,498 A | 5/1992 | Guichard et al. | 379/53 |
| 5,122,880 A | 6/1992 | Nagano | 358/209 |
| 5,132,825 A | 7/1992 | Miyadera | 359/85 |
| 5,138,312 A | 8/1992 | Tsukamoto et al. | 340/825.44 |
| 5,162,828 A | 11/1992 | Furness et al. | 353/122 |
| 5,164,833 A | 11/1992 | Aoki | 358/224 |
| 5,164,980 A | 11/1992 | Bush et al. | 379/53 |
| 5,177,405 A | 1/1993 | Kusuda et al. | 315/169.1 |
| 5,185,712 A | 2/1993 | Sato et al. | 358/224 |
| 5,189,632 A | 2/1993 | Paajanen et al. | 364/705.05 |
| 5,199,104 A * | 3/1993 | Hirayama | 395/145 |
| 5,206,749 A | 4/1993 | Zavracky et al. | 359/59 |
| 5,220,366 A | 6/1993 | King | 354/76 |
| 5,224,198 A | 6/1993 | Jachimowicz et al. | 385/133 |
| 5,256,562 A | 10/1993 | Vu et al. | 437/86 |
| 5,258,325 A | 11/1993 | Spitzer et al. | 437/86 |
| 5,260,625 A | 11/1993 | Holden et al. | 313/486 |
| 5,281,957 A | 1/1994 | Schoolman | 345/8 |
| 5,300,788 A | 4/1994 | Fan et al. | 257/13 |
| 5,300,976 A | 4/1994 | Lim et al. | 354/219 |
| 5,305,244 A | 4/1994 | Newman et al. | 364/708.1 |
| 5,311,206 A | 5/1994 | Nelson | 345/89 |
| 5,317,236 A | 5/1994 | Zavracky et al. | 315/169.3 |
| 5,321,416 A | 6/1994 | Bassett et al. | 345/8 |
| 5,322,989 A | 6/1994 | Long et al. | 235/375 |
| 5,325,429 A | 6/1994 | Kurgan | 379/429 |
| 5,335,276 A | 8/1994 | Thompson et al. | 380/21 |
| 5,337,068 A | 8/1994 | Stewart et al. | 345/88 |
| 5,347,378 A | 9/1994 | Handschy et al. | 359/53 |
| 5,347,400 A | 9/1994 | Hunter | 359/815 |
| 5,362,671 A | 11/1994 | Zavracky et al. | 437/81 |
| 5,371,493 A | 12/1994 | Sharpe et al. | 340/825.34 |
| 5,373,181 A | 12/1994 | Scheiter et al. | 257/415 |
| 5,376,979 A | 12/1994 | Zavracky et al. | 353/122 |
| 5,381,179 A | 1/1995 | Kashimura | 348/376 |
| 5,404,580 A | 4/1995 | Simpson et al. | 455/89 |
| 5,412,396 A | 5/1995 | Nelson | 345/89 |
| 5,416,496 A | 5/1995 | Wood | 345/102 |
| 5,422,656 A | 6/1995 | Allard et al. | 345/173 |
| 5,444,557 A | 8/1995 | Spitzer et al. | 359/59 |
| 5,455,572 A | 10/1995 | Cannon et al. | 340/825.44 |
| 5,469,278 A | 11/1995 | Takahara et al. | 359/51 |
| 5,471,045 A | 11/1995 | Geronimi | 235/492 |
| 5,483,285 A | 1/1996 | Lim et al. | 348/341 |
| 5,485,318 A | 1/1996 | Lebby et al. | 359/811 |
| 5,485,504 A | 1/1996 | Ohnsorge | 379/58 |
| 5,486,708 A | 1/1996 | Takahashi et al. | 257/59 |
| 5,486,946 A | 1/1996 | Jachimowicz et al. | 359/263 |
| 5,493,437 A | 2/1996 | Lebby et al. | 359/152 |
| 5,500,517 A | 3/1996 | Cagliostro | 235/486 |
| 5,506,705 A | 4/1996 | Yamamoto et al. | 359/40 |
| 5,515,424 A | 5/1996 | Kenny | 379/96 |
| 5,528,285 A | 6/1996 | Morikawa et al. | 348/14 |
| 5,528,397 A | 6/1996 | Zavracky et al. | 359/59 |
| 5,539,554 A | 7/1996 | Lebby et al. | 359/83 |
| 5,541,640 A | 7/1996 | Larson | 348/19 |
| 5,544,111 A | 8/1996 | Berthhozat et al. | 365/225.7 |
| 5,548,271 A | 8/1996 | Tsuchiyama et al. | 340/311.1 |
| 5,549,747 A | 8/1996 | Bozler et al. | 117/43 |
| 5,561,538 A | 10/1996 | Kato et al. | 359/40 |
| 5,572,045 A | 11/1996 | Takahashi et al. | 257/59 |
| 5,579,165 A | 11/1996 | Michel et al. | 359/630 |
| 5,584,070 A | 12/1996 | Harris et al. | 455/346 |
| 5,585,948 A | 12/1996 | Petera | 349/143 |
| 5,596,451 A | 1/1997 | Handschy et al. | 359/633 |
| 5,606,342 A | 2/1997 | Shoji et al. | 345/94 |
| 5,608,553 A | 3/1997 | Kim | 349/61 |
| 5,642,129 A | 6/1997 | Zavracky et al. | 345/100 |
| 5,646,432 A | 7/1997 | Iwaki et al. | 257/347 |
| 5,673,059 A | 9/1997 | Zavracky et al. | 345/8 |
| 5,705,424 A | 1/1998 | Zavracky et al. | 437/86 |
| 5,748,160 A | 5/1998 | Shieh et al. | 345/82 |
| 5,815,126 A | 9/1998 | Fan et al. | 345/8 |
| 5,867,795 A * | 2/1999 | Novis et al. | 445/566 |
| 5,926,218 A | 7/1999 | Smith | 348/358 |
| 6,073,034 A | 6/2000 | Jacobsen et al. | 455/566 |
| 6,151,004 A | 11/2000 | Kaneko | 345/88 |
| 6,205,199 B1 | 3/2001 | Polichar et al. | 378/98.8 |

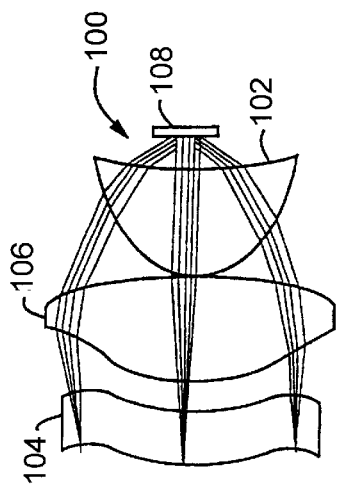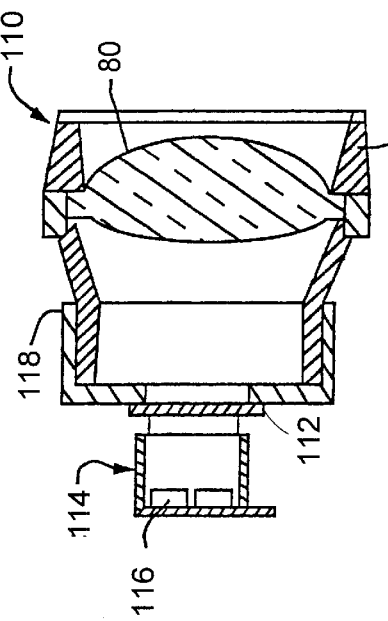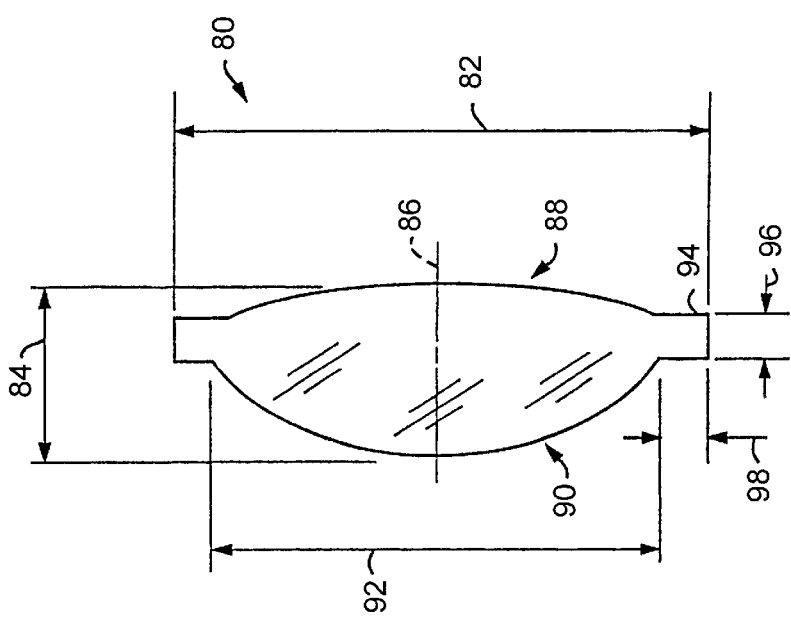

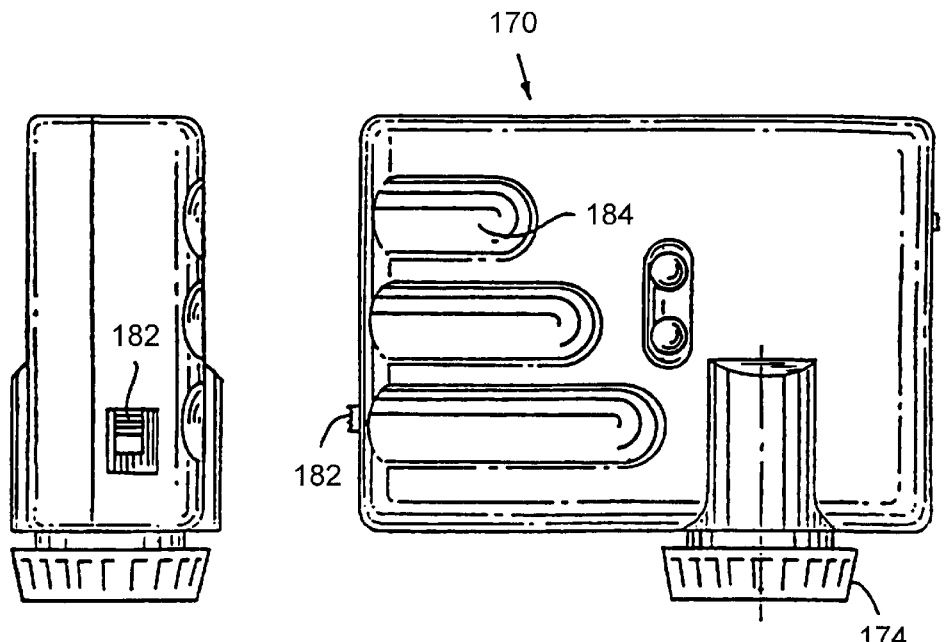
FIG. 21G
FIG. 21F
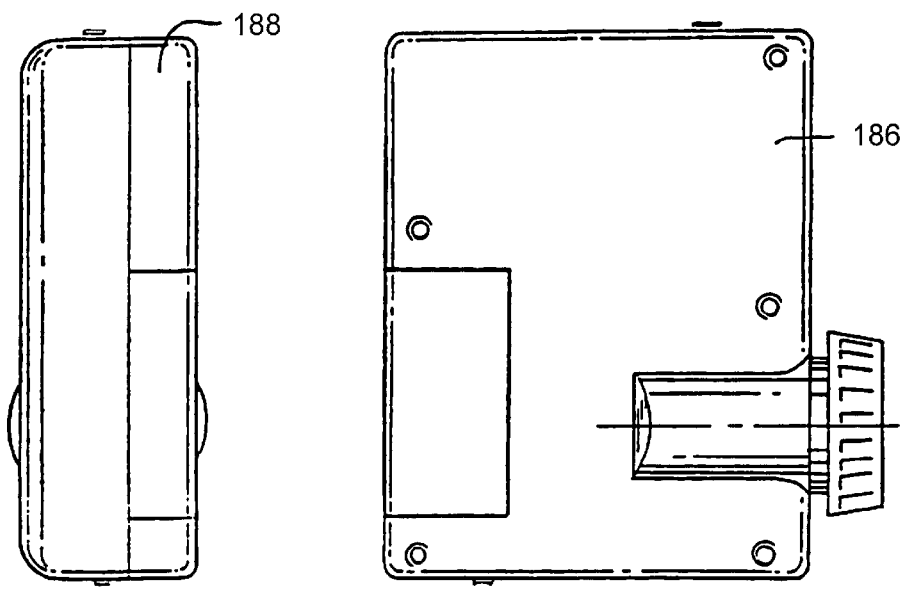
FIG. 21H
FIG. 21I

PORTABLE DISPLAY SYSTEM WITH MEMORY CARD READER

RELATED APPLICATION(S)

This application is a Continuation-in-Part of U.S. application Ser. No. 08/961,744 filed Oct. 31, 1997, the entire contents of which is incorporated herein by reference.

BACKGROUND OF THE INVENTION

Flat-panel displays are being developed which utilize liquid crystals or electroluminescent materials to produce high quality images. These displays are expected to supplant cathode ray tube (CRT) technology and provide a more highly defined television picture or computer monitor image. The most promising route to large scale high quality liquid crystal displays (LCDs), for example, is the active-matrix approach in which thin-film transistors (TFTs) are co-located with LCD pixels. The primary advantage of the active matrix approach using TFTs is the elimination of cross-talk between pixels, and the excellent gray scale that can be attained with TFT-compatible LCDs.

Color liquid crystal flat panel displays can be made in several different ways including with color filters or sequentially flashing lights. Both style displays are found in transmissive or reflective models.

Transmissive color filter liquid crystal flat panel displays generally include five different layers: a white light source, a first polarizing filter that is mounted on one side of a circuit panel on which the TFTs are arrayed to form pixels, a filter plate containing at least three primary colors arranged into pixels, and finally a second polarizing filter. A volume between the circuit panel and the filter plate is filled with a liquid crystal material. This material will allow transmission of light in the material when an electric field is applied across the material between the circuit panel and a ground affixed to the filter plate. Thus, when a particular pixel of the display is turned on by the TFTs, the liquid crystal material rotates polarized light being transmitted through the material so that the light will pass through the second polarizing filter.

In sequential color displays, the display panel is triple scanned, once for each primary color. For example, to produce color frames at 20 Hz, the active matrix must be driven at a frequency of 60 Hz. In order to reduce flicker, it is desirable to drive the active matrix at 180 Hz to produce a 60 Hz color image. At over 60 Hz, visible flicker is reduced.

Owing to the limitations of amorphous silicon, other alternative materials include polycrystalline silicon, or laser recrystallized silicon. These materials are limited as they use silicon that is already on glass, which generally restricts further circuit processing to low temperatures.

Integrated circuits for displays, such as the above referred color sequential display, are becoming more and more complex. For example, the color sequential display is designed for displaying High Definition Television (HDTV) formats requiring a 1280-by-1024 pixel array with a pixel pitch, or the distance between lines connecting adjacent columns or rows of pixel electrodes, being in the range of 15–55 microns, and fabricated on a single five-inch wafer.

SUMMARY OF THE INVENTION

In accordance with the invention, the cost and complexity of high resolution displays are significantly reduced by fabricating multiple integrated displays of reduced size on a single wafer and then dicing the wafer to produce a plurality of display devices.

The displays are then assembled with appropriate magnifying optics to form a portable display system of low cost and reduced size. Included in the optics is a magnification system which compensates for the small image size by magnifying and projecting the image at an appropriate distance for viewing.

In preferred embodiments, an active matrix color sequential liquid crystal display has an active matrix circuit, a counterelectrode panel, and an interposed layer of liquid crystal. The active matrix circuit has an array of transistor circuits formed in a first plane. Each transistor circuit is connected to a pixel electrode in an array of pixel electrodes having an area of 200 mm$^2$ or less and preferably under 100 mm$^2$. The counterelectrode panel extends in a second plane that is parallel to the first plane, such that the counterelectrode panel receives an applied voltage. The liquid crystal layer is interposed in a cavity between the two planes. The cavity has a depth along an axis perpendicular to the first and second planes of less than 3 microns.

In a preferred embodiment, an oxide layer extends between the pixel electrode array and a layer of liquid crystal material. The oxide has a first thickness in a peripheral region around the array of pixel electrodes and a thinner second thickness in a pixel electrode region extending over the array of pixel electrodes. The thick peripheral region (about 0.5 microns in a preferred embodiment) serves to better isolate the driver electrodes integrated into the display circuit. The thinner oxide region (about 0.3 microns) serves to reduce the voltage drop across the oxide during display operations. This serves to increase the applied voltage on the liquid crystal without the need to draw more power from the power source such as a battery.

In a preferred embodiment, the liquid crystal is a superfluoriated material. This material has the desired combination of characteristics that improves color sequential operation. A preferred method of controlling the liquid crystal in the display includes switching the applied voltage to the counterelectrode panel after every subframe.

BRIEF DESCRIPTION OF THE DRAWINGS

The above and other objects and features of the invention will be better understood and appreciated by those skilled in the art in view of the description of the preferred embodiments given below in conjunction with the accompanying drawings, in which:

FIG. 3A is a side view of a lens suitable for magnifying a microdisplay in accordance with the invention;

FIG. 3B is a side view of a multi-element lens providing an increased field of view;

FIG. 3C is a cross-sectional view of a display assembly with a fixed lens;

FIGS. 21A–21K are exterior views of hand-held imaging devices;

FIG. 29Ab illustrates the bottom view of the circuit board of FIG. 29Aa;

FIG. 29Bb illustrates the bottom view of the memory card of FIG. 29Ba; and

DETAILED DESCRIPTION OF THE INVENTION

High Resolution Active Matrix Microdisplay

Figure 1:
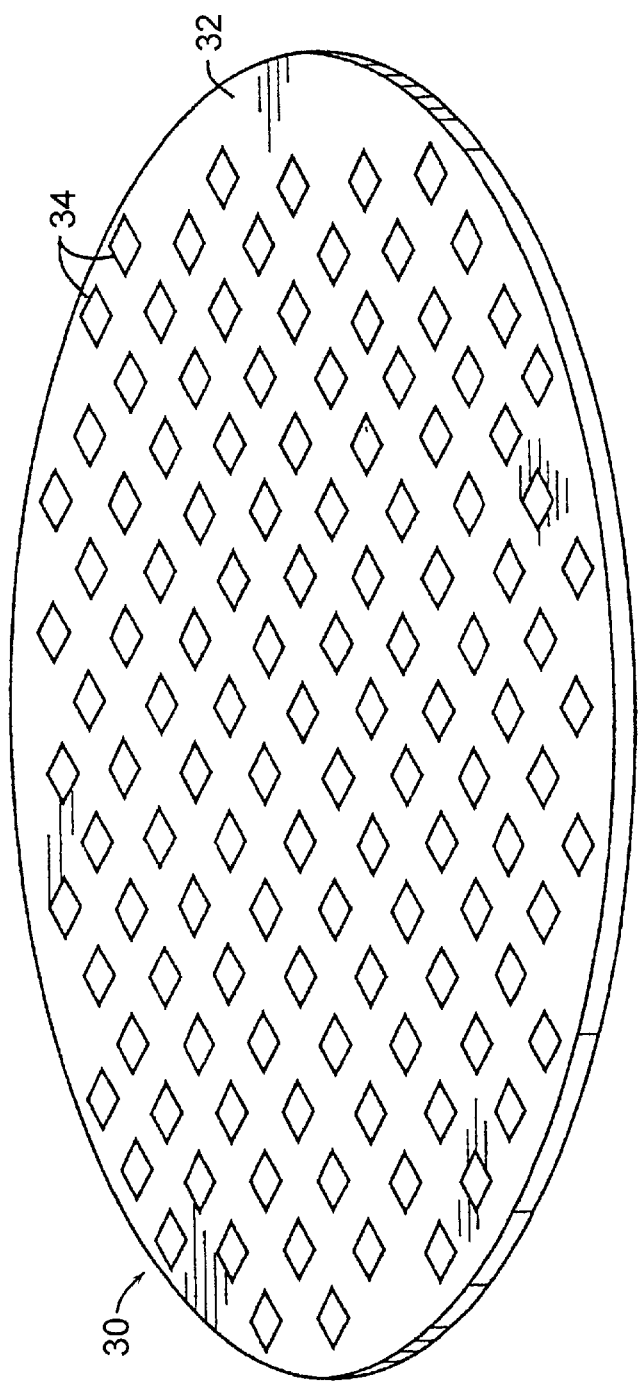
FIG. 1 is a perspective view of a single wafer having a plurality of display devices formed thereon in accordance with the invention.

A preferred embodiment of the invention utilizes a process of making a plurality of flat panel displays 30 in which a large number of active matrix arrays 34 are fabricated on a single wafer 32 as illustrated in connection with FIG. 1.

The number of displays fabricated on a single wafer depends upon the size of the wafer and the size of each display. A preferred embodiment of the invention, for example, uses a high resolution display having an imaging area of the display with a diagonal of 0.24 inches or less. The active display area is 4.8 mm×3.6 mm and has a total display dimension of 11.8 mm×6.8 mm. 120 separate displays can be fabricated on a single five inch wafer.

By fabricating a large number of small high resolution displays on a single wafer, the manufacturing yield can be substantially increased and the cost per display can be substantially reduced.

To obtain monochrome or color sequential resolutions of at least 75,000 pixels (e.g. a 320×240 array) on a 0.25 inch diagonal display, the pixel electrodes are preferably on the order of about 15 microns in width or less. To obtain a resolution of at least 300,000 pixels (e.g. 640×480 array) on a 0.25 inch diagonal display, the pixel electrodes preferably have a width of about 8–10 microns.

Figure 2A:
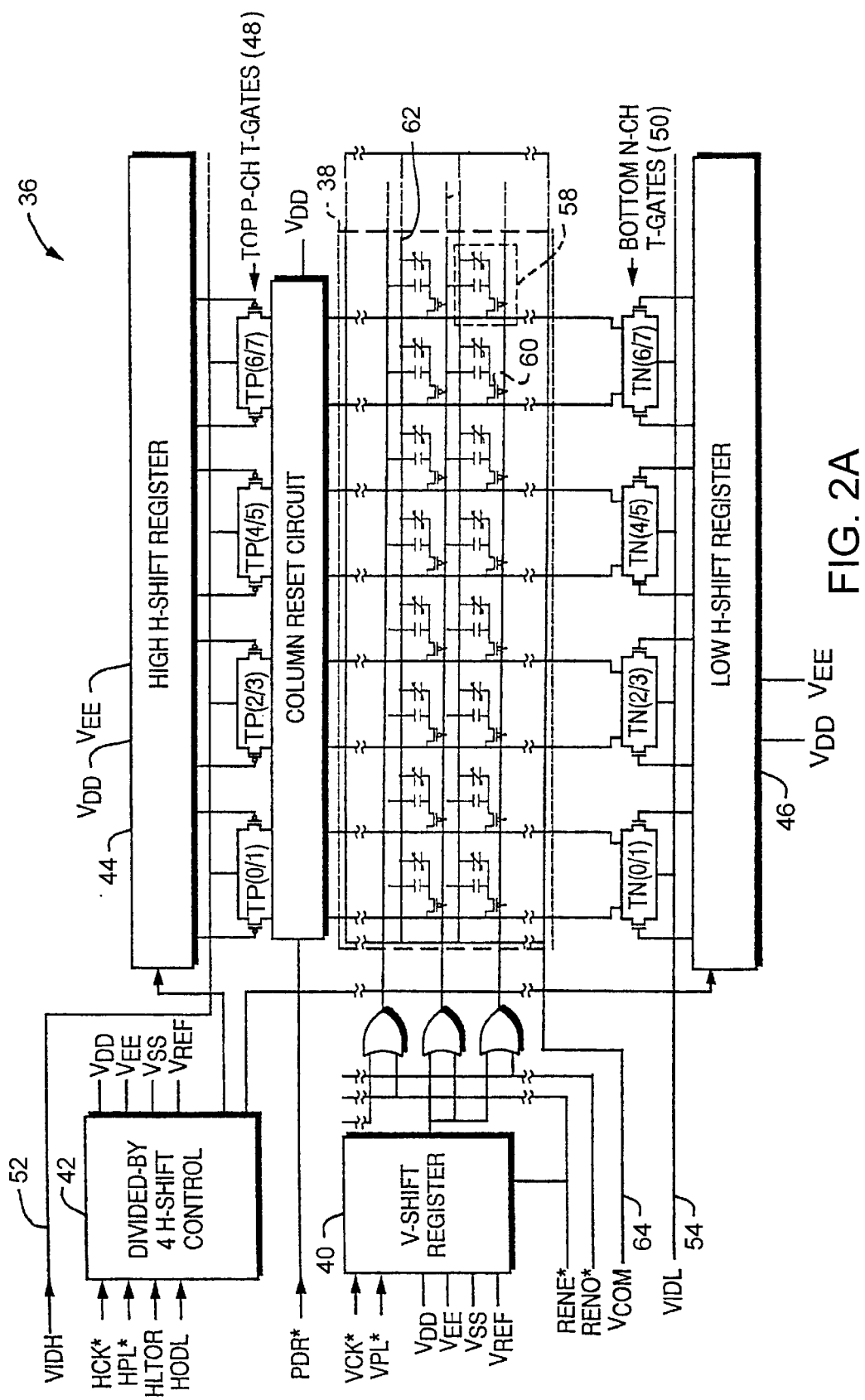
FIG. 2A is a schematic illustration of a die for an integrated active matrix panel display which includes optional control signal circuitry therein.

An integrated circuit active matrix display die 36 is shown schematically in FIG. 2A. The circuit 36 has been diced from a single wafer 32 along with a selected number of replicated circuits. Incorporated into the circuit 36 are a display matrix circuit 38, a vertical shift register 40, a horizontal shift control 42, a pair of horizontal shift registers 44 and 46, and a plurality of transmission gates 48 and 50.

A video signal high line 52 and a video signal low line 54 carry analog video signals from a digital to analog amplifier to the transmission gates 48 and 50. The transmission gates 48 and 50 are located above and below the display matrix circuit 38 as seen in FIG. 2A. The transmission gates above the display matrix circuit are p-channel transmission gates 48 and are connected to the video high (VIDH) line 52. The transmission gates below the display matrix circuit are n-channel transmission gates 50 and are connected to the video low (VIDL) line 54.

The transmission gates 48 and 50 are controlled by horizontal shift registers 44 and 46, with the p-channel transmission gate 48 controlled by a high horizontal shift register 44 and the n-channel 50 by a low horizontal shift register 46. The horizontal shift registers 44 and 46 are controlled by the horizontal shift control 42. The horizontal shift registers 44 and 46 select to which column the video signal is sent.

The display matrix circuit 38 has a plurality of pixel elements 58. (e.g., 76800 pixel elements are in a 320×240 display). Each pixel element has a transistor 60 and a pixel electrode 62. The pixel electrode 62 works in conjunction with a counterelectrode 64 and the liquid crystal forming the pixel capacitor for creating the image.

The vertical shift register 40 selects the row. The row line from the vertical shift register 40 is connected to the base of each of the transistors 60 to turns on the pixels of the row. The column which has been selected by the horizontal shift register receives the signals and drives the liquid crystal or allows the liquid crystal of the pixel element to relax.

It is recognized that in larger arrays, such as 480×320, 640×480, and 1280×1024, it may be desirable to split the display in sectors and drive individual sectors independently. A description of a display with multiple channel driver is described in U.S. patent application Ser. No. 08/942,272 filed on Sep. 30, 1997 and titled "Color Display System for a Camera," the entire contents which is incorporated herein by reference.

Figure 2B:
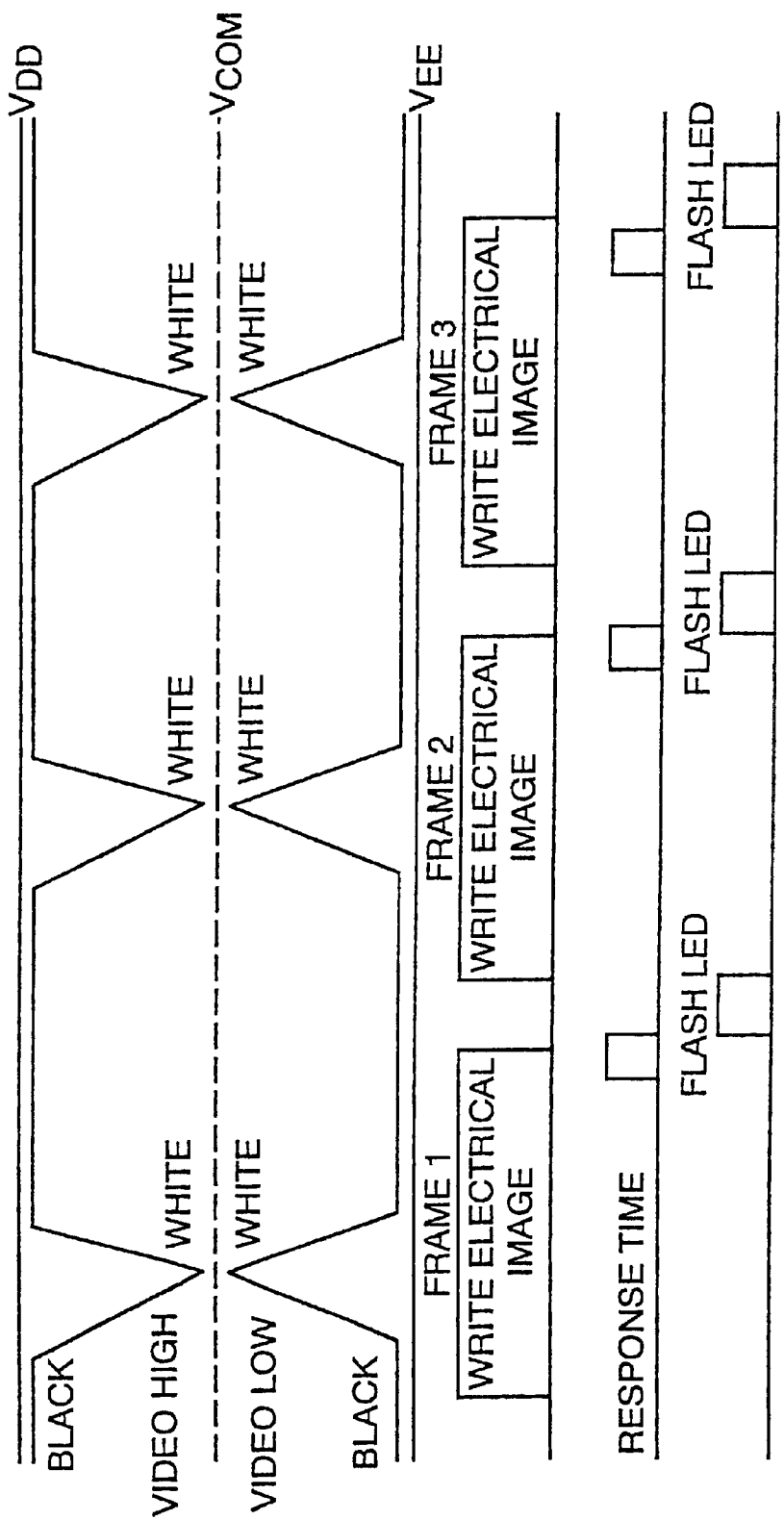
FIG. 2B illustrates a timing diagram for the display control circuit illustrated in FIG. 2B.

FIG. 2B illustrates a timing diagram for a microdisplay. The video signal is sent to the display 36 both as actual video and inverted video. The p-channel transmission gates 48 receive actual video and the pixels supplied by these gates are driven between the common voltage ($V_{COM}$), the voltage applied to the counterelectrode, and the supply voltage source ($V_{DD}$). The n-channel transmission gates 50 receive the inverted video and the pixels supplied by these gates are driven between $V_{COM}$ and the supply voltage sink ($V_{EE}$). After the entire frame is scanned into the display and there is a delay to allow the liquid crystal to twist, the backlight is flashed to present the image. In a preferred embodiment, $V_{DD}$ is 9 volts, $V_{EE}$ is 2 volts and $V_{COM}$ is 5.5 volts. The technique of alternating the video on each column is called column inversion and helps prevent a DC voltage from building up on the liquid crystal material and additionally prevents cross talk.

These small high resolution displays require magnification such that when held in a user's hand within the range of 0.5 inches to 10 inches of the user's eye, a clear image is provided.

A lens 80 suitable for magnifying the image of a microdisplay for viewing by a user is illustrated in the example of FIG. 3A.

For a 0.25 inch diagonal microdisplay, the outer diameter 82 of the lens can be about 30.4 mm, the thickness 84 of the lens at the optical axis 86 can be about 8 mm, the inner surface 88 that receives light from the display has a curved diameter of about 21.6 mm, and the viewing surface 90 has a diameter 92 of about 22.4. The peripheral edge 94 used to hold the lens 80 in the assembly can have a thickness 96 of about 2 mm and a radius 98 of about 4 mm. The lens 80 can be made of glass or a plastic material such as acrylic. This particular example of such a lens has a 16 degree field of view and an ERD of 25. The lens assembly can include an automatic focusing system, or a lens system that collapses in size when not in use.

Another preferred embodiment of a 1.25 inch diameter lens system 100 with a larger field of view is illustrated in FIG. 3B. Three lens elements 102, 104 and 106 enlarge the image on the display 108.

The lens 80 of FIG. 3A can be used in the display assembly 110 of FIG. 3C. In this embodiment, the display 112 is positioned between the backlight housing 114, containing LED 116, and the lens housing 118 that holds the lens 80 in a fixed position relative to the display 112.

Other preferred embodiments of optical systems for color displays are described in application U.S. Ser. No. 08/565,058 filed on Nov. 30, 1995, the entire contents of which is incorporated herein by reference. Additional details on optical systems for color displays are described in U.S. Ser. No. 08/966,985 filed on Nov. 10, 1997 of Jacobsen et al. and titled "REFLECTIVE MICRODISPLAY FOR PORTABLE COMMUNICATION SYSTEM", the contents of which is incorporated herein in its entirety by reference.

The configuration of the display for a monochrome or a color sequential display is generally the same with the same pixel pitch or size. This is in contrast to other types of color where there is an individual pixel for each of red, green and blue. In a monochrome display a single light source is required, wherein in a color sequential display there are three distinct light sources (e.g., red, green and blue). In that there are three distinct colors, each color must flash in order to produce most images, in contrast to one flash for monochrome.

In sequential color displays, the display panel is triple scanned, once for each primary color. For example, to produce color frames at 20 Hz, the active matrix must be driven at a frequency of 60 Hz. However, in order to reduce flicker it is desirable to drive the active matrix to have a frame rate of 60 frames per second, since at over 60 Hz, visible flicker is reduced. In a color display a preferred frame rate is 60 frames per second which results in 180 sub-frames per second, in that each frame has a red, a blue and a green sub-frame. In contrast in a preferred embodiment for monochrome, the frame rate is 72 frames per second. It is thus recognized that while a display for a color sequential display is substantially similar to one for a monochrome display, the sub-frame rate needs to be substantially faster to achieve the desired results in color sequential.

The following describes a method of manufacturing a display for color sequential. While the display is for color sequential and the fast frame rates, there is nothing that would limit its use for monochrome at a slower frame rate.

Figure 4:
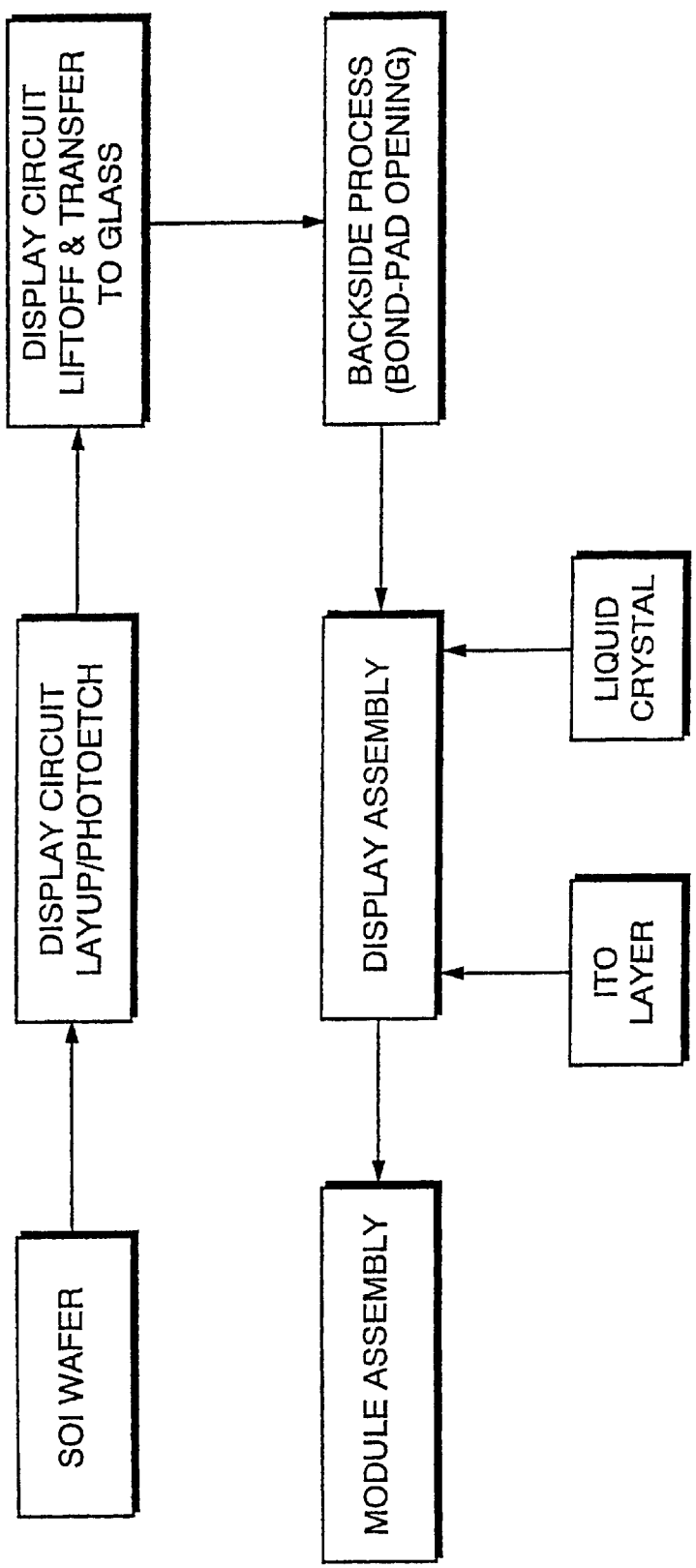
FIG. 4 is a schematic of the process of manufacturing and assembling the microdisplay.

The microdisplay is assembled in several major assemblies wherein in each assembly may have several steps. Referring to FIG. 4, a SOI (Silicon on Insulator) wafer has the integrated circuit laid upon the wafer. The display circuit is lifted off the wafer and transferred to the glass. The backside of the display circuit is processed. In addition to the display circuit, an ITO (Indium Tin Oxide) wafer having the counterelectrode is manufactured. The display circuit, the ITO wafer and the liquid crystal are assembled in a display assembly. The display assembly is assembled into a module assembly.

Figure 5A:
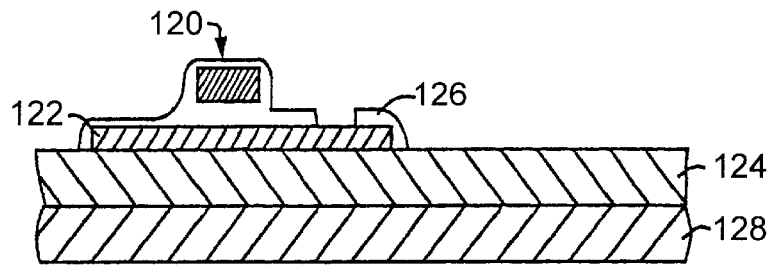
FIGS. 5A–5D are a schematic of the process of making the circuit on the TFT layer.
Figure 5B:
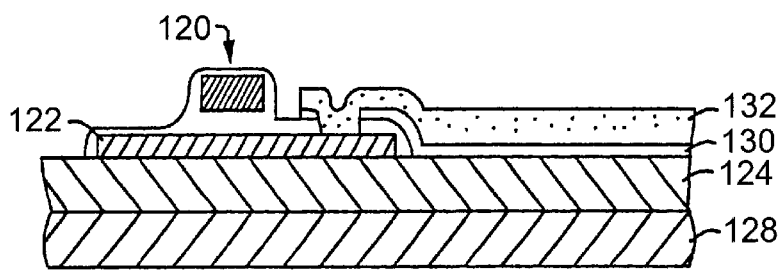

The forming of the circuitry 119 is illustrated in FIGS. 5A–5D. A transistor 120 in an active matrix circuit has been formed with a thin film single crystal silicon layer 122 over an insulating substrate 124 as seen in FIG. 5A. The silicon layer over the insulating substrate can be formed by recrystallization of the silicon layer or by using a bonded wafer process in which a first silicon wafer is bonded to a second silicon wafer with an insulating oxide layer. The second wafer is thinned to form a silicon-on-insulator structure suitable for display circuit fabrication and transfer to an optically transparent substrate as described in the previously incorporated application. A thermal oxide 126 also overlies a portion of the single crystal silicon layer 122. The insulating substrate 124 is carried by a Silicon (Si) wafer 128. A layer of $Si_3N_4$ 130 is formed as an anti-reflection layer over the insulating substrate 124 and the thermal oxide 126 as illustrated in FIG. 5B. A poly-silicon electrode (the pixel electrode) 132 is formed over the $Si_3N_4$ layer 130 and is in contact with the thin film single crystal silicon layer 122.

Figure 5C:
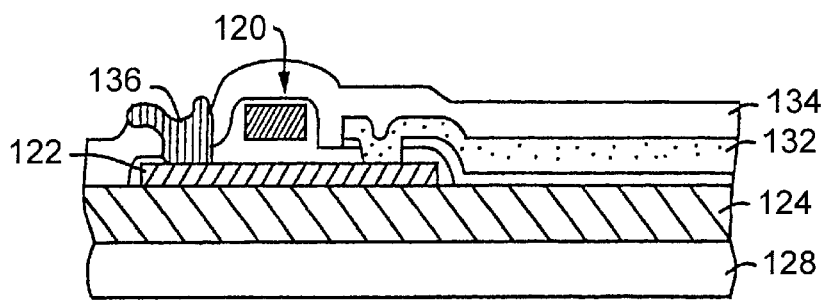
Figure 5D:
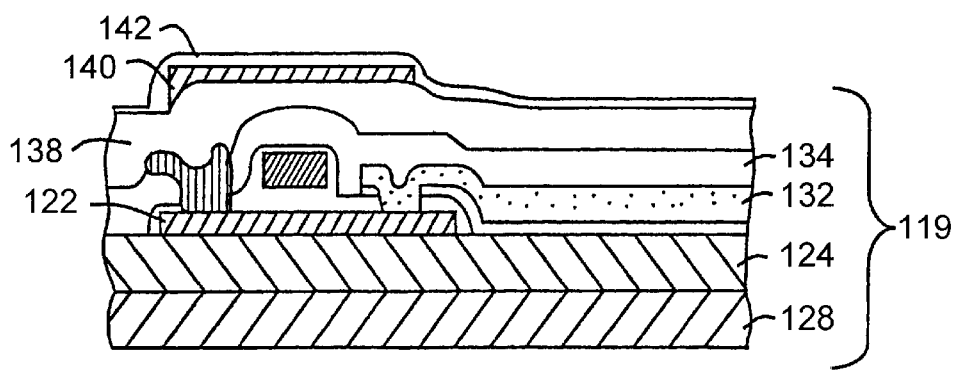

Referring to FIG. 5C, a BPSG 134 of $SiO_2$ is formed over the circuit. A portion is etched away and an aluminum terminal 136 is added. Referring to FIG. 5D, a layer of PSG 138 of $SiO_2$ is formed over the BPSG 134 and the aluminum terminal 136. A titanium (Ti) black matrix 140 is located over the transistor as a light shield. A silica passivation 142 is formed over the entire wafer. The wafer is ready for the next assembly process.

Figure 6:
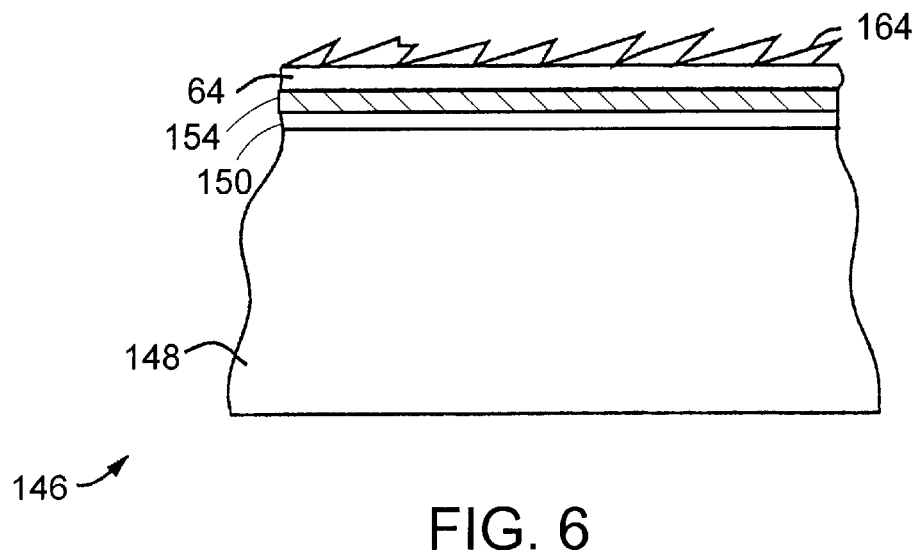
FIG. 6 is a cross-sectional view of an ITO layer.

In a separate process, the ITO wafer 146 having a counterelectrode 64 is formed. FIG. 6 illustrates the ITO wafer having a layer of glass 148, and the counterelectrode 64 (an ITO layer). In a preferred embodiment, interposed between the layer of glass 148 and the counterelectrode 64 is a second ITO layer 150 adjacent to the glass for heating as described below and a $SiO_2$ layer 154 between the two ITO layers 64 and 150.

Figure 7:
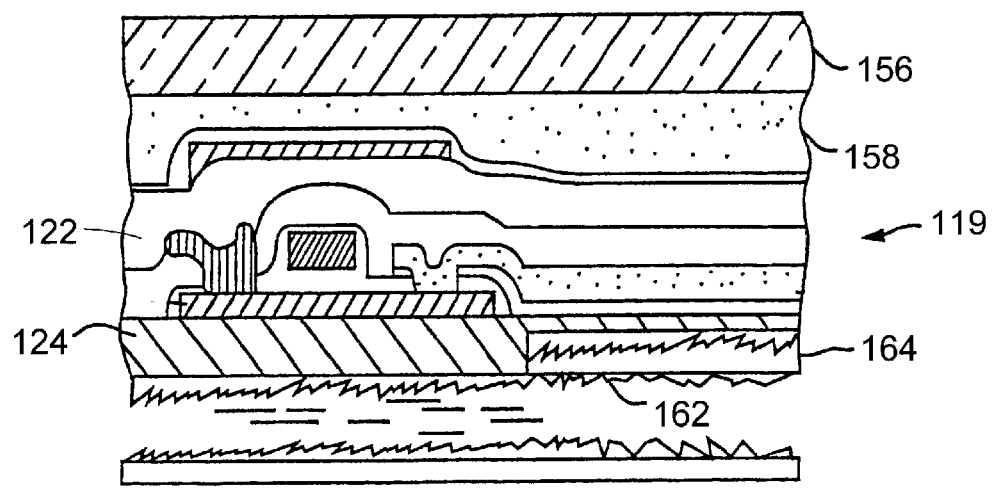
FIG. 7 is a cross-sectional view of a TFT layer with pooled buried oxide layer.

With the circuitry formed and the ITO wafer 146 formed, the two are ready to be joined together. The circuitry device 119 is then transferred to an optically transparent substrate 156 as shown in FIG. 7. A transparent adhesive 158 as described in greater detail in U.S. Pat. No. 5,256,562, the contents of which are incorporated herein by reference, is used to secure the circuit to the substrate 156. The layer, Si Wafer 128 to which the insulating substrate was initially attached, is removed.

The insulating substrate 124, also referred to as a buried oxide layer, is etched over the pixel arrays 132 as illustrated in FIG. 7. The buried oxide layer not located over the pixel arrays is left, therein creating a series of pools 162. In a preferred embodiment, the buried oxide layer is 0.5 $\mu$m and thinned by 0.2 $\mu$m to 0.3 $\mu$m in the pool areas over the pixel arrays. By only thinning the pixel arrays, the applied voltage to the liquid crystal is increased without compromising back-gate effect to the transistors (TFTs).

An alignment layer 164 of $SiO_x$ is deposited on the buried oxide and the counterelectrode illustrated in FIGS. 6 and 7. The alignment layer aligns the liquid crystal as described below.

Figure 8:
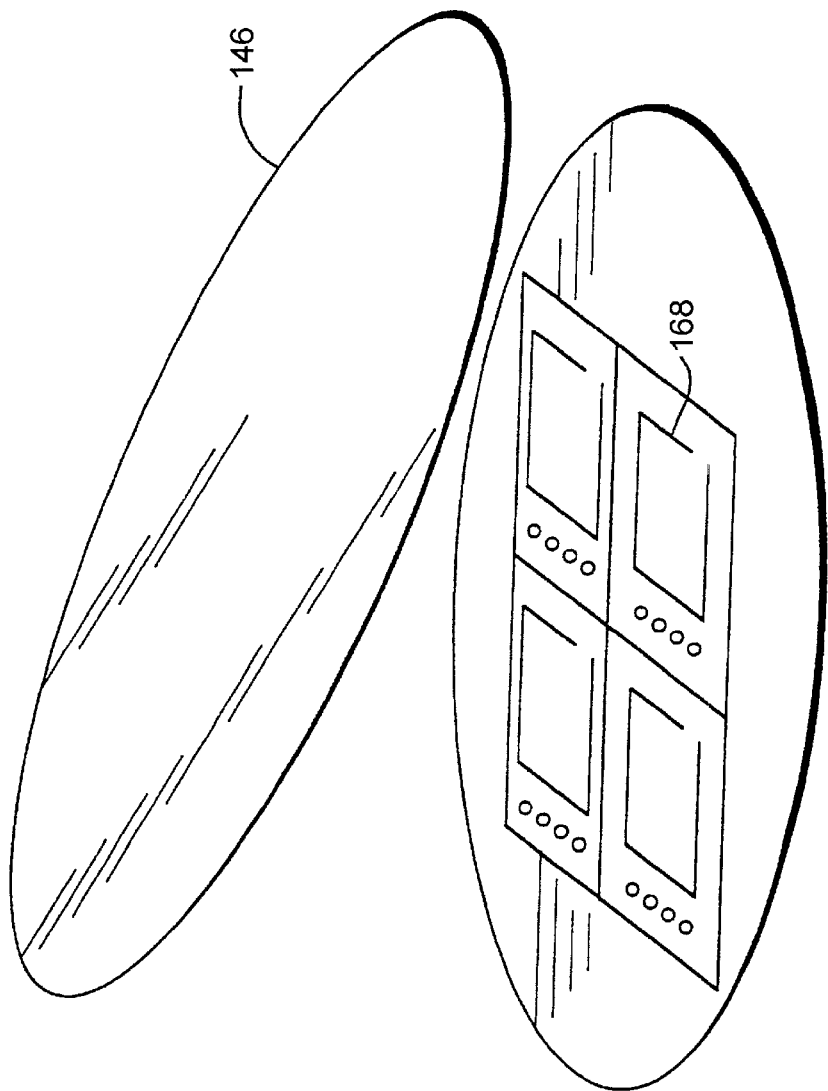
FIG. 8 is an exploded view of the ITO layer and the TFT layer prior to assembly.

A frame adhesive is placed around each display area as illustrated in FIG. 8. In addition, a silver paste is located in one spot on each display, so that the counter electrode is connected to the circuit when joined. A fill hole is left for filling the liquid crystal, as described below. The frame adhesive has a plurality of spacer balls. The spacer balls are 3–4 $\mu$m in diameter. The TFT glass and the counterelectrode glass are pressed together. The spacer balls ensure that the layers are spaced 1.8 $\mu$m apart when the bonding pressure is asserted. There are no spacers in the active matrix area. The combined wafers are then cured.

Figure 9:
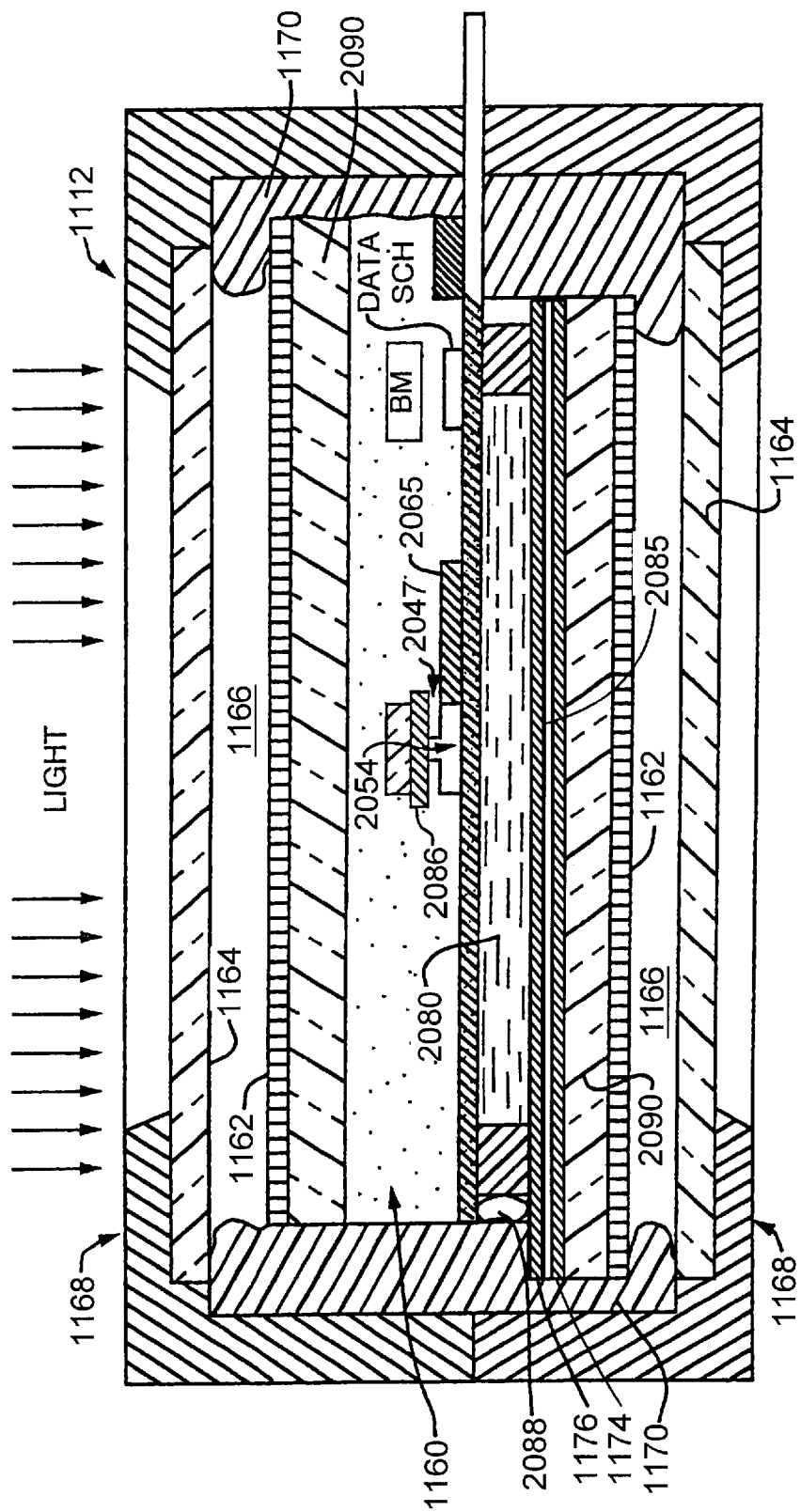
FIG. 9 is an enlarged sectional view of the display in its housing.

After curing, the glass on either side is scribed and broken. The two glass layers are broken at two different locations as illustrated in FIG. 9. The staggering of the break is to facilitate pin connection as described below.

The individual displays are placed in a holding tray and dipped into liquid crystal to fill the space between the buried layer and the counterelectrode as illustrated in FIG. 8. The liquid crystal is located between the alignment layers. The fill hole is then filled. That is the final step of the display assembly.

The module assembly consists of attaching the flex cable, the polarizers and mounting them into a module. Referring back to FIG. 9, a sectional view of the display 1112 is shown. The display 1112 has an active matrix portion 1160 including a pixel element 2047 spaced from a counterelectrode 2085 by an interposed liquid crystal material 2080. Each pixel element 2047 has a transistor 2054 and a pixel electrode 2065. The active matrix portion 1160 can have aluminum light shields 2086 to protect the transistor (TFT) 2054 if the active matrix is used for projection requiring high luminance light. The counterelectrode 2085 is connected to the rest of the circuit by solder bumps 2088. The matrix 1160 is bounded by a pair of glass substrates 2090 in this embodiment and a pair of polarizers 1162. An additional pair of glass plates 1164 are located outboard of the active matrix portion 1160. The glass plates 1164 are spaced from the polarizer 1162. The space defines an insulation layer 1166. The display 1112 includes a two-piece case 1168 which contains the active matrix portion 1160, the glass plates 1162 and the polarizers 1164. A room temperature vulcanization (RTV) rubber 1170 helps in maintaining the elements in the proper position in the case.

In order to get the liquid crystal to respond more quickly, the distance between the counterelectrode and the oxide layer is 2.0 $\mu$m at the pools 162. The narrow distance between the two elements results in less liquid crystal that has to twist to allow light to pass. However, the narrowing of the distance results in additional problems including the viscosity of some liquid crystals making it difficult to fill the display.

There are many characteristics that must be taken into account in selecting the desirable liquid crystal. Some characteristics include the operational temperature range, the birefringence (delta $n=n_e-n_o$), the operational voltage, viscosity and resistivity of the liquid crystal.

With respect to viscosity, flow viscosity and rotational viscosity are two areas that are examined. The preferred ranges are a flow viscosity of less than 40 cp and a rotational viscosity less than 200 cp in the temeperature range of 0° C. to 70° C.

Another characteristic that is examined in selecting a liquid crystal is delta n. The value of delta n depends on the cell gap and the liquid crystal pretilt angle at the two surfaces. The pretilt angle at the two surfaces is influenced by the alignment layer of $SiO_x$ deposited on the buried oxide and the counterelectrode. For a 2 $\mu$m gap a delta n of greater than 0.18 is preferred and a delta n of 0.285 is desired. For a large gap a different delta n would be required. For a gap of 5 $\mu$m a delta n in the range of 0.08 to 0.14 is desired.

In addition to viscosity and delta n ($\Delta$n), the liquid crystal's threshold voltage and the voltage holding rate are criteria to be examined when selecting a liquid crystal. In a preferred embodiment, the threshold voltage should be less than 1.8 volts and preferable approximately 1.2 volts. The voltage holding ratio should be greater than 99%.

Other characteristics that are desired are easy alignment and stability to UV and high optical intensity. If required, the delta n can be compromised in order to achieve a lower viscosity and lower operation voltage.

In a preferred embodiment, the liquid crystal chosen was a SFM (superfluoriated material). In preferred embodiments, the liquid crystal selected was one of TL203 and MLC-9100-000 marketed by Merck.

Liquid crystal is formed of a chemical chain which extends from the two surfaces. The alignment layer of $SiO_x$ deposited on the buried oxide and the counterelectrode are oriented in a preferred embodiment at 90° to each other. The alignment layers give the liquid crystal a pre-alignment.

The chain of liquid crystal twists and untwists depending on the voltage to the associated pixel electrode. This twisting in relation to the polarization plates results in the liquid crystal going between a white or clear state and a dark state.

While depending on the relation of the liquid crystal and the polarization plates, the liquid crystal can either look clear or dark in the relaxed position and conversely dark or clear in the driven state. In a preferred embodiment, the liquid crystal looks clear in the relaxed position and dark in the driven state.

Referring back to FIG. 2A, the image is scanned into the active matrix display by the vertical shift register selecting the first row, by the row going low, and the horizontal shift register selecting column by column until the entire row has been written to. When the first row is done, the vertical shift register selects the second row. This continues until the last row is selected. The horizontal shift register selects column by column until the last column in the last row has been written to. There is therefore a set time delay between when the first pixel (i.e., the first row, first column) and when the last pixel (i.e., the last row, last column) has been written. In a preferred embodiment, the delay from writing the first pixel to the last pixel is approximately 3 milliseconds.

Figure 10:
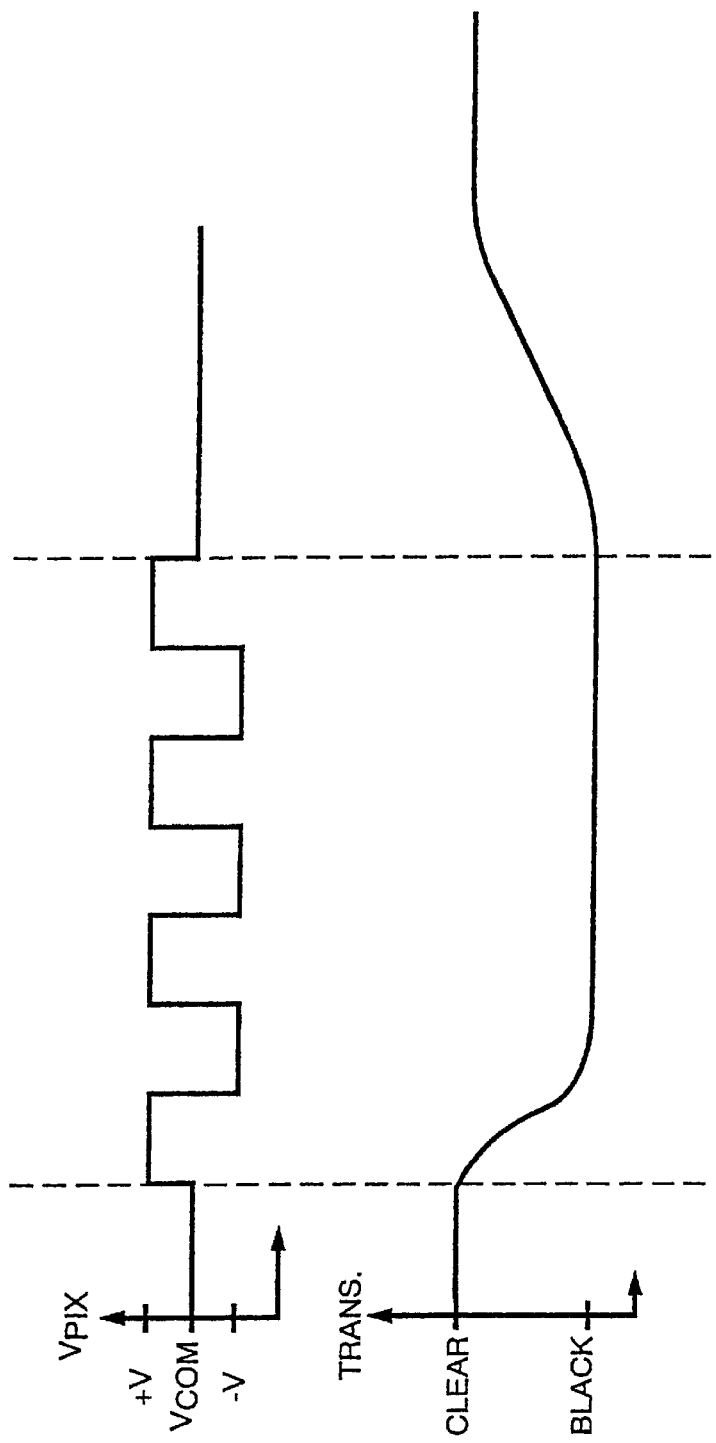
FIG. 10 is a graphical representation of the time to turn the liquid crystal clear to black and black to clear.

As indicated above, the liquid crystal does not respond instantaneously to the change of voltage. The delay for the liquid crystal to respond is illustrated in FIG. 10. With Vpixel initially equal to $V_{COM}$, so there is no voltage drop, the liquid crystal, as seen through the polarizers, is clear. When $V_{pixel}$ goes to a voltage, the liquid crystal is driven black. The change is not instantaneous since it takes the liquid crystal a set time to rotate. This time is a function of several factors including the type of liquid crystal and the temperature. If after reaching the steady state black, $V_{pixel}$ is set to $V_{COM}$, the liquid crystal returns to the clear state. Like the translation from clear to black, the change is not instantaneous. The change of state to clear takes longer than when the liquid crystal is being driven to black. FIG. 10 shows it takes over 2½ times as long to go from black to clear as it takes to go from clear to black. In a preferred embodiment using the preferred liquid crystal at room temperature, the time to drive from white to black is 4 milliseconds and the time for the liquid crystal to return to white is 10 milliseconds.

Figure 11A:
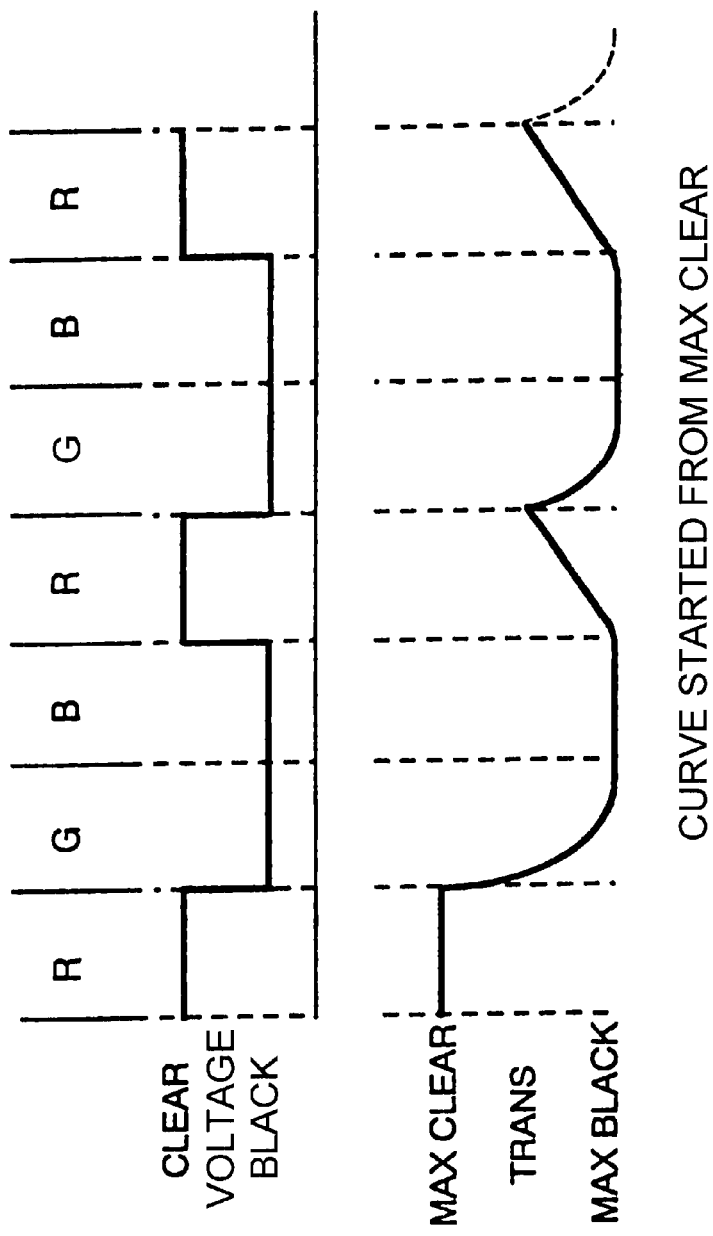
FIG. 11A is a graphical representation of the voltage and the transitioning of the liquid crytal for a pixel that is desired to be red.

As indicated above, in order for the color display to reduce flicker, there needs to be 180 subframes per second or less than 6 milliseconds per subframe. Therefore at 180 subframes per second, the liquid crystal cannot go from black to clear in a subframe. Referring to FIG. 11A, for a red pixel the voltage is $V_{COM}$ for the subframe which is associated with the red flash of light and another voltage for the subframes which are associated with the green and the blue flashes. This is done with the desire that the liquid crystal associated with that pixel is clear for the red flash and black for the green and blue flashes therein producing a red pixel.

If the liquid crystal starts as clear in the first subframe, it is capable of being driven black in the next subframe, the subframe associated with the green flash. The display circuit continues to drive the liquid crystal black for the next subframe associated with the blue flash. When the display circuit for that pixel goes to $V_{COM}$, the liquid crystal is allowed to relax. However, the liquid crystal, as represented in the illustration, does not get to a clear state by the time the subframe is done. In the illustration shown in FIG. 11A, the liquid crystal only gets to about fifty percent (50%) clear. In the next subframe, the green subframe, the liquid crystal is driven black again. Therefore, the liquid crystal for this red pixel never gets to its completely clear state before the flash. A maximum contrast is never achieved.

With a color sequential display, even when the display is of a static image, the display is dynamic since the display is sequencing through the red image, the green image, and the blue image.

Referring back to FIG. 2B, if the liquid crystal had a fast enough response to twist or untwist or if the subframe was a longer time period, even the last pixel written to, as represented by the end of the write box, would be settled in the final position before the flashing of the LED. However, the liquid crystal does not respond quickly enough to allow settling at the frame or subframe speeds required to prevent flicker as illustrated in FIG. 11A. In that the pixels are written to sequentially, the first pixel is written to (i.e., driven to twist or allowed to relax) a set time before the last pixel. In a preferred embodiment, the time between writing to the first pixel and the last pixel is approximately 3 milliseconds.

Therefore, the liquid crystal associated with the last pixel and the liquid crystal associated with the first pixel do not have the same amount of time to respond prior to the flashing of the backlight.

With the twist of the liquid crystal different at the two pixels, there is a different amount of light passing through the liquid crystal and therefore the contrast, the luminance, the color blend can vary from one corner to another of the display. For example, if a display had an intermediate color such as yellow at the first pixel and the last pixel, the color would not be identical.

Figure 11B:
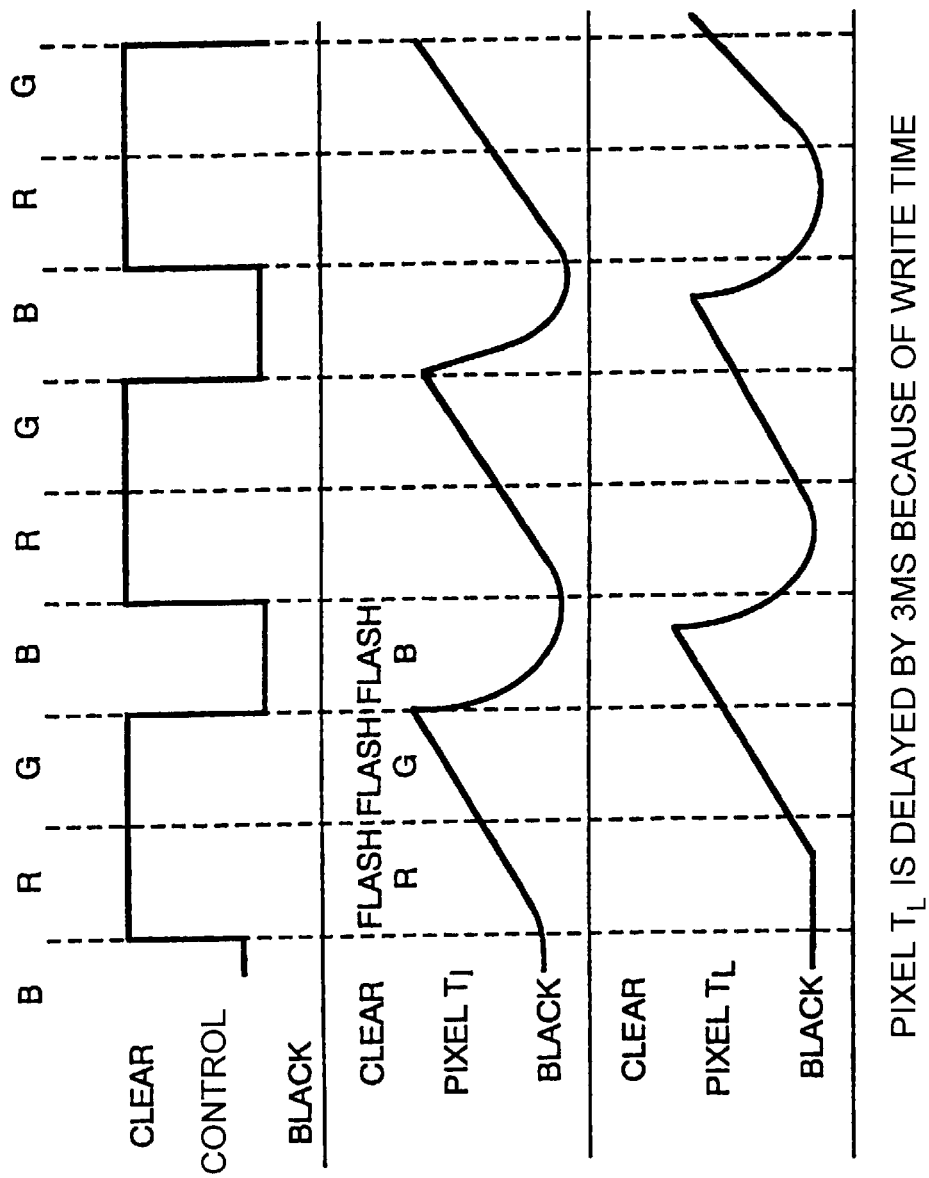
FIG. 11B is a graphical representation of the voltage and the transitioning of the liquid crystal for the first pixel and the last pixel for an intermediate color such as yellow.

Referring to FIG. 11B, a yellow pixel is created by allowing the red flash and the green flash to be seen and not the blue flash. The video for the pixel is set to drive the pixel black for the blue subframe and allow it to relax for the red and the green subframes, as represented by the square wave. In the first subframe in FIG. 11B, the blue subframe, the liquid crystal for both the first pixel and the last pixel are shown at a steady state black. The first pixel receives its signal at the beginning of the red subframe and the liquid crystal begins to relax. The last pixel receives its signal at some time later, 3 milliseconds in a preferred embodiment, and the liquid crystal begins to relax at that time. The liquid crystal related to the first pixel and the last pixel are at different points in the transition to clear when the red LED flashes, therein producing different levels of red. In the embodiment shown in FIG. 11B, the next color to flash is green and therefore the first and last pixels are not changed. Therefore the liquid crystal associated with both the first and the last pixel continues to transition to clear. When the LED for green flashes, the liquid crystal for the two pixels are in different points of transition to clear, therefore there is a different level of green. In addition, because the green flash occurred after the red flash and the liquid crystal had more time to transition, the amount of green that is visible is greater than the amount of red, therein resulting in a greenish yellow.

Still referring to FIG. 11B, the next subframe is the blue subframe. The pixels are driven black. The first pixel once again receives its signal near the beginning of the subframe and in that in a preferred embodiment it takes 3 milliseconds for the liquid crystal to turn black, the liquid crystal is black before the flash of the blue LED. The last pixel receives its signal near the end of the subframe and is still transitioning to black when the blue LED flashes. Therefore, the last pixel in this subframe has some blue in its yellow.

In the next frame, the next red subframe, the liquid crystal is relaxing, therein turning to clear. The last pixel had been previously driven black, therefore as it transitions to clear, the last pixel will once again lag behind the first pixel.

Figure 12A:
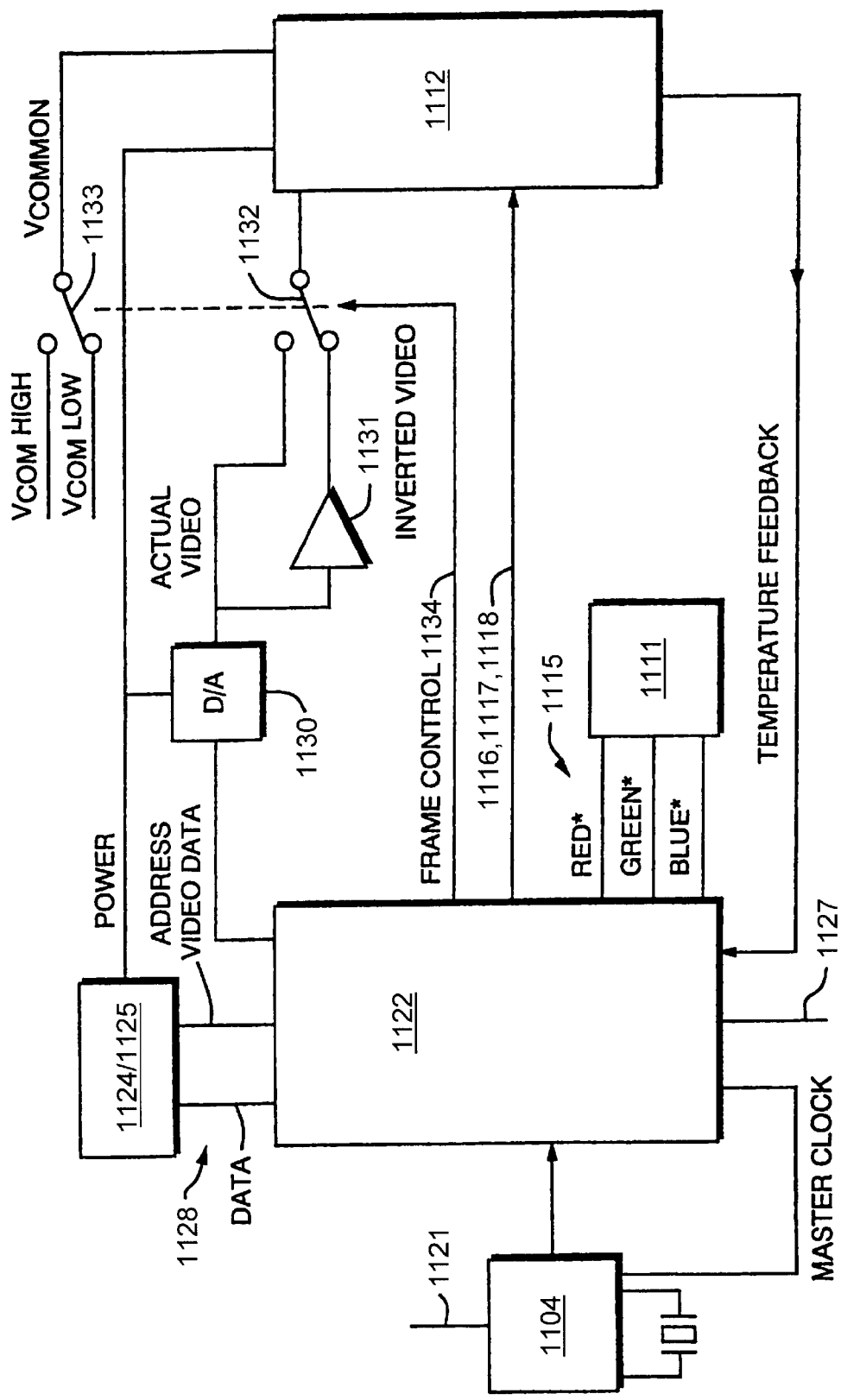
FIG. 12A illustrates an alternative preferred embodiment of the display control circuit in accordance with the invention.

FIG. 12A illustrates an embodiment of a display control circuit. In this embodiment, a digital circuit 1120 is used to control color sequential display operation. The processor 1104 receives image data at an input 1121 and sends display data to memory 1124 and flash memory 1125 via the timing control circuit 1122. The image data can be in a variety of forms including serial or parallel digital data, analog RGB data, composite data, or s-video. The processor 1104 is configured for the type of image data received, as is well known in the art. The timing control circuit 1122 receives clock and digital control signals from the processor 1104 and transmits control signals to the backlight 1111 along lines 1115. The timing control circuit 1122 transmits control signals, such as vertical start pulse, vertical clock, horizontal start pulse, and horizontal clock, to the display 1112 along lines 1116, 1117, and 1118. Lines 1128 direct ready, reset, write enable, output enable, color enable, address and data signals to memory to control delivery of image frames to the display 1112.

Still referring to FIG. 12A, the image data travels from the timing control circuit 1122 to the display 1112 through a digital to analog converter 1130 and through an inverter 1131 on an alternate frame dependent on a switch 1132 as described below. In addition and in contrast to the previous embodiment, the common voltage ($V_{COM}$) enters the display 1112 at alternating values controlled by a switch 1133. The switches 1133 and 1132 for alternating the $V_{COM}$ and the video to the display are controlled by a frame control line 1134 from the timing control circuit 1122.

Figure 12B:
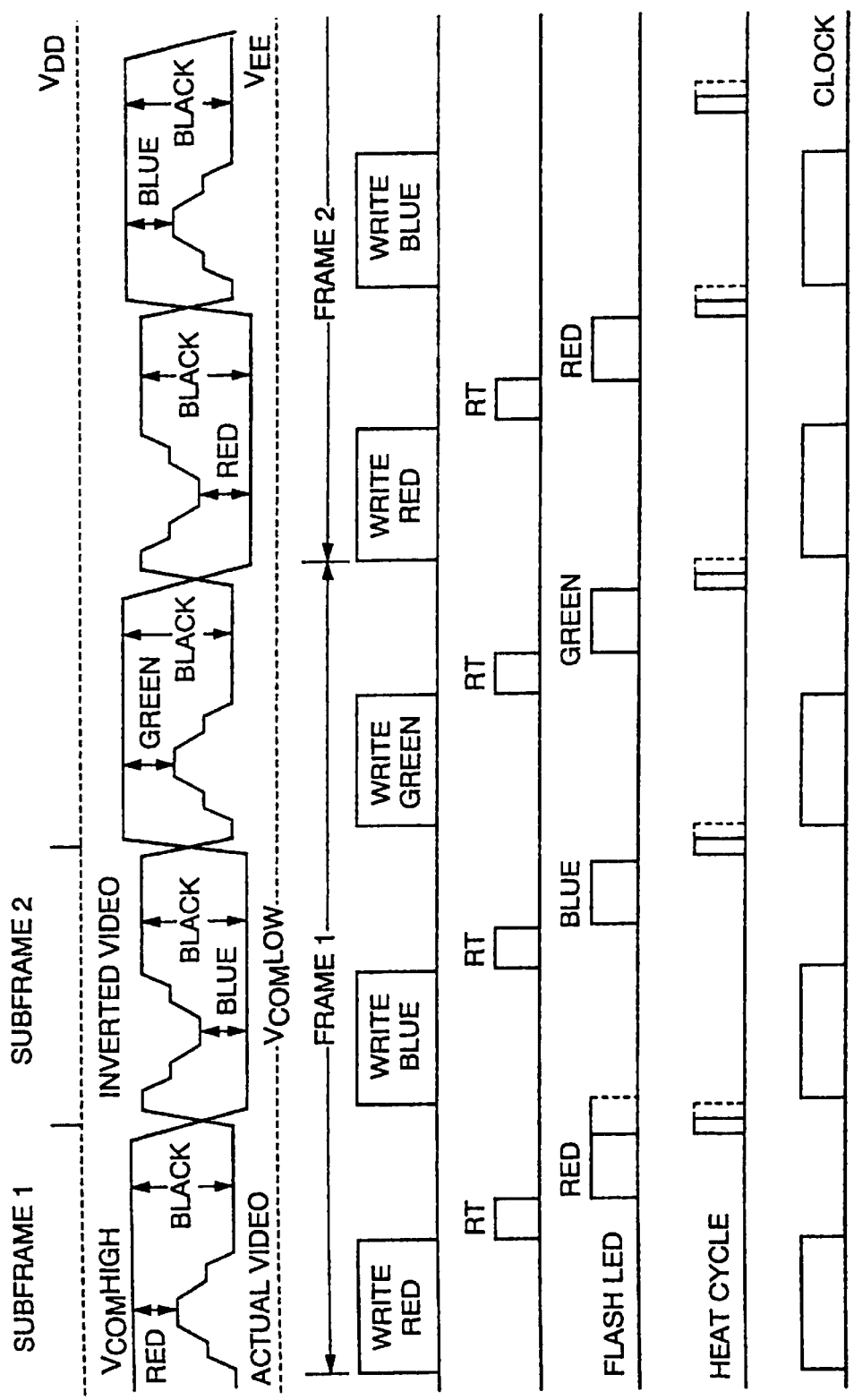
FIG. 12B illustrates a timing diagram for the display control circuit illustrated in FIG. 12A.
Figure 12C:
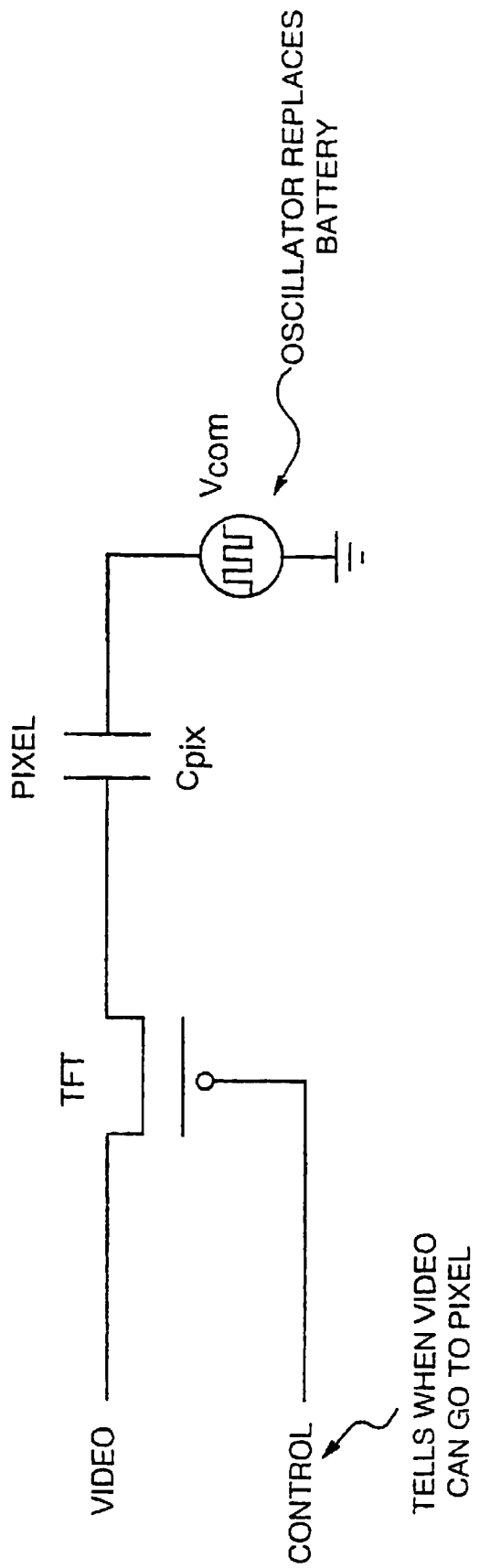
FIG. 12C illustrates a pixel element of the display control circuit shown in FIG. 12A.

Referring to FIGS. 12B and 12A, with the common voltage ($V_{COM}$) high, approximately 8 volts in a preferred embodiment, the actual video signal is scanned into the matrix circuit. After a delay to allow for the liquid crystal to twist to maximum position, the LED backlight 1111 is flashed to present the image. Prior to the next frame, subframe 2 in FIG. 12B, $V_{COM}$ goes low, approximately four (4) volts in a preferred embodiment. Driving $V_{COM}$ low erases the image that has just been scanned. However, since there is no backlight on, the loss of the image is not seen. With $V_{COM}$ low, the inverted video signal is scanned into the matrix circuit. Similarly, after a delay to allow the liquid crystal to twist, the LED backlight 1111 is flashed to present the refreshed or new image. Prior to the next frame, subframe 3 in the Figure, $V_{COM}$ goes high. Driving $V_{COM}$ high results in the image that has just been scanned to be erased. With $V_{COM}$ high, an actual video signal is scanned into the matrix circuit. A delay occurs and then the LED backlight 1111 is flashed. The common voltage ($V_{COM}$) and the video keep on alternating, as represented in FIG. 12C. If the display is a color display, the LED backlight 1111 sequentially flashes the distinct colors. In addition, three screen scans, one for each color LED, comprise a frame and the $V_{COM}$ alternates each screen.

In a preferred embodiment, $V_{COM}$ fluctuates every 5–6 milliseconds. It takes approximately 3 milliseconds to write/scan the image. The LED flashes for a time period of about 0.5 milliseconds. There is a waiting period between writing to the last pixel and the flash of about 1.5 milliseconds. It is recognized that it may be desirable to vary the delay time before flashing the LED or vary the length of the LED flash dependent on the color LED to be flashed. For example, it may be desirable to have a longer delay time, response time, before flashing the LED when the LED to be flashed has a longer wavelength, such as red, which has a wavelength of between 630 and 700 nm.

With the video amplitude, the difference between $V_{DD}$ and $V_{EE}$, on the pixel's TFT reduced, a smaller storage capacitor is required. Less time is needed to write with a smaller storage capacitor and therefore a smaller pixel TFT can be used. If the liquid crystal has a fast enough response, the storage capacitor can be eliminated and the capacitance of the liquid crystal becomes the storage capacitor. In addition, with no storage capacitor a larger aperture is possible. With a larger aperture and increased aperture ratio, the image will be brighter for the same cycling of the backlight or the total power used can be reduced with the same image brightness.

Figure 12D:
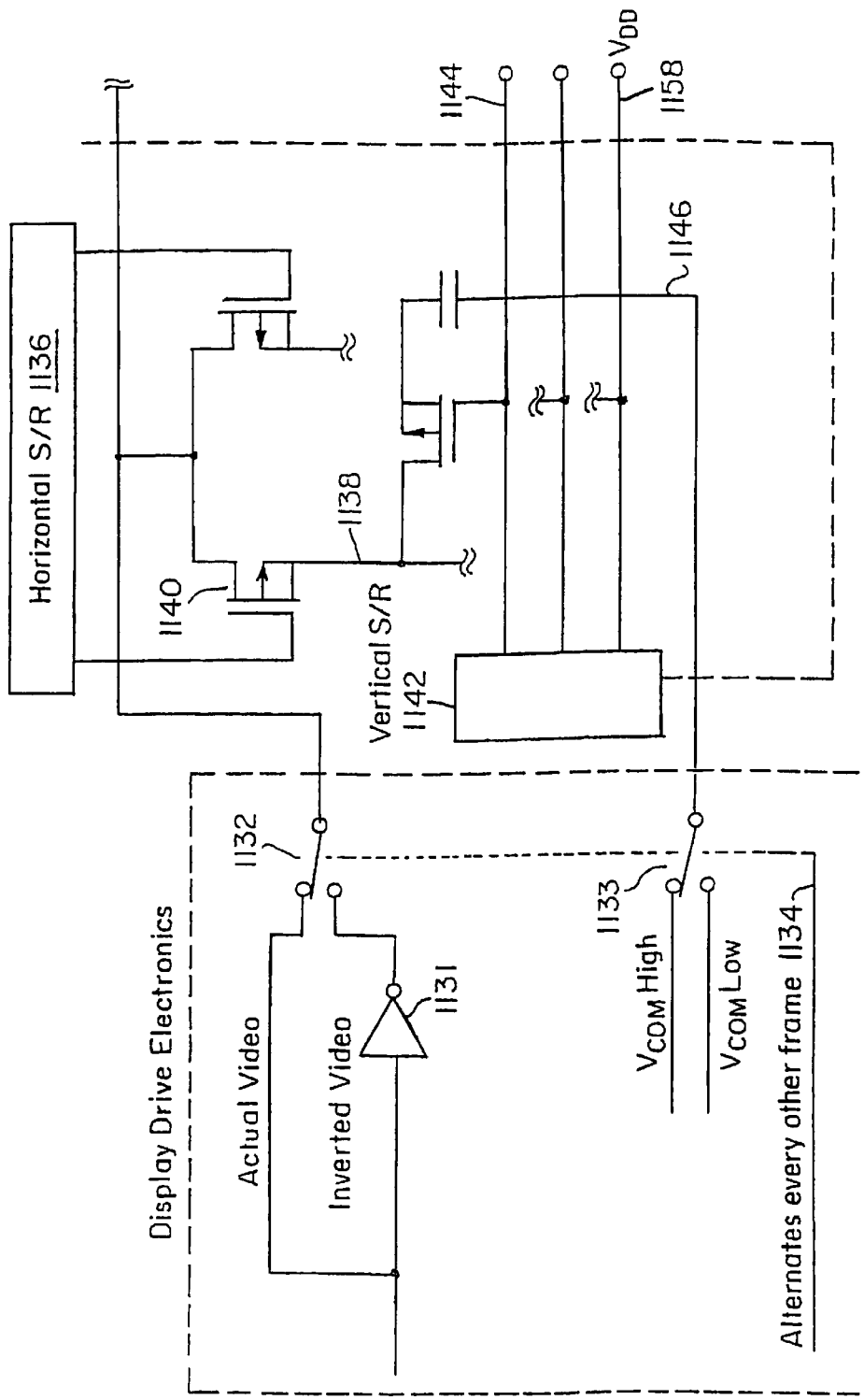
FIG. 12D illustrates a portion of the display control circuit shown in FIG. 12A.

Referring to FIG. 12D, an enlarged schematic view of one pixel, the pixel is charged by the horizontal shift register 1136 selecting a column 1138 by turning a transmission gate 1140 and the vertical shift register 1142 selecting a row 1144. The video is written to the pixel and the liquid crystal begins to twist and become optically transmissive. After the entire display has been written and there has been a delay before the LED flashes, the $V_{COM}$ 1146, i.e., the voltage to the counterelectrode, is switched from high to low or vice versa by the frame control line. At the same time, the video signal is switched from actual video to inverted video or vice versa, so that the video will be switched for the next frame.

The liquid crystal can be twisted to become either optically transmissive or optically opaque. The orientation of the polarizers affect whether the liquid crystal is driven to white, transmissive, or to dark, opaque.

Figure 13:
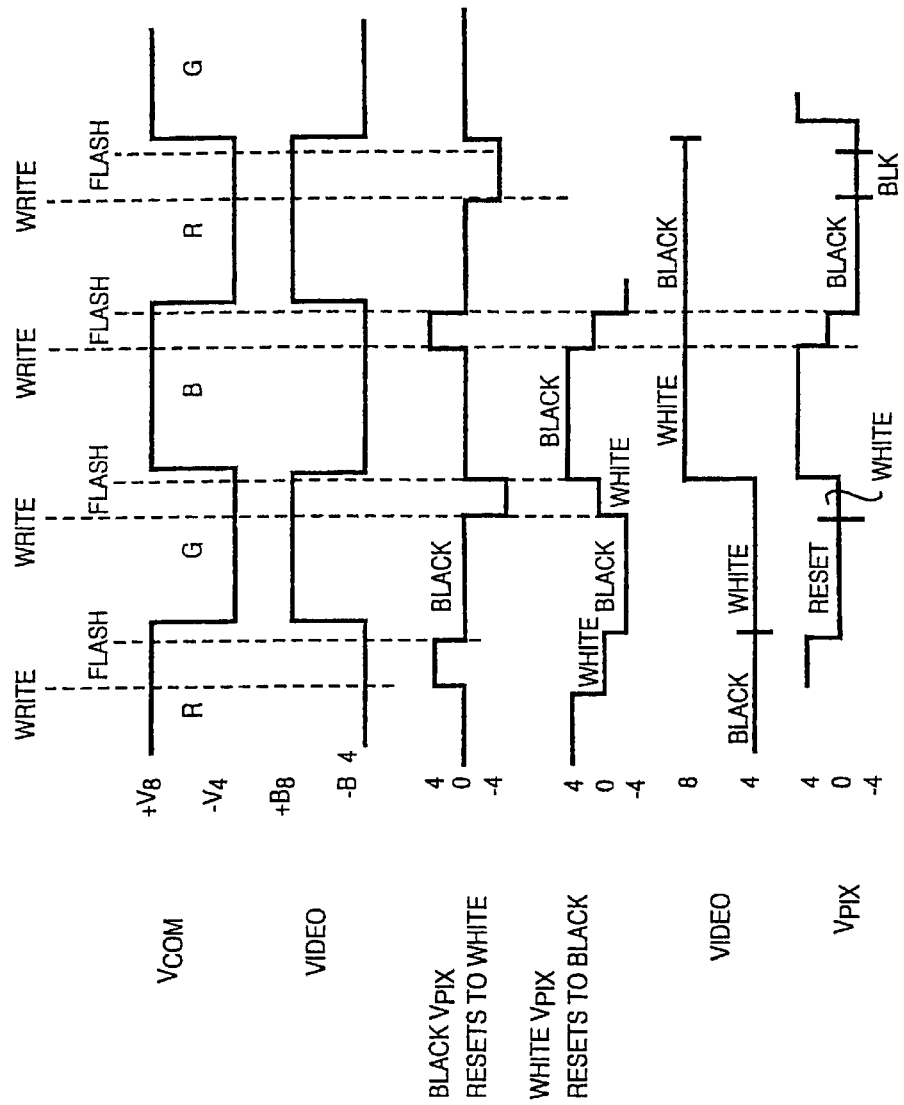
FIG. 13 is a graphical representation of a black pixel being reset to white and white pixel being reset to black by the modulation of $V_{COM}$.

By switching $V_{COM}$ and the video signal after each frame or subframe as illustrated in FIG. 13, a black pixel is reset to white and a white pixel is reset to black. The resetting of the $V_{COM}$ changes the base or common ground voltage for the pixel. Therefore if $V_{COM}$ is 8 volts and the pixel is driven to 4 volts, a 4 volt differential results and the liquid crystal is black. If $V_{COM}$ is then set to 4 volts, there is no differential and the pixel is reset to white. Likewise if $V_{COM}$ is 8 volts and the pixel is allowed to go to $V_{COM}$, a zero (0) volt differential results and the liquid crystal twists to white, and then $V_{COM}$ is set to 4 volts, there is now a 4 volt differential and the pixel is reset to black.

Figure 14:
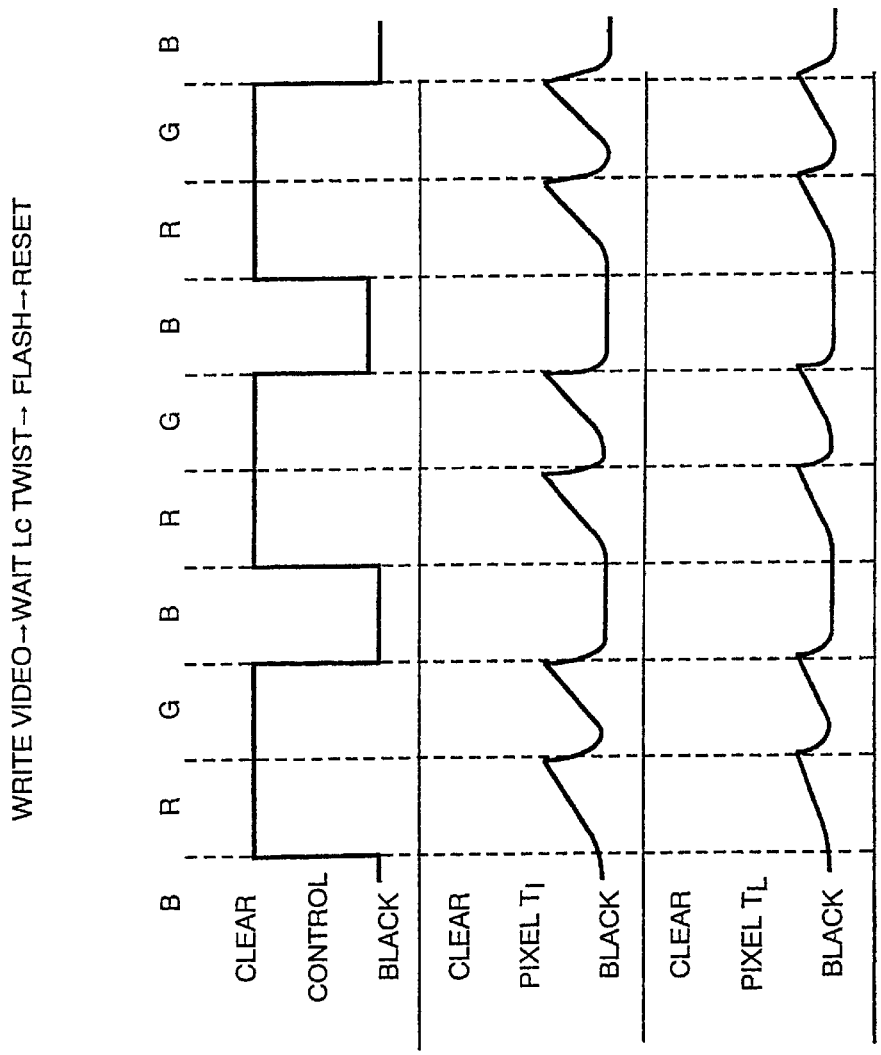
FIG. 14 is a graphical representation of the voltage and the transitioning of the liquid crystal for the first pixel and the last pixel for an intermediate color such as yellow for the display control circuit illustrated in FIGS. 12A–12C.

FIG. 14 illustrates the creation of a yellow pixel for the first pixel and the last pixel, similar to what is shown in FIG. 11B, but resetting or modulating $V_{COM}$ after each subframe. The video for the pixel is set to drive the pixel black for the blue subframe and allow it to relax for the red and the green subframes, as represented by the square wave. In the first subframe in FIG. 14, the blue subframe, the liquid crystal for both the first pixel and the last pixel are shown at a steady state black. The first pixel receives its signal at the beginning of the red subframe and the liquid crystal begins to relax. The last pixel receives its signal at some time later, 3 milliseconds in a preferred embodiment, and the liquid crystal begins to relax at that time. The liquid crystal related to the first pixel and the last pixel are at different points in the transition to clear when the red LED flashes, therein producing different level of red as in FIG. 11B. However, in contrast to the previous embodiment, the $V_{COM}$ modulates so that the clear (white) pixels reset to black. This is represented by the downward slope between the red subframe and the green subframe.

The next color to flash is green. The first pixel receives its signal at the beginning of the green subframe and the liquid crystal begins to relax. The last pixel receives its signal at some time later, 3 milliseconds in a preferred embodiment, and the liquid crystal begins to relax at that time. When the LED for green flashes, the liquid crystal for the two pixels are in different points of transition to clear, therefore there is a different level of green. However, in contrast to the previous embodiment, the liquid crystal has not had more time to transition prior to the flash of the green LED compared to the red LED. The color is thus more uniform in that both the first pixel and the last pixel have the same ratio of red to green.

Still referring to FIG. 14, the next subframe is the blue subframe. The pixels are driven black by $V_{COM}$ modulation, as represented by the slope between the green subframe and the blue subframe. In contrast to the previous embodiment, both the first pixel and the last pixel are driven black at the same time. The last pixel is therefore not still transitioning when the blue LED is flashed. With the $V_{COM}$ modulation, while there are still variations of luminosity from the top to the bottom, there is now uniform color.

Referring back to FIG. 12A, the display circuit has an additional line, a temperature sensor line 1148, which runs from the display 1112 to the timing control circuit 1122. The active matrix comprises a plurality of pixels arranged in columns and rows. Heat is preferably absorbed substantially uniformly throughout the liquid crystal material. However, there may be local temperature variations due to the nature of the image being displayed as well as display and heater geometry and environmental conditions. Temperature sensors can be distributed throughout the active matrix region including around the perimeter of the active matrix including the corners and also disposed near the center of the active matrix. The use of a temperature sensor is described in U.S. patent application Ser. No. 08/364,070 filed Dec. 27, 1994 and is incorporated herein by reference.

The characteristics of the liquid crystal material are effected by the temperature of the liquid crystal. One such example is the twist time of twisted-nematic liquid crystal material, which is shorter when the liquid crystal material is warm. By knowing the temperature of the liquid crystal, the timing control circuit 1122 can set the duration and timing of the flash of the backlight 1111, therein achieving the desired brightness and minimizing power consumption.

Another preferred embodiment of the display 1112 has an internal heater. Referring back to FIG. 12D, during normal operations, the vertical shift register 1142 has only one row on, so that as the horizontal shift register 1136 moves from column to column only one pixel is affected. After the last pixel on a row is addressed, the vertical shift register 1142 switches the active row. The display 1112 can be placed in a heat mode where each row 1144 is turned on and has a voltage drop across the row to create heat. In the embodiment shown in FIG. 12D, an end 1158 of each row line is connected to $V_{DD}$ and the end near the shift register is driven low thereby creating a voltage differential across each line. The heat is generated since $P=V^2/R$, where R is the resistance of the row lines. In normal operation, only the selected line which contains pixels to be driven low generates heat, not the entire display.

Referring back to FIG. 12B, with the common voltage ($V_{COM}$)high, the actual video signal is scanned into the matrix circuit. After a delay to allow for the liquid crystal to twist into position, the LED backlight 1111 is flashed to present the image. Prior to the next screen or subframe, a heat cycle occurs where all the row lines are driven such that there is a voltage differential across the row. The heating can occur while $V_{COM}$ and the video are being alternated and inverted, respectively, by the frame control line 1131. FIG. 12B shows a heating cycle after each subframe, but the number and time period of heat cycles can be dependent on the temperature of the liquid crystal as determined by the temperature sensor 1132. In cold environments, the digital circuit 1120 can have a warm-up cycle where the heater is turned on prior to the first painting of the screen.

The delay time before beginning the flash and the flash time are shown as identical in FIG. 12B. However, both the delay time (the delay for response time of the liquid crystal) and the flash time can be dependent on the specific color to be flashed. The delay time is dependent on when the liquid crystal associated with the last pixel to be written has sufficient time to twist to allow that specific color to be seen. The duration of the flash, or the point that the flash must be terminated, is dependent on when the liquid crystal associated with the first pixel to be written of the next frame has twisted sufficiently that light from the backlight is visible to the viewer.

The timing control circuit 1122, as seen in FIG. 12A, can vary the flash duration and the delay or response time depending on the color that is to be flashed. In addition, the current to the backlights 1111 can be varied to adjust the intensity of the color. If desired, a color control line 1127 can be added to the timing control circuit 1122 to allow the user to vary the color.

Figure 15A:
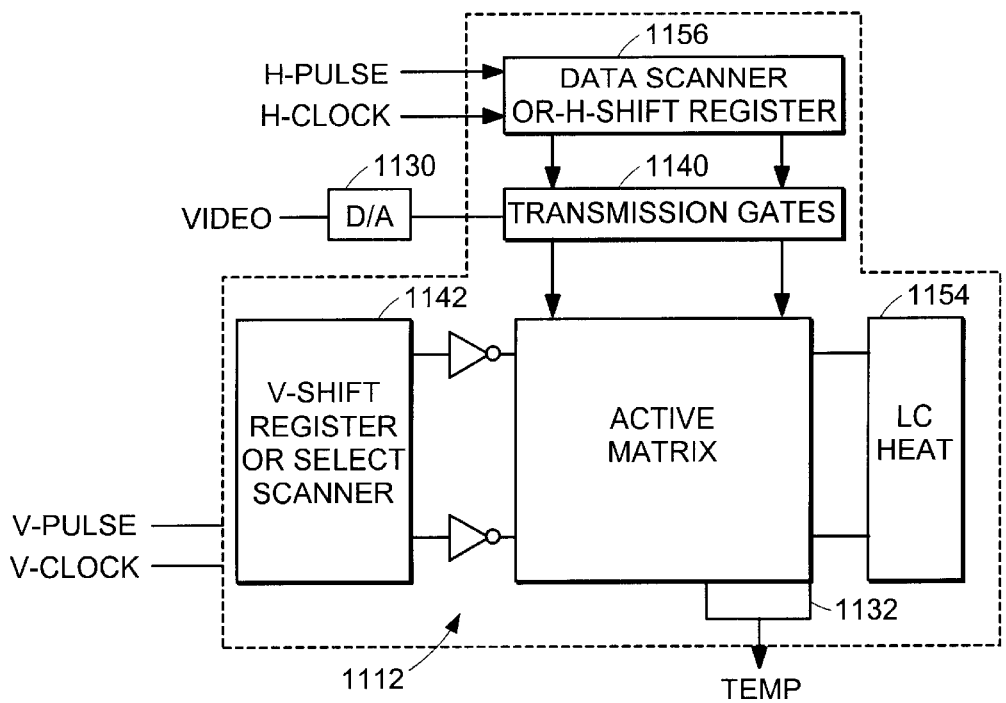
FIG. 15A illustrates an alternative preferred embodiment of the display with a heat gate.

Referring to FIG. 15A, a schematic of the display 1112 and the digital to analog converter 1130 are shown. The display has a horizontal shift register 1136, a vertical shift register 1142, and switches 1140 similar to what is illustrated in FIG. 12D. In addition, and in contrast to FIG. 12D, FIG. 15A illustrates a heating gate 1154.

Figure 15B:
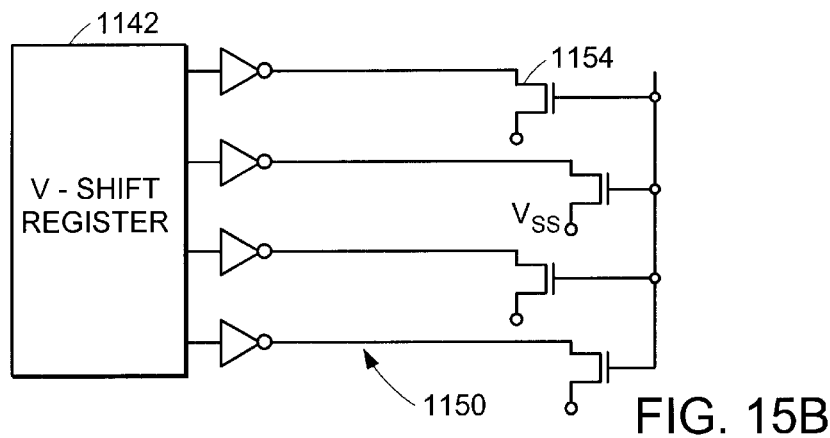
FIG. 15B illustrates a portion of the display shown in FIG. 15A.

Referring to FIG. 15B, for pixels which have p-channel TFTs, the heating gate 1154 has a series of n-channel TFTs. Typically when writing to the display only the row being written to is on (V=0). When not writing to the display, all the rows are $V_{DD}$. When the n-channel TFTs turned on, by applying $V_{DD}$ to a row line 1150 results in current flowing from the inverter associated with the vertical shift register 1142 through the row to the n-channel TFT and heat is dissipated along the entire row. The source is connected to $V_{SS}$, which is zero. It is also recognize that the display 1112 can have several extra rows outside the typical array to assist in uniform heating.

Figure 15C:
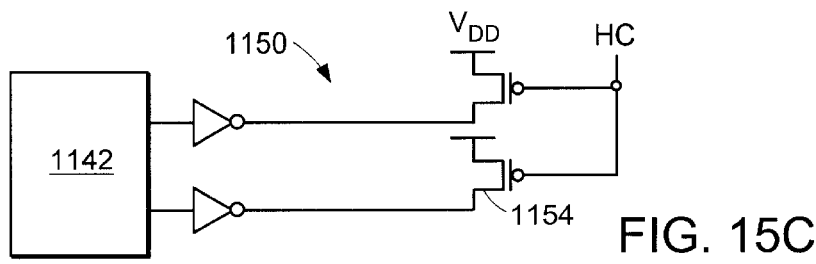
FIG. 15C illustrates an alternative embodiment of a portion of the display shown in FIG. 15A.

Likewise for pixels which have n-channel TFTS, referring to FIG. 15C the heating gate 1154 has a series of p-channel TFTs. Typically when writing to the display only the row being written to is on (V=$V_{DD}$). When not writing to the display, all the rows are approximately zero (0) volts. When the p-channel TFTs are turned on by setting the gate to zero (0), there is a voltage drop across the row of $V_{DD}$.

It is recognized that $V_{COM}$ addressing and the heating of the display can be used independently. Heating can be incorporated into the embodiments described with respect to FIG. 2A. While an internal heater is preferred, it is recognized that a separate heater can be used with the temperature sensor.

In the embodiments shown in FIGS. 15B and 15C, a DC voltage drop $\Delta V$ develops across the display as current flows through the row lines 1150 to create the heat. Depending on the length and frequency of the heating cycles, a DC field can be created that affects the performance of the Liquid Crystal. An alternative embodiment shown in FIG. 15D alternates the direction of current flow in the row lines 1150 to reduce or eliminate a DC field.

Figure 15D:
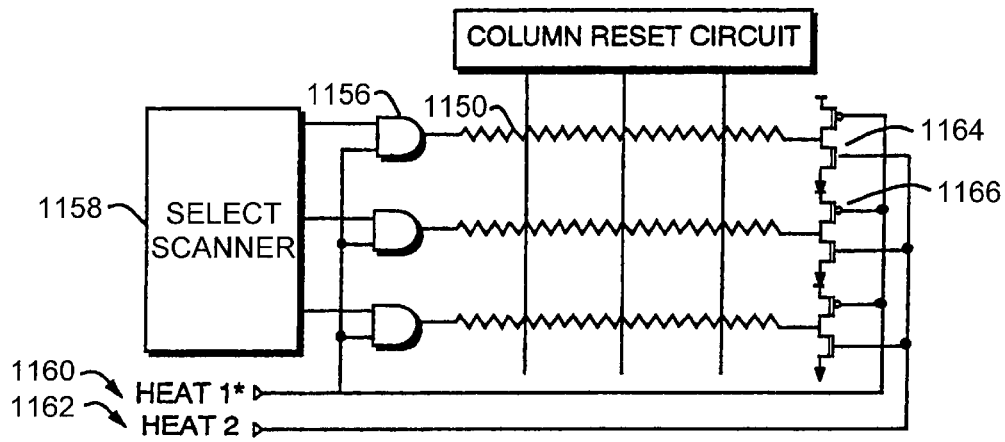
FIG. 15D illustrates an alternative heat driving embodiment.

Still referring to FIG. 15D, the display has two-input AND gates 1156 between the select scanner 1158 and the row lines 1150, with one of the inputs of the AND gates input from the select scanner 1158. The other input is a heat signal, HEAT1*, 1160. The other side of each row line 1150 is connected to the drains of two transistors, a n-channel TFT 1164 and a p-channel TFT 1166. The gate of each of the n-channel TFTs is connected to the HEAT1* 1160. The gate of each of the p-channel TFTs is connected to a second heat signal, HEAT2, 1162.

The two heat signals HEAT1* and HEAT2* are held HIGH and LOW, respectively during normal display operation. When HEAT1* is asserted (LOW), the select scanner side of each row line 1150 is driven low while the right side is pulled high. The current flow from right-to-left, as seen in this Figure, in this situation. Alternatively, HEAT2 is asserted (HIGH)and the right side is pulled down and the current flows left-to-right. The alternating of HEAT1* and HEAT2 heating cycles helps equalize the DC component of any electric fields to which the liquid crystal may be exposed.

For the above embodiments, the other lines that extend across the active area, the column lines, are not driven to a set voltage. In an alternative embodiment, the column lines can all be drive to a known voltage to achieve a more uniform heating. It is recognized that the column lines or additional added lines can also be used for heat. alternative embodiment uses the column lines for heat.

Figure 15E:
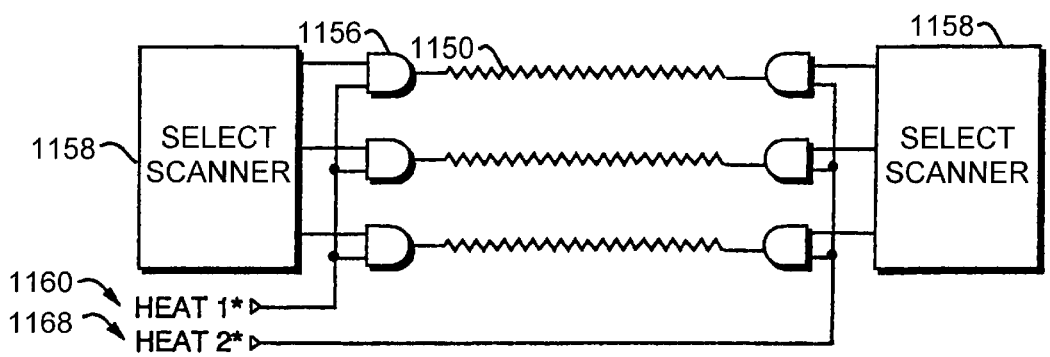
FIG. 15E illustrates an alternative heating embodiment for a display with two select scanners.

Referring to FIG. 15E, most larger displays use two select scanners 1158, on opposite sides of the array to drive the video signal to the pixel elements. A more detail explanation of two select scanners is described in U.S. patent application Ser. No. 08/942,272, which was filed on Sep. 30, 1997, the entire contents of the which is incorporated herein by reference.

The display with two select scanners 1158 has a two input AND gate 1156 at each end of each row line 1150. The HEAT1* 1160 is connected to an input of the AND gate on side of the display and the HEAT2* 1168 is connected to an input of the AND gate on the other side of the display.

An alternative embodiment to having the AND gates is have the logic within the select scanner and have a multi-level driver.

Referring back to FIG. 9, an alternative embodiment for internal heating is shown. A second layer of ITO (Indium Tin Oxide) 1174 underlies the counterelectrode 2085 with an interposed layer of $SiO_2$ 1176. The second layer of ITO 1174 is patterned such that it covers only the array area. If a current is passed through the second layer 1174, it heats and can heat the liquid crystal 2080. Similar to previous embodiments, the heating occurs between the two layers of glass 2090 that bound the matrix 1160.

The measuring of the temperature of the liquid crystal requires additional analog circuitry which adds complexity to the circuit of the display. It is recognized that it is the operational characteristics of the liquid crystal, not the actual temperature, that is ultimately desired. Therefore, the capacitance of the liquid crystal, an electrical measurement, can be done in place of the measurement of the temperature in order to determine when heating is required. Thus the heater can be actuated in response to a liquid crystal sensor that responds to the optical or electrical properties of the liquid crystal.

Figure 15F:
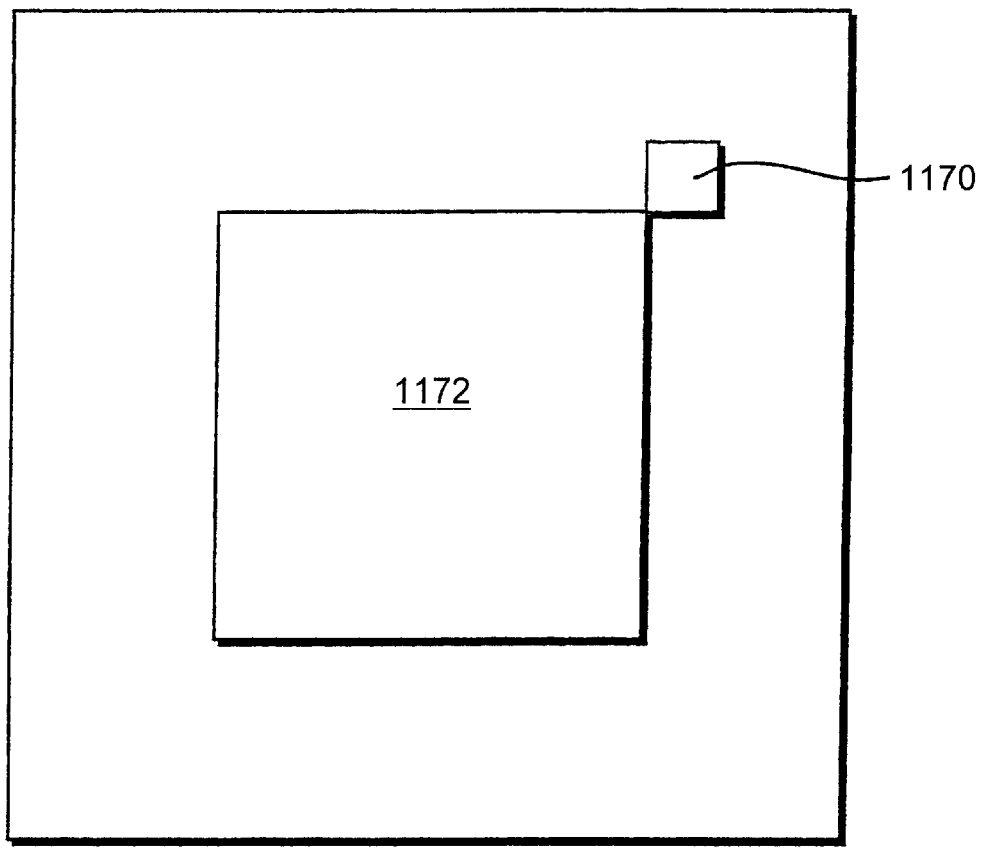
FIG. 15F illustrates a liquid crystal response time sensor array located just out side the active display.
Figure 15G:
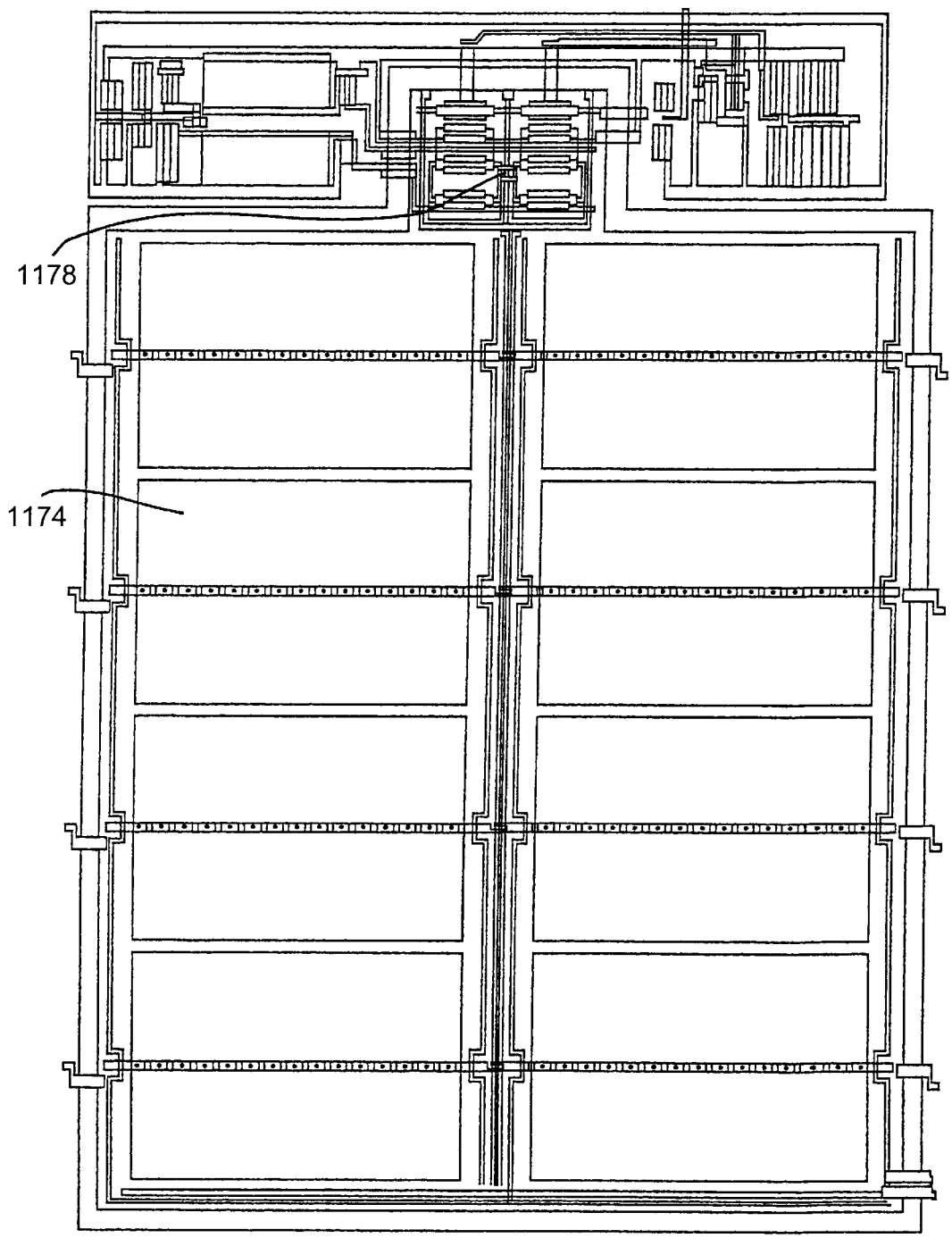
FIG. 15G is an enlarge view of the liquid crystal response time sensor array.

FIG. 15F illustrates a liquid crystal response time sensor 1170 located just of the active matrix display 1172 that is seen by the user. The liquid crystal response time sensor has a plurality of dummy pixels 1174, eight pixels in a preferred embodiment seen in FIG. 15G, and a sense amplifier 1178. The dummy pixels need not be the same size as those in the active area. In a preferred embodiment, the dummy pixels are created large enough to dominate parasitic capacitance effects, within area constraints of the microdisplay.

The eight pixels are divided into two sets of four dummy pixels. The voltages of the pixels are driven to $V_{HB}$ (high black), $V_W$ (white) and $V_{LB}$ (low black). In a preferred embodiment, in one set, two pixels are driven to $V_{HB}$ and one pixel to $V_{LB}$ and the other pixel is set to $V_W$. In the other set, two pixels are driven to $V_{LB}$, and one pixel to $V_{HB}$ and the other pixel is set to $V_W$. The liquid crystal is given a time period much longer than the anticipated response time, to allow the capacitance of the liquid crystal to settle. In a preferred embodiment, the time period can be in excess of 5 milliseconds.

When the capacitance is set, the two identical voltage dummy pixels of each set are set to $V_W$. Therefore in the first set, the two pixels with $V_{HB}$ are set to $V_W$ and in the other set, the two pixels with $V_{LB}$ are set to $V_W$. The pixels are held at this voltage for a specific time, the response period time to be checked. In a preferred embodiment, the time period can be in a range between 1 to 3 milliseconds.

After the time period, those pixels that were just set to $V_W$ are set back to the previous setting. Therefore, in the first set, the two pixel voltages are set to $V_{HB}$ and in the second set, the two pixels voltages are set to $V_{LB}$. The remaining pixel which had a voltage of $V_W$ is set to other black voltage setting (i.e., $V_{LB}$, $V_{HB}$). Therefore each set has two pixels set to $V_{HB}$ and two pixels set to $V_{LB}$.

This state is held for enough time for the pixels to charge electrically, but not so long that the liquid crystal begins to turn and the capacitance changes. In a preferred embodiment, this time period is approximately 1 microsecond.

In the final sensing phase, the driving voltages are removed from the dummy pixels and the four dummy pixels in each set are shorted together to allow charge sharing. A sense amplifier measures a voltage $\Delta V$, given by the equation below:

$$\Delta V = (V_+ - V_-) = (V_{HB} - V_{LB})\frac{(C_M - C_G)}{(C_M + C_G)}$$

wherein $C_B$=Black capacitance;

$C_W$=White capacitance;

$C_M$=Capacitance to measure; and $2C_G=(C_B+C_W)$.

The sign of $\Delta V$ indicates whether $C_M$ is greater or less than $C_G$. If $\Delta V$ is positive, then $C_M$ is greater than $C_G$, and the dummy pixels have completed less than half the transition from black to white. That is, the response time is greater than the period being checked. A negative $\Delta V$ indicates a response time faster than the checked period.

The preferred embodiment described above measures the off-time (black-to-white) transition time, because this is usually slower than the on-time. It is recognized that the method described above can be readily adapted to on-time measurement.

In addition to having a response time sensor, the microdisplay of a preferred embodiment has a sensor to determine if the liquid crystal is approaching the characteristic clearing temperature of the liquid crystal. The clearing temperature is likewise located just off the active display area. The capacitance of a white pixel and a black pixel converge as the liquid crystal approaches its characteristic clearing temperature.

In contrast to the response time sensor, the characteristic clearing temperature sensor does not have identical sized pixels. The sensor has two sets of dummy pixels, wherein each set has a pair of pixels. The areas of the two pixels in each pair differ by a ratio $\alpha$, where $\alpha$ is chosen to match the known ratio of the liquid crystal white-state and black-state capacitances for the temperature of interest. In each set the voltage of the larger pixel is set $V_W$ and the $\alpha$ pixel has a voltage of $V_{HB}$ in one set and $V_{LB}$ in the other set. Similar to the response time, the liquid crystal is given a time period much longer than the anticipated response time, to allow the capacitance of the liquid crystal to settle. In a preferred embodiment, the time period can be in excess of 5 milliseconds.

The next step is to precharge those pixels which have a voltage of $V_W$ to a voltage such that each set has one pixel at $V_{HB}$ and the other at $V_{LB}$. This state is held for enough time for the pixels to charge electrically, but not so long that the liquid crystal begins to turn and the capacitance changes. In a preferred embodiment, this time period is approximately 1 microsecond.

In the final sensing phase, the driving voltages are removed from the dummy pixels and the two dummy pixels in each pair are shorted together to allow charge sharing. A sense amplifier measures a voltage $\Delta V$, given by the equation below.

$$\Delta V = \frac{V_{HB} - V_{LB}}{\alpha C_B + C_W}(\alpha C_B - C_W)$$

The sign of $\Delta V$ indicates whether the ratio of the $C_W$ to $C_B$ is greater or less $\alpha$. If $\Delta V$ is negative, then the ratio $(C_W/C_B)$ is greater than $\alpha$, which means that the liquid crystal is nearing its clearing temperature.

One of the traits of liquid crystal that is desired is the long time constant which allows the image to be maintained without having to refresh in certain instances. Single crystal silicon using CMOS technology provides circuitry with extremely low leakage currents. In combination with high quality Liquid Crystal (LC) material the low leakage of the circuitry and extremely high resistance of the LC can produce long time constants. These time constants can be in the order of several minutes. Therefore, a residual image can be retained depending on the point where the scanning circuitry stops functioning during power offs.

Figure 16:
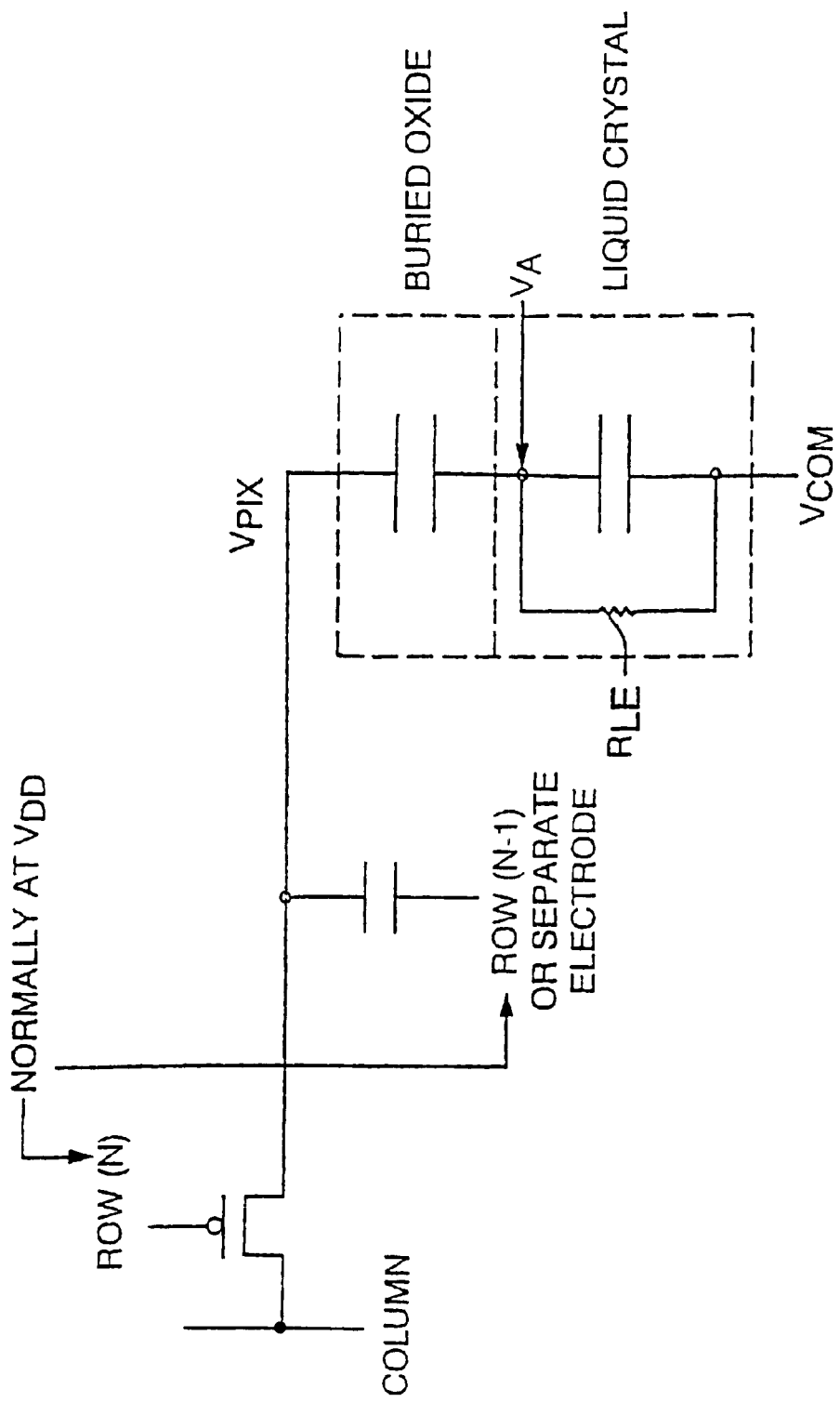
FIG. 16 illustrates a pixel element in a display.

A pixel element is illustrated in FIG. 16. The pixel element has a transistor (TFT) which is connected to the row line, which goes from normal $V_{DD}$ to 0 to allow the row to write. The video signal is received through the transistor from the column. The voltage of the pixel to the counter-electrode has a drop over the buried oxide, see FIGS. 7 and 11, which acts as a capacitor and over the liquid crystal, which acts as a resister and capacitor in parallel. In addition, the pixel electrode has a storage capacitor formed between the TFT and the previous row line.

Figure 17:
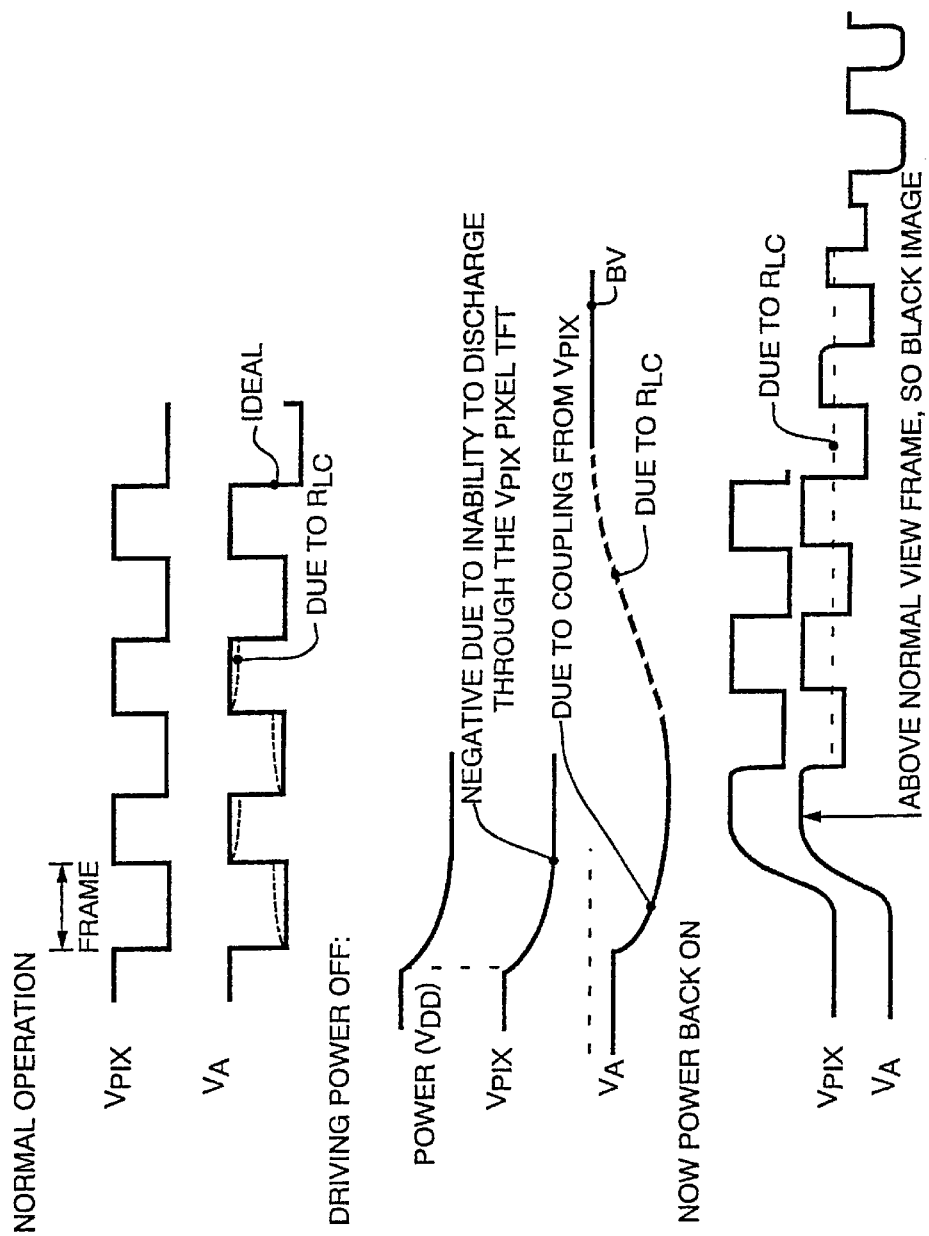
FIG. 17 is a graphical representation of voltage of the pixel electrode as power is turned off and back on in the prior art.

Referring to FIG. 17, in normal operation the voltage of the pixel is fluctuating. The voltage at the point $(V_A)$ between the buried oxide and the liquid crystal generally follows the pixel voltage, but is lower because of the drop across the buried oxide and drops because of the resistance of the liquid crystal ($R_{LC}$). When powering off, $V_{DD}$ drops to zero. The pixel voltage ($V_{PIX}$) is unable to discharge through the p-channel pixel TFT and drops. VA which is coupled to $V_{PIX}$ drops likewise. If a sufficient time transpires, VA will return to zero due to the $R_{LC}$.

However, if the power is turned back on to the display prior to the natural discharge time, a portion of the image may be seen for several seconds. $V_{PIX}$ goes positive when the power comes on and since VA is coupled it goes positive above and creates a black image. VA returns to normal in several minutes due to $R_{LC}$.

Figure 18:
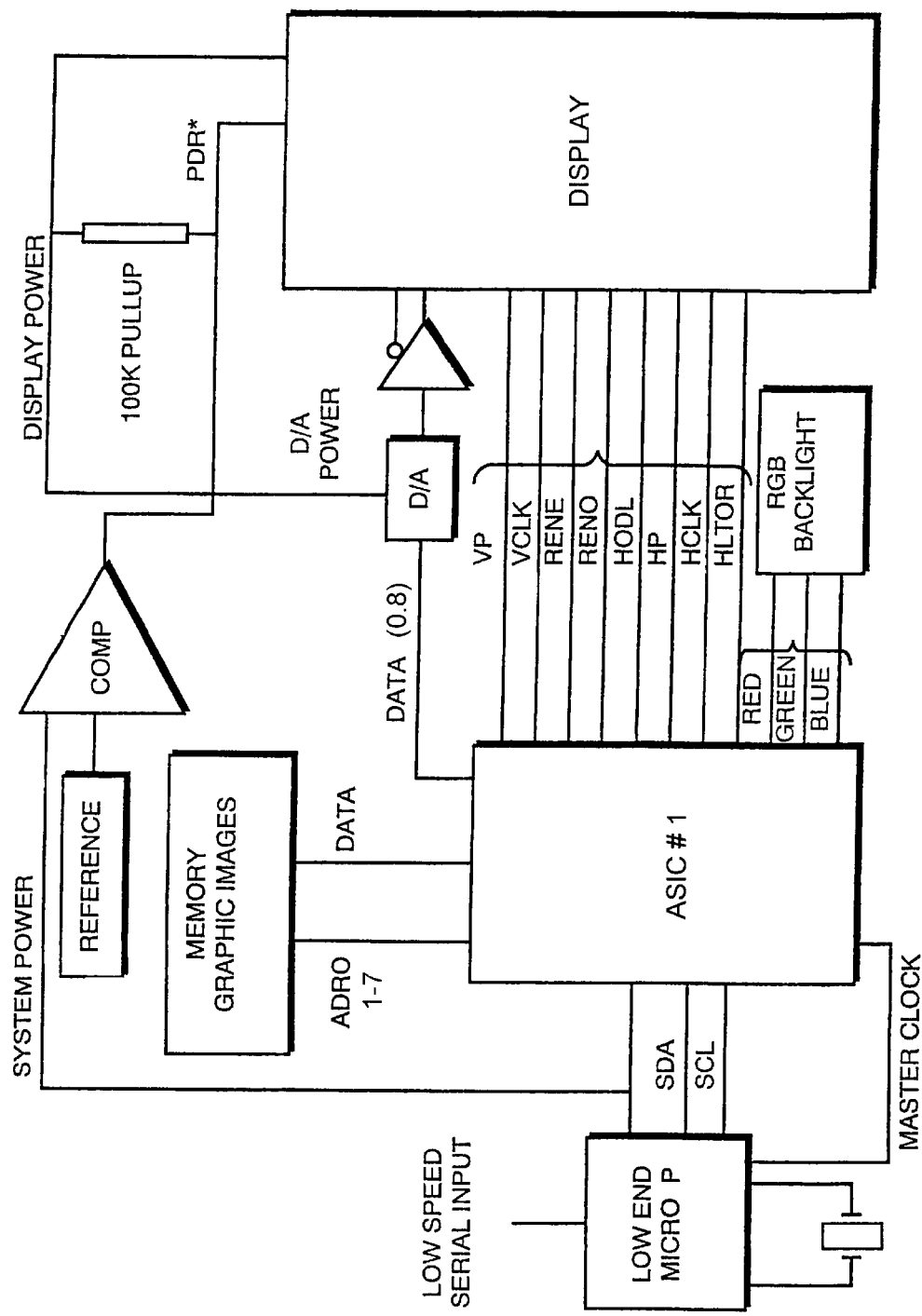
FIG. 18 illustrates a preferred embodiment of display control circuits in accordance with the invention.

A display circuit is illustrated in FIG. 18. In this embodiment, a digital circuit 120 is used to control color sequential display operation. The processor 134 receives serial digital image data at 121 and sends display data to memory 124. The timing control circuit 122 receives clock and digital control signals from processor 134 and transmits control signals to the backlight 111 and display 112 along lines 115, 116, 117, and 118, respectively. Lines 128 direct ready, reset, write enable, output enable, color enable, address and data signals to memory to control delivery of image frames to the display 112.

An analog comparator samples the voltage of the main power in real time. When the voltage drops below the level to run the circuit plus some margin, a reset signal (PDR*) is asserted low. On receipt of the PDR* signal the display circuitry will place VDD on all the column lines, see FIG. 2A, and activates all the row lines. The normal timing continues for two or more cycles, therein sequentially activating all the even and odd rows. This clocks the VDD signal on the column lines into every pixel.

Referring back to FIG. 16, VDD will also charge the pixel storage capacitor. In normal operation, the opposite side of the storage capacitor is connected to the previous row line. By activating all the even row lines, (i.e., driving them low) and not the odd row lines (i.e., maintaining high), the storage capacitors on the even rows will be discharged to 0 volts. (VDD is high logic level). On the next cycle the odd rows storage capacitors will be discharged. Because the storage capacitor is several times larger than the pixel capacitor, the voltage on the storage capacitor will then discharge the pixel capacitor to 0 volts. At this point the display can be de-energized without any residual charge left on either the storage or pixel capacitor.

Figure 19:
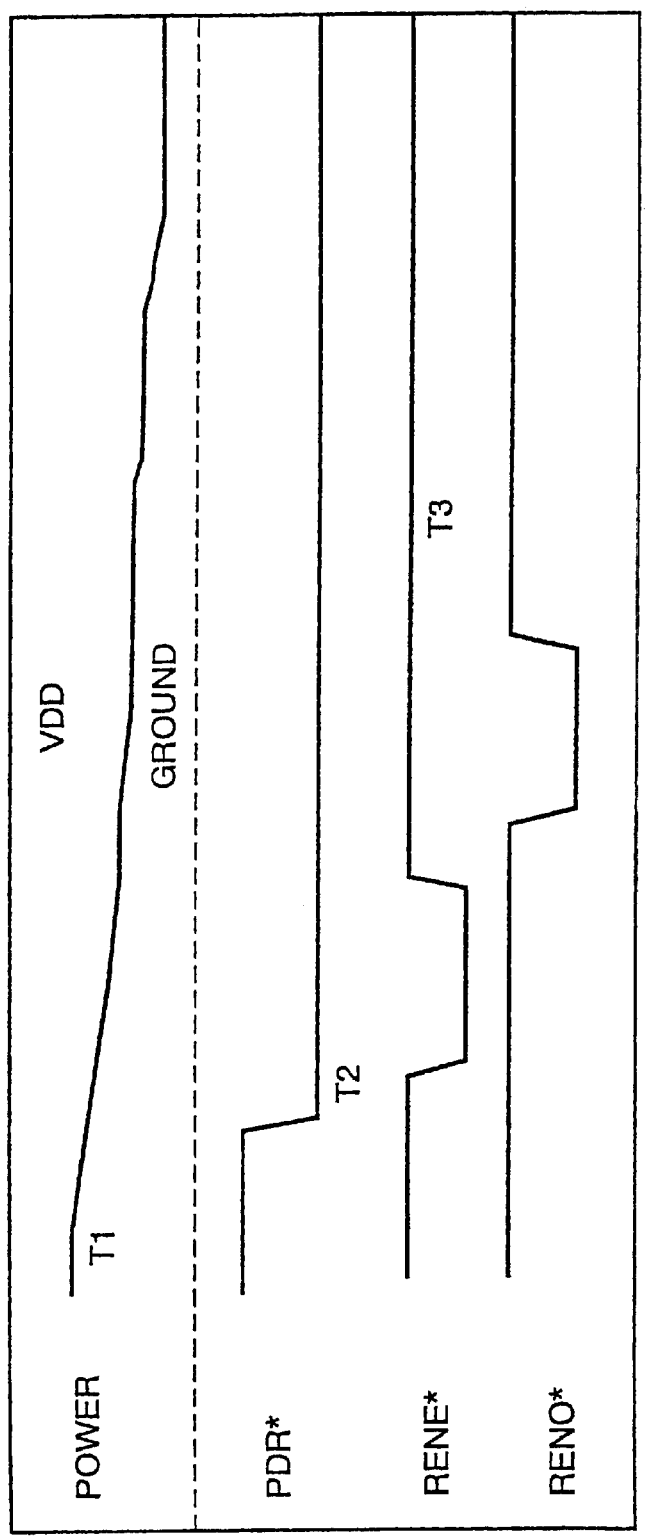
FIG. 19 is a graphical representation of the control signal as power is turned off in accordance with the invention.

FIG. 19 illustrates a timing diagram. The system power is turned off at time T1 and shown as a classical discharge as the logic continues to run powered by the bypass capacitors. The comparator senses the threshold voltage level and asserts the PDR* low, at time T2. The additional row enable signals are then asserted and completed at time T3. Non additional logic or signals are required after T3 and the power is allowed to randomly discharge. The power down reset will work with column inversion and $V_{COM}$ modulation displays.

Figure 20:
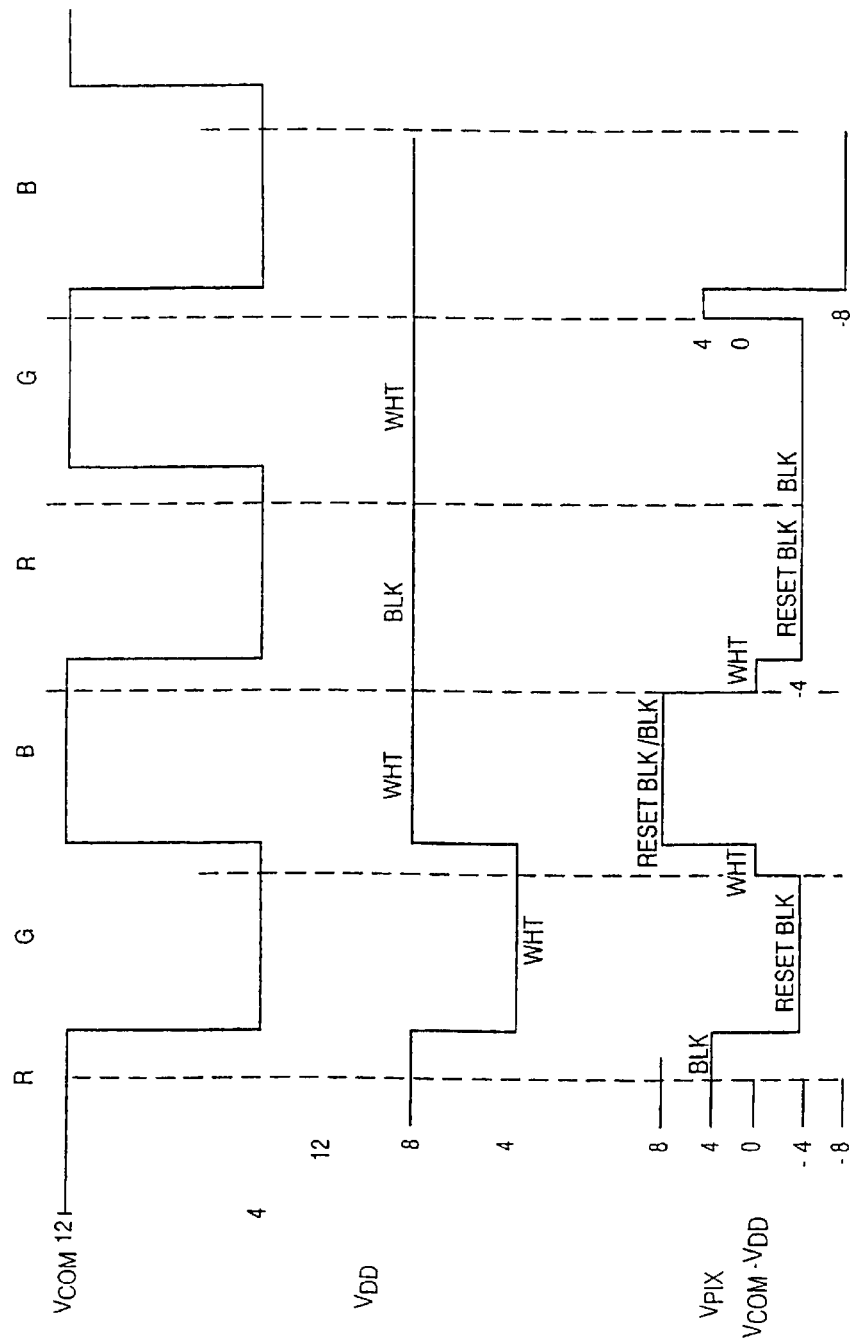
FIG. 20 is a graphical representation of a higher voltage $V_{COM}$ reset.

FIG. 20 illustrates a pixel reset having a greater fluctuation of $V_{COM}$ therein resetting the pixel to black in every instance. The $V_{COM}$ has twice the swing of the source voltage. By switching $V_{COM}$ and the video signal after each frame or subframe, a white pixel is reset to black, but a black pixel is also reset to black. The resetting of the $V_{COM}$ changes the base or common ground voltage for the pixel. Therefore if $V_{COM}$ is 12 volts and the pixel is driven to 4 volts, a 8 volt differential results and the liquid crystal is black, and then $V_{COM}$ is set to 4 volts, there is −4 volt differential and pixel is reset to black. Likewise if $V_{COM}$ is 4 volts and the pixel is allowed to go to $V_{COM}$, a 0 volt differential results and the liquid crystal twists to white, and then $V_{COM}$ is set to 12 volts, there is now an 8 volt differential and the pixel is reset to black/black, an over-driven black.

It is recognized that an alternative method for resetting is to address each pixel individually to reset the liquid crystal. This is be done in a method similar to the heat cycle.

The embodiments of the color active matrix display described above can be used in various products including wireless communication devices such as pagers, described below, docking stations and cellular telephones, and other devices such as card readers, described below, and digital cameras.

Figure 21A:
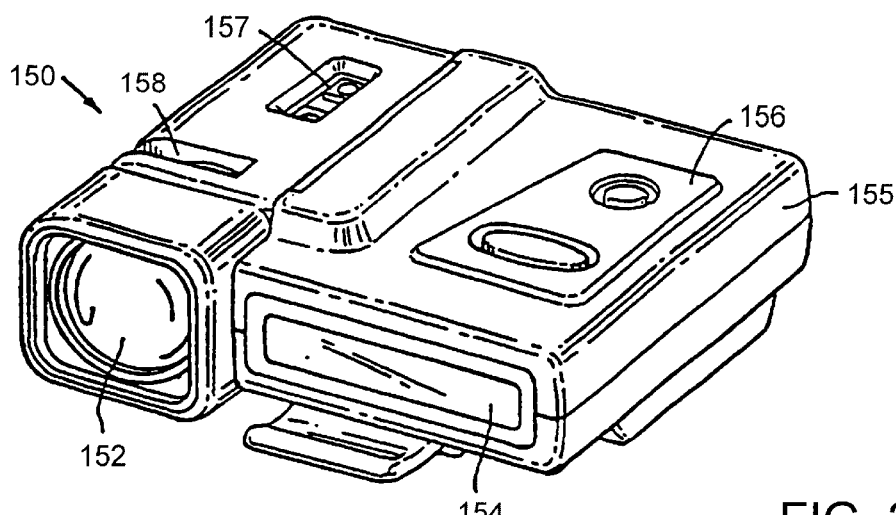
Figure 21C:
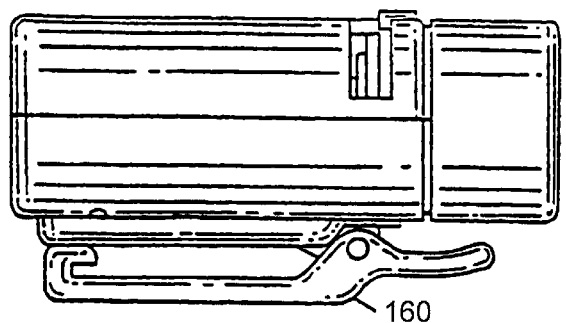
Figure 21B:
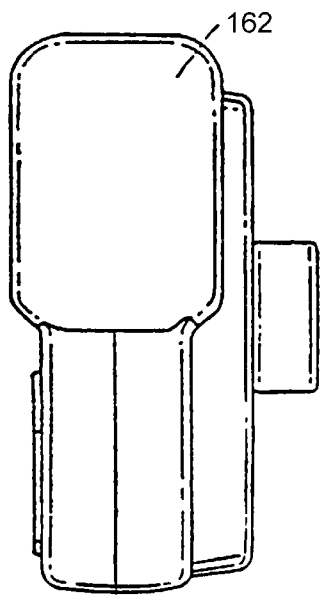
Figure 21D:
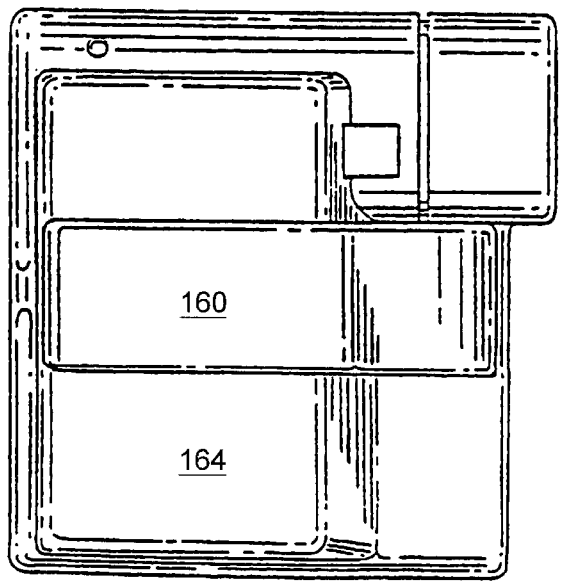

Preferred embodiment of hand held display devices are illustrated in connection with FIGS. 21A–21K. FIG. 21A is a perspective view of a preferred embodiment of a pager system 150 having two display viewing areas 152 and 154 within a housing 155. Viewing area 152 has a lens through which the user views a microdisplay as described previously. A second flat panel display without magnification is viewed by the user at the viewing area 154. The second display is a simple low resolution numeric and/or alphabetic display to read telephone numbers or scrolled numbers or messages. The microdisplay magnification can be adjusted at switch 158. The displays are operated by switches 156, 157. As seen in the rear view of FIG. 21B, the rear surface 162 of the housing 155 is thicker in that portion containing the microdisplay and the battery. In the alternative embodiment illustrated in FIG. 22, the rear panel 162 is removed to expose the cavity 159 for the battery and the rear of the display assembly 161. Also shown in this embodiment is a cover 163 which slides to cover or expose a camera including an image sensor 166 and lens 167. The digital imaging sensor 166 can take images electronically stored within a memory within the pager that can be sent by wireless transmitter to a personal computer, a telephone as described herein, or web browser. The images can also be loaded by wire through the port 169 onto a personal computer, or alternatively, can be loaded onto a smart card or flash memory card that can be inserted into one or more card slots 168. The port 169 can also be connected directly to a keyboard or touchpad as described herein. The sideview of the housing 155 shown in FIG. 21C illustrates a clip 160 that is used to fasten the device to the clothing of the user. The clip 160 is attached to the bottom surface 164 of the housing 155 as shown in FIG. 21D.

Figure 21E:
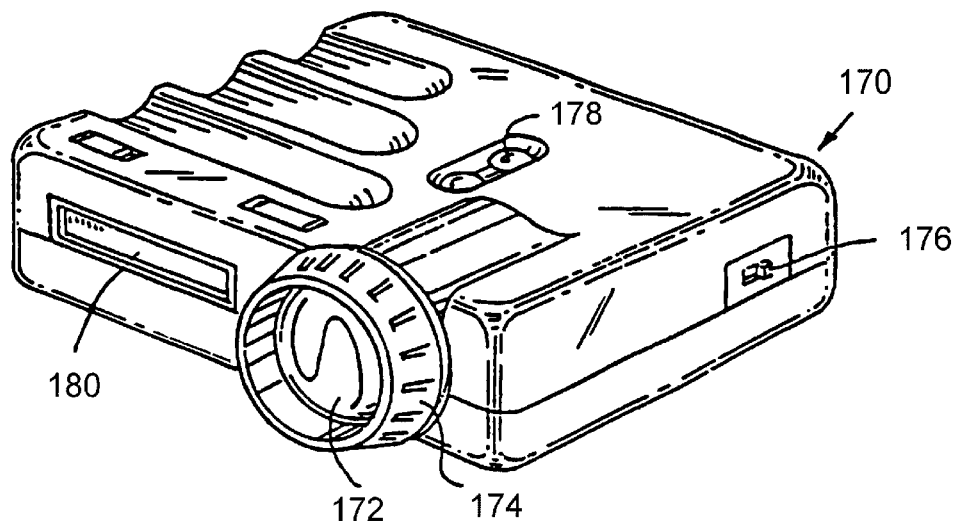
Figure 22:
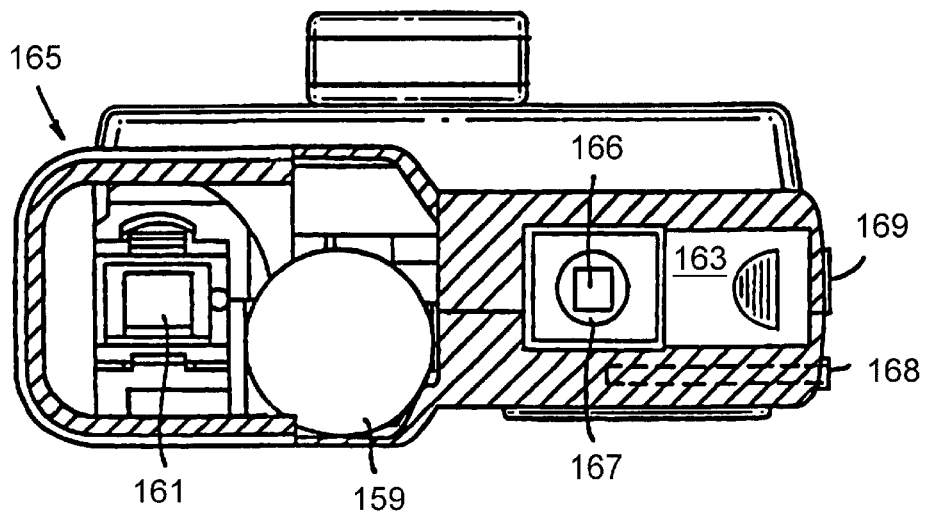
FIG. 22 is a partial cross section rear view of a pager with integrated camera.

Another preferred embodiment of a hand-held viewing device 170 is illustrated in the perspective view of FIG. 21E. A first display is seen through the lens 172 with magnification being adjusted by the knob 174. A second display 180 as described above is positioned on the same side of the device 170 as the lens 172 for ease of viewing. The displays are operated by the switch 176 and buttons or control elements 178. A top view is illustrated in FIG. 21F showing ridges 184 that accommodate the fingers of the user and the second display switch 182, which is shown more clearly in the side view of FIG. 21G.

Rear and bottom views of the device 170 show the rear 188 and bottom 186 sides in FIGS. 21H and 21I, respectively.

Figure 21J:
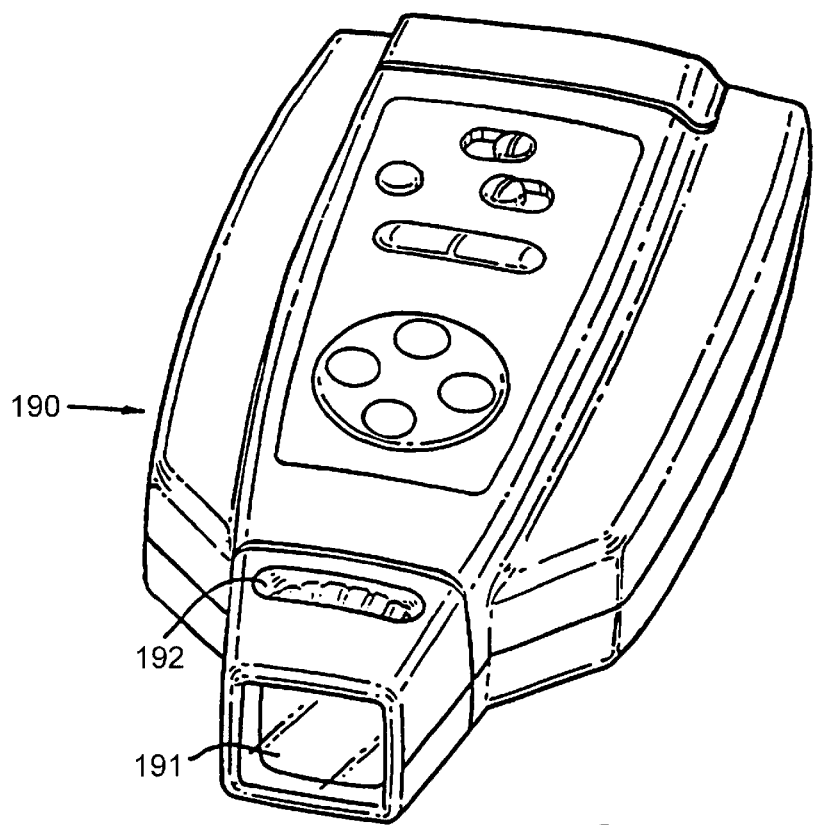
Figure 21K:
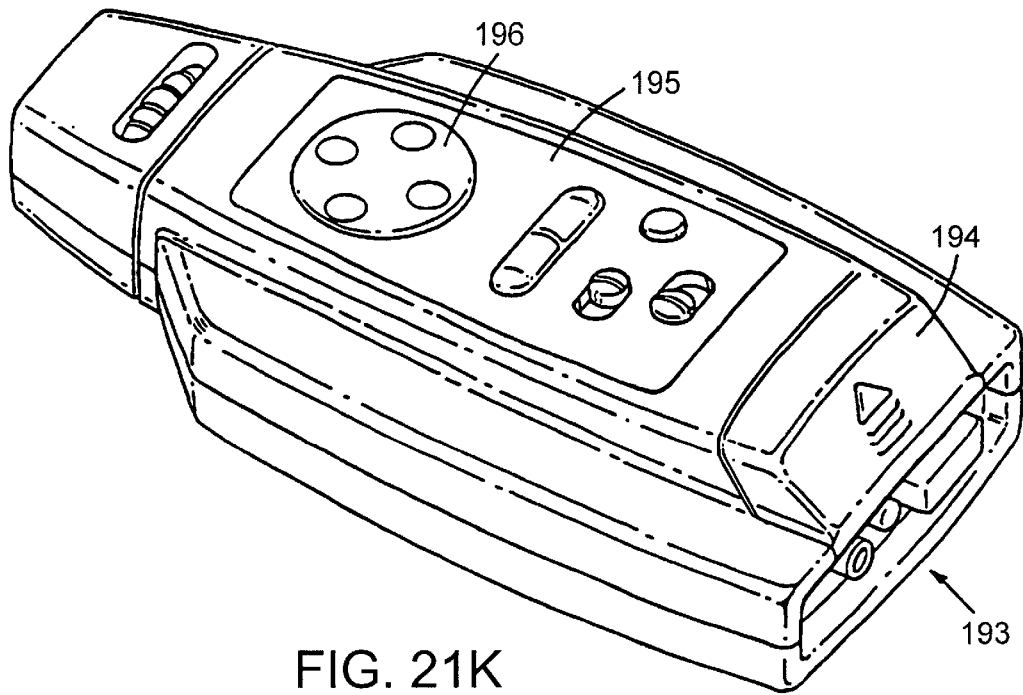

Another preferred embodiment is illustrated in the perspective views of FIGS. 21J and 21K. In the embodiment, a hand held unit 190 has a viewing window 191, a focus control 192, a rear panel 193 with an external port, a battery access panel 194, and a control panel 195 with control elements including a scan control element 196 to move text or the image on display up or down and left or right.

Figure 23A:
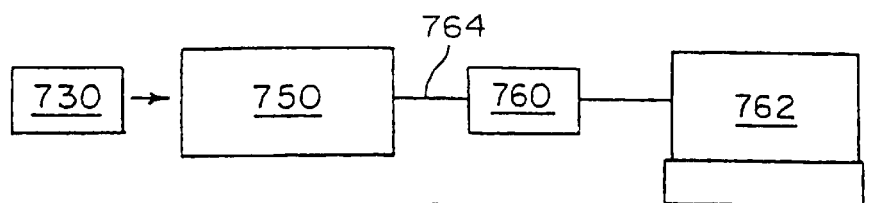
FIG. 23A illustrates a preferred embodiment of a card reader system.

As illustrated in FIG. 23A, the card reader 750 can be connected by wireless modem, telephone or other cable link 764 to an interface 760 such as a personal computer (PC) card to a general purpose computer 762.

Figure 23B:
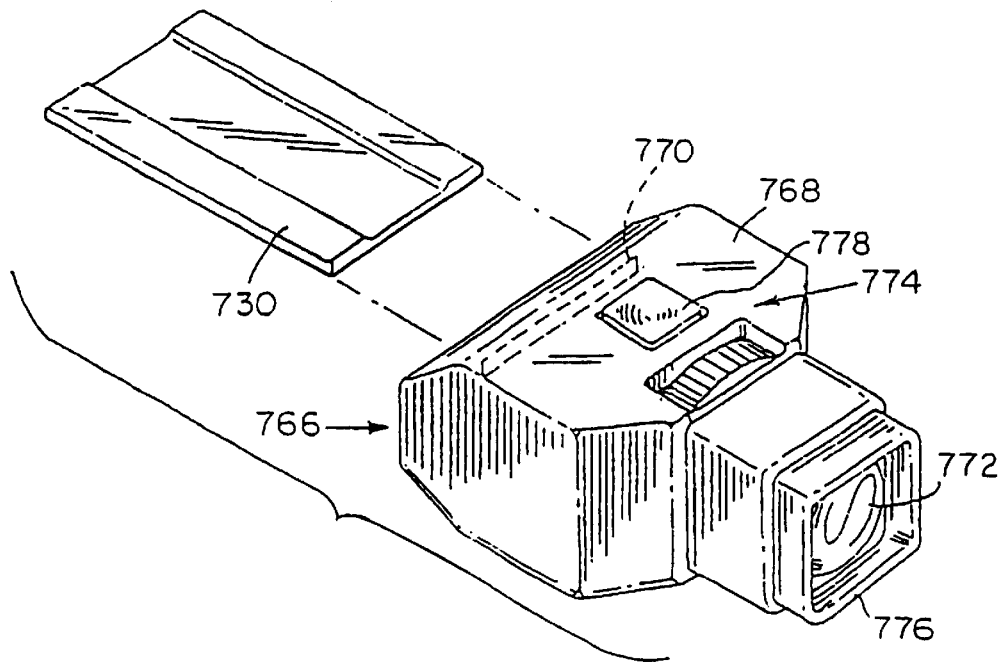
FIG. 23B shows a card reader system.

Another embodiment of the card reader system 766 is illustrated in FIG. 23B. The system includes a housing 768 with a port or aperture 770, shown in hidden line, for insertion of the card 730, or at least that portion of the card that contains the interface, a display system 772 for presenting information to the user, and a control panel 774 that controls reader operation. Similar to the previous embodiment, the system 766 has a card reader, a control circuit, and a internal battery as described previously. The display system 772 can include the color sequential display module as described previously herein and is shown in actual size.

As shown in FIG. 23B, the reader housing 768 has a viewing window 776. The user manipulates the control elements or buttons on a control panel 774 of the reader housing 768 to operate the system. The elements can include an on/off switch 778 and a four way element to scroll the display up, down, left or right.

The card reader system can be used to access or change the data stored on the card or select an option from choices provided through a PCMCIA modem. The user can change the data or make the selection using a four way element 710 and a select button 716.

Figure 24A:
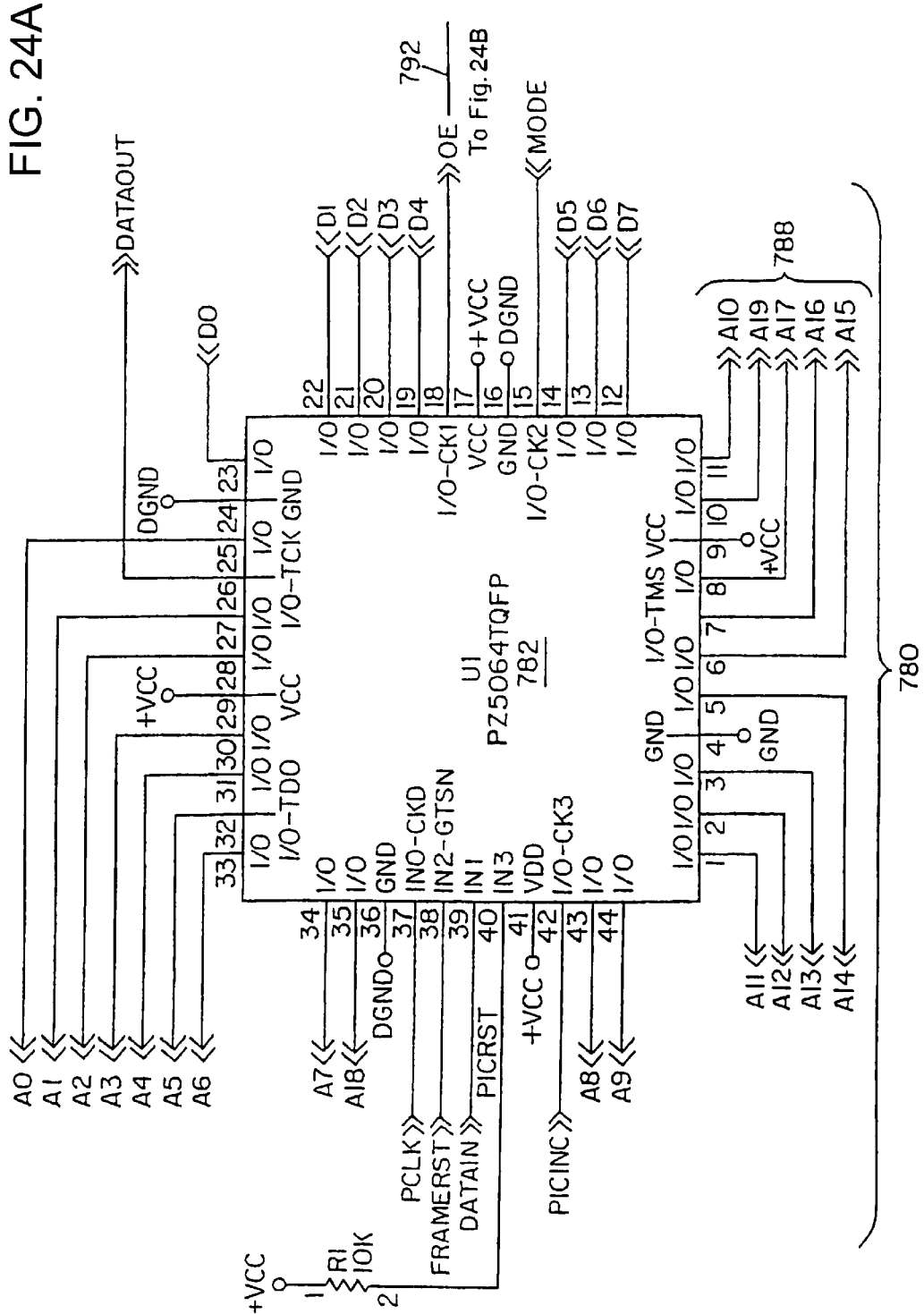
FIGS. 24A–24B is a schematic circuit diagram of a memory card for a card reader or imager.
Figure 24B:
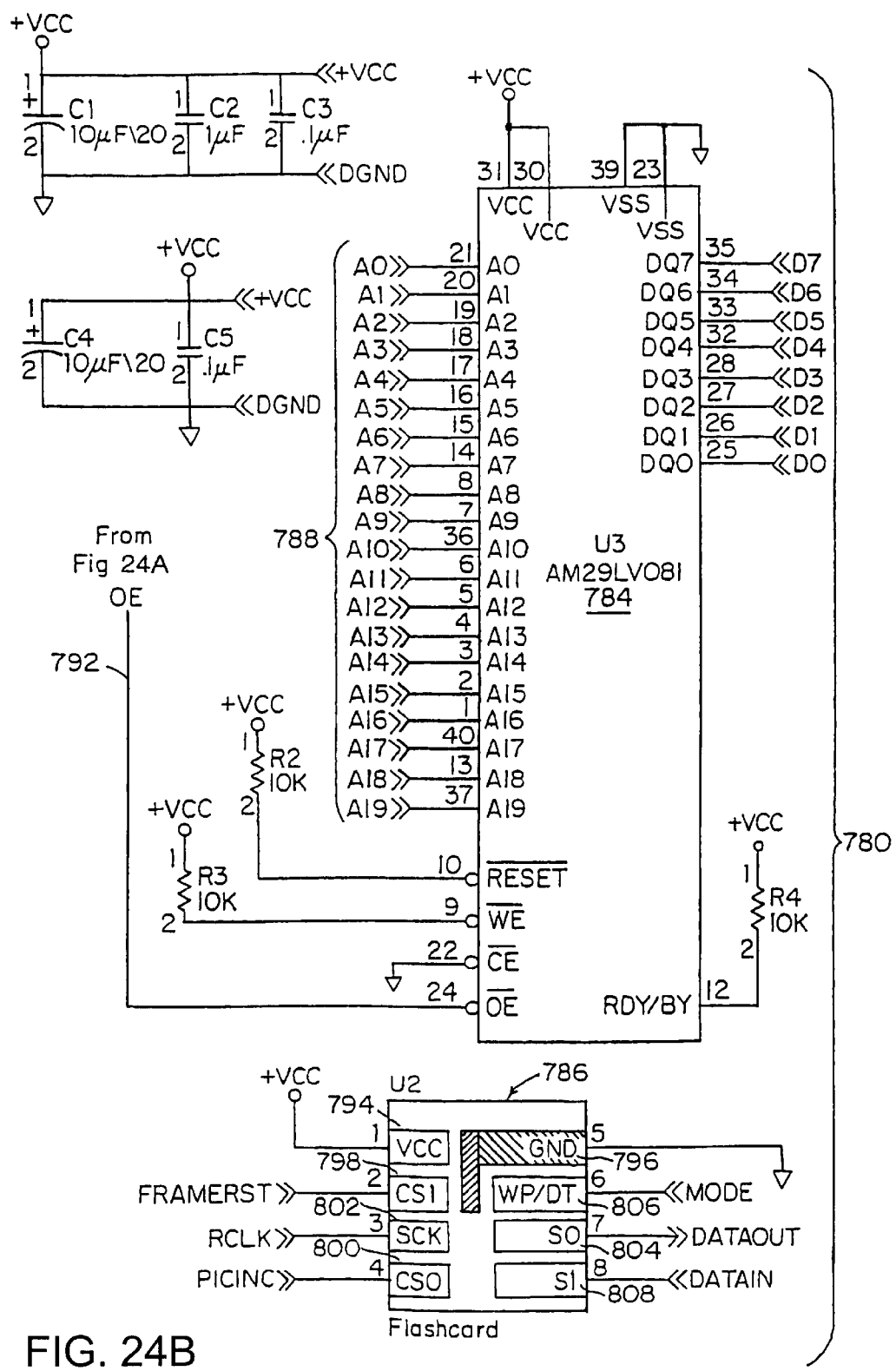

FIGS. 24A–24B disclose a schematic of an embodiment of a circuit 780 for the card 730. The circuit 780 has a control chip 782, a memory chip 784, and an interface chip (flashcard) 786. The control chip 782 takes the images stored on the memory chip 784 and sends the signal to the interface chip 786. The control chip 782 and the memory chip 784 are connected by both address lines 788 and data lines 790. In addition, an output enable (OE) line 792 extends between the control chip and the memory chip to allow the card 730 both to be read and to store data. The control chip 782 takes the image and sends the image in a series of bits to the interface chip 786.

The interface chip 786 has eight connection points 794, 796, 798, 800, 802, 804, 806, and 808 for interacting with an interface connection 816, as illustrated in FIG. 19D, on the card reader 750. The card 730 receives power (voltage) and is grounded through the connections 794 and 796 made on the interface chip 786. The card receives a frame reset signal through a frame reset connection 798 to allow the control chip 782 to know when to send the next frame. A picture increment signal sent through a picture increment connection 800 allows the control chip 782 to shift addresses to another stored picture. A clock signal to the control chip from the clock connection 802 regulates the flow of data. The control chip 782 sends a bit of data for each clock pulse and waits for a signal before starting the next row. The image signal is sent from the memory 784 through the control chip 782 to a data out connection 804 to the card reader 750. The mode input 806 is used to switch between a read and a write mode. The data in connection 808 is for writing data to the memory.

Figure 25A:
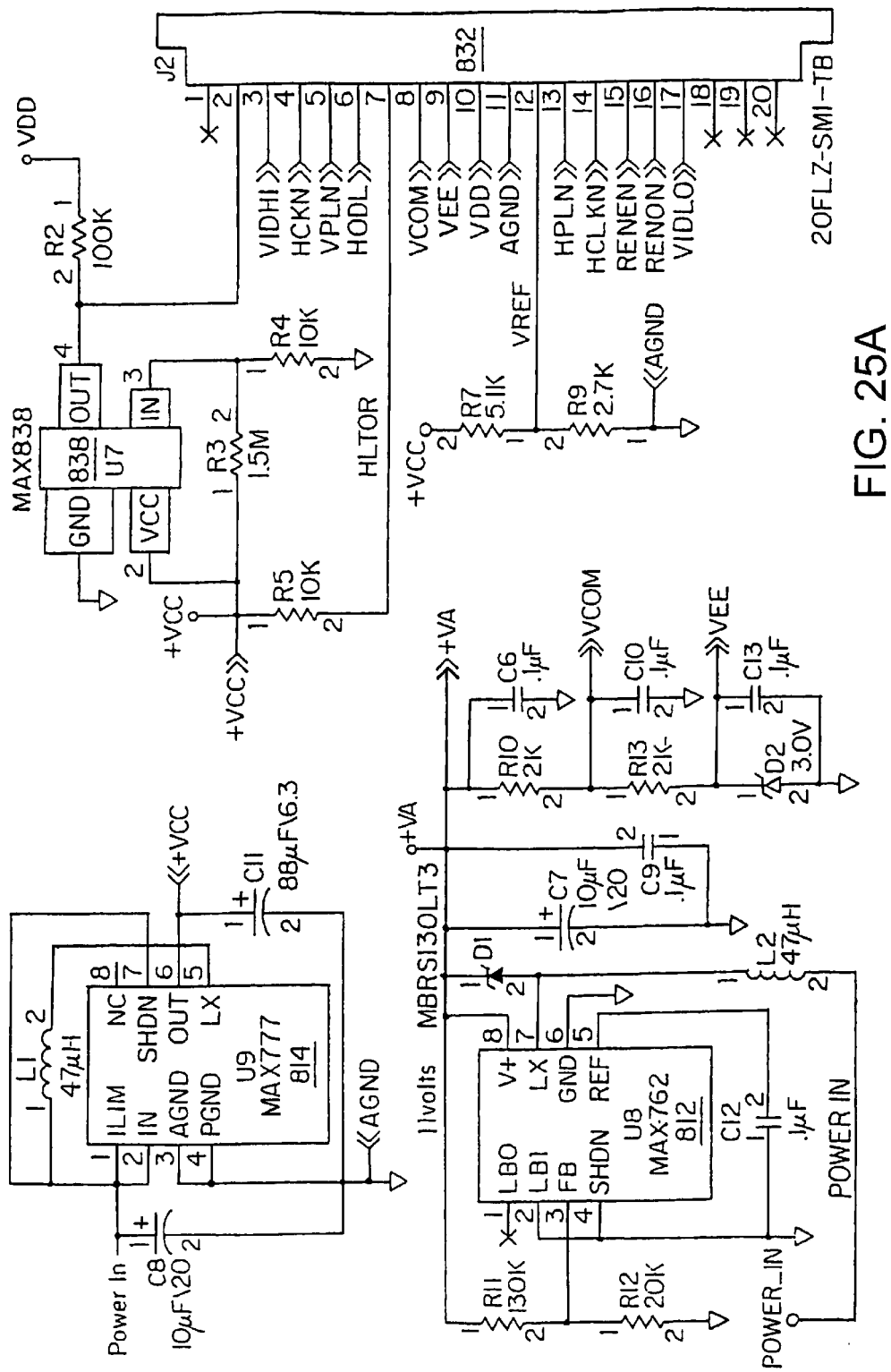
FIGS. 25A–25C is a schematic circuit diagram of the controller within the reader or imager.
Figure 25B:
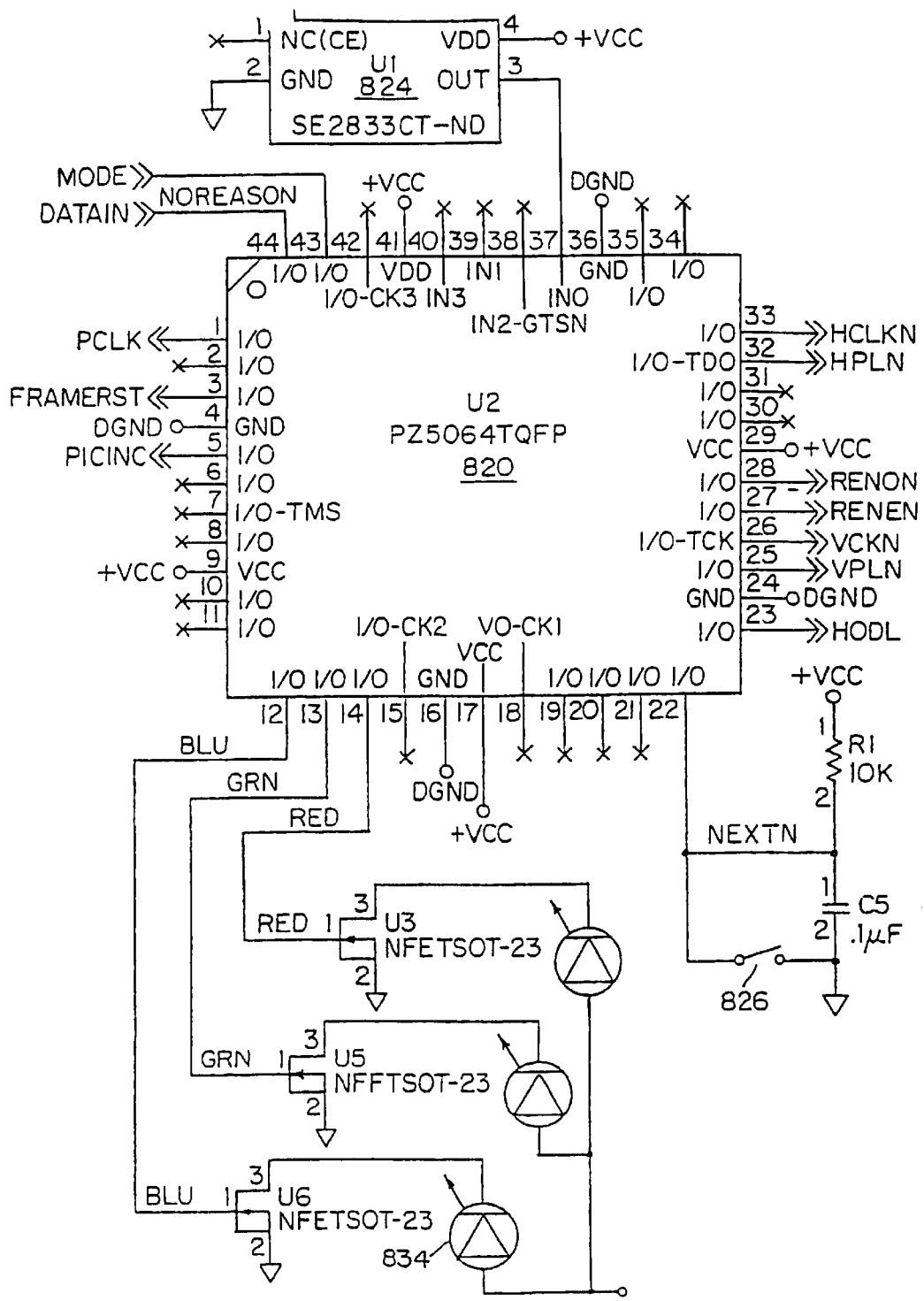
Figure 25C:
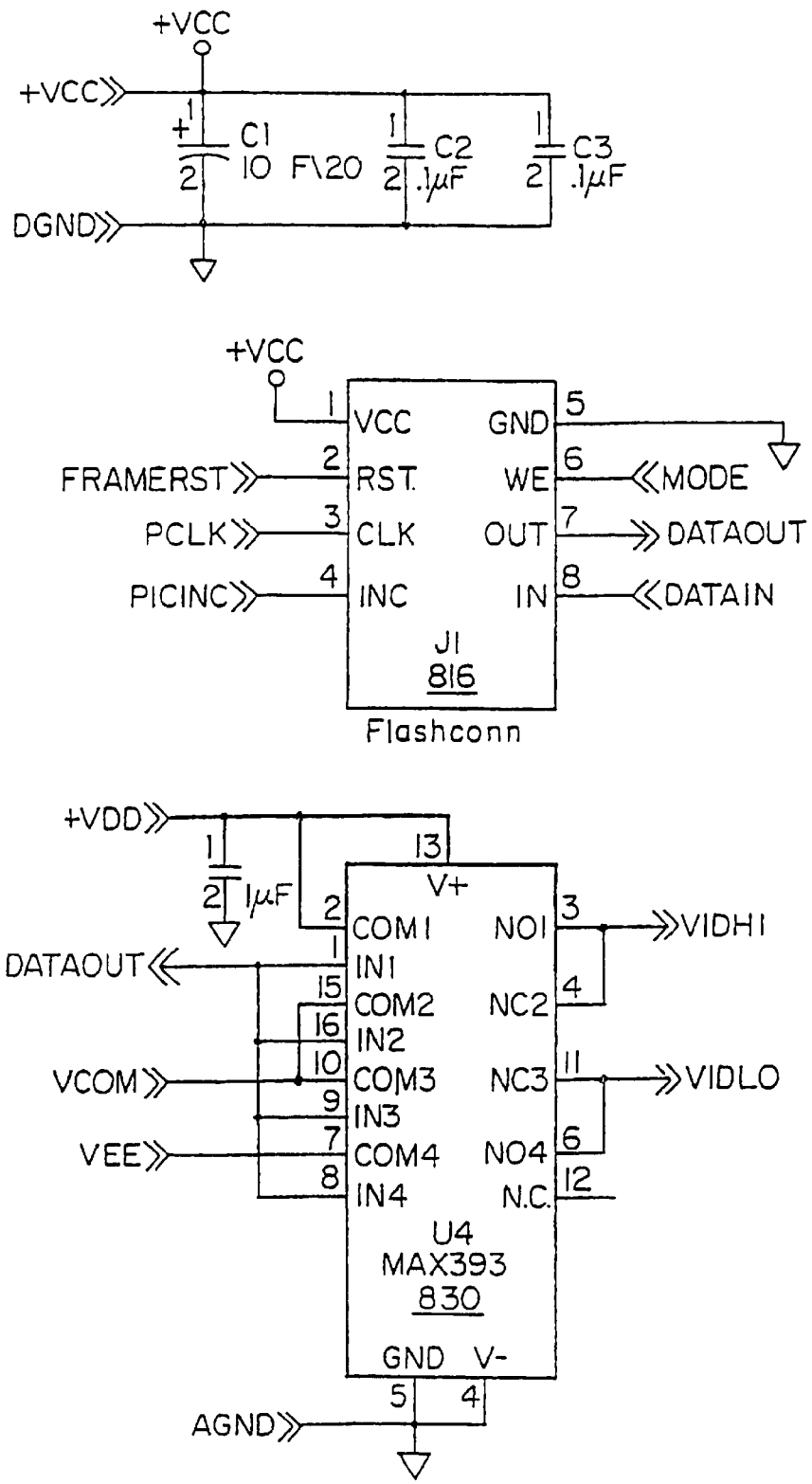

FIGS. 25A–25C illustrate a schematic of a display control circuit 810 in the card reader 750. The display control circuit 810 has a battery, which through a digital power supply 812 and an analog power supply 814, powers the circuit 810 as represented in FIG. 25A. The flash connection 816 of the card reader 750 is the interface with the flashcard 786 of the card 730. The flash connection 816 sends the signals and power described above including the clock, the frame reset and picture increment from a control chip 820. The control chip 820 receives its clock signal from a 20 MHz clock chip 824. The picture increment is set high by a switch 826, which is physically connected to a button on the control panel 774 of the reader housing 768.

The data signal from the card 730 through the flash connection 816 is sent to a switch circuit 830 which sets the signal high ($V_{DD}$) or low ($V_{COM}$) depending if the signal is a high bit (1) or a low bit (0). The video signal is sent from the switch to a connector, which connects to the microdisplay. The connector in addition sends the control signals from the control circuit and power to the microdisplay. The LEDs for the backlight are controlled each by a transistor and a signal from the control chip.

The circuit in addition has a power down reset circuit. The power down reset circuit sends a signal to the microdisplay to clear the image before the power is off.

Figure 26:
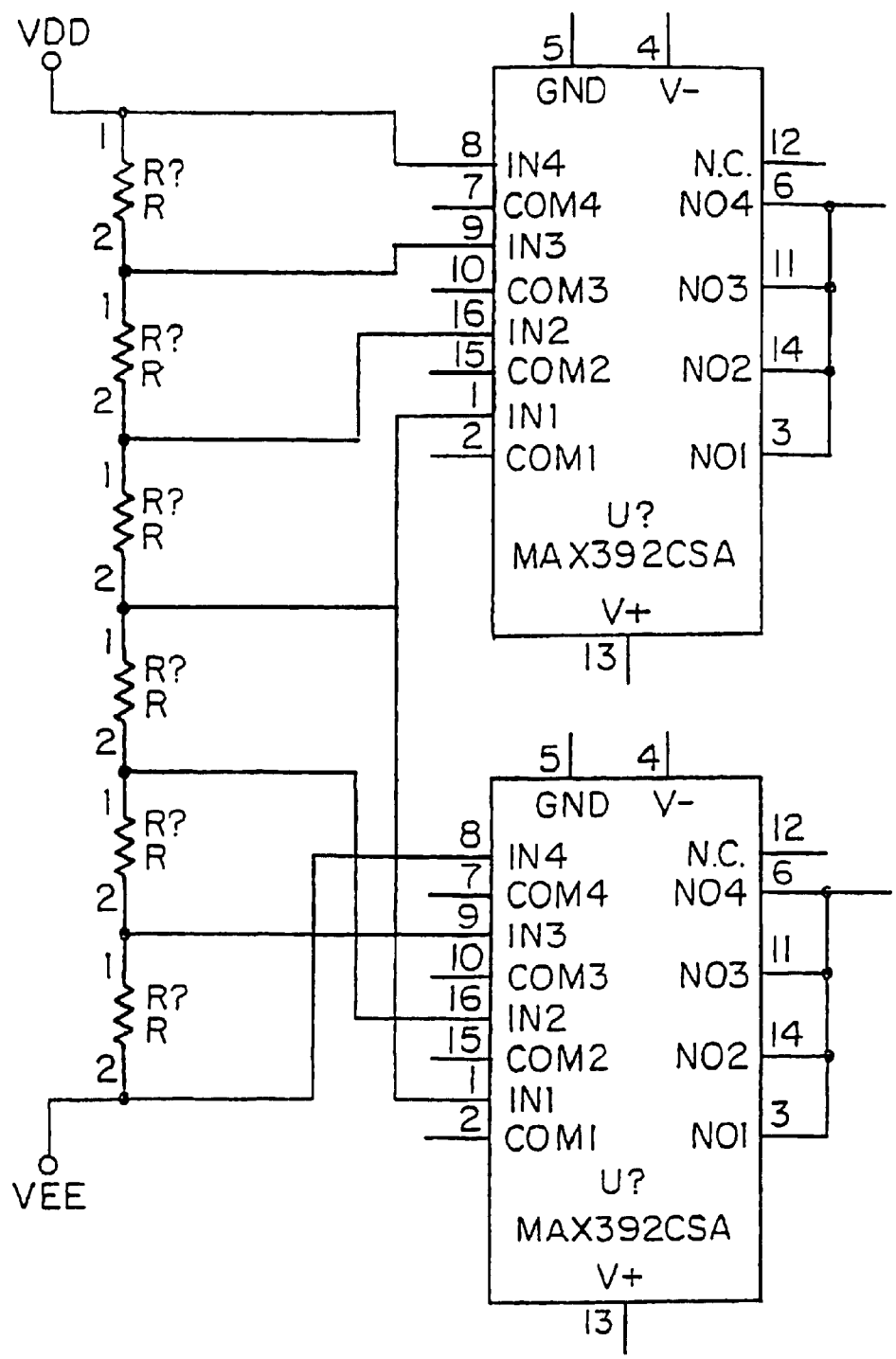
FIG. 26 is a schematic circuit diagram of an alternative embodiment of a switcher in the controller.

FIGS. 25A–25C represent a 1 bit color display control circuit which displays eight colors (red, blue, green, black, white, magenta, cyan, and yellow). By selecting varying voltages between $V_{EE}$ and $V_{DD}$ and having two switches as illustrated in FIG. 26, a 2 bit color display control circuit having 64 colors is possible. It is recognized that a greater number of colors is desired, but for items such as pagers and cellular telephones, the wireless transmission rate may limit the bits available for transmitting image data. With these limited transmission rates the available number of colors for display is reduced until better compression systems and transmission rates are available. With limited colors because of transmission rates, a switch chip is preferred to a video processor because of power requirements. For items such as cameras and other products not including wireless transmission 8 bit color displays having 16 million colors are preferred.

The display module shown in FIG. 23B can be equipped with an antenna and television receiver to provide a pocket size color television.

Figure 27A:
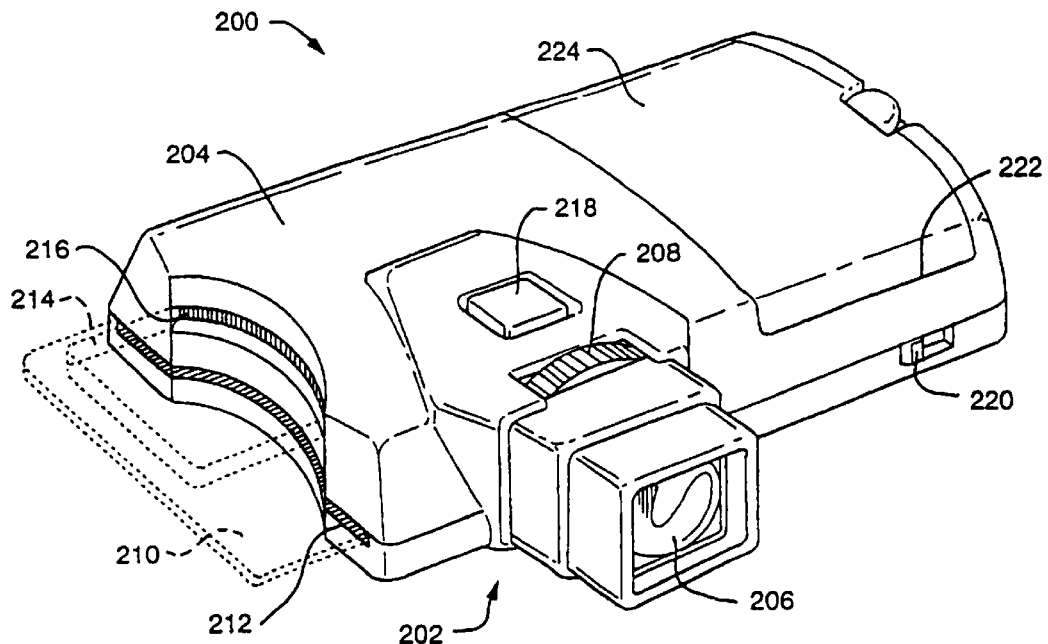
FIG. 27A is a perspective view of a portable display system.

A portable display system 200 is shown in FIGS. 27A–27E. FIG. 27A is a perspective view of a preferred embodiment of the portable display system 200 having a display viewing area 202 within a housing 204. The viewing area 202 has a lens 206 through which the user views a microdisplay as described previously. The microdisplay magnification can be adjusted using a knob 208 located on top of the housing 204.

The portable display system receives the information for the image it is going to display from either a smart card 210, shown in phantom, which can be inserted in to a slot 212 in the housing 204 of the portable display system 200 or a memory card 214, shown in phantom, which is inserted in to a second slot 216 in the housing 204.

The image is selected using a switch 218 located on top of the housing 204 in proximity to the magnification knob 208. The display system 200 is turned on and off with a switch 220 accessible through an opening on the housing on the front of the display system. The display system has an opening 222 to receive an rechargeable battery 224.

Figure 27B:
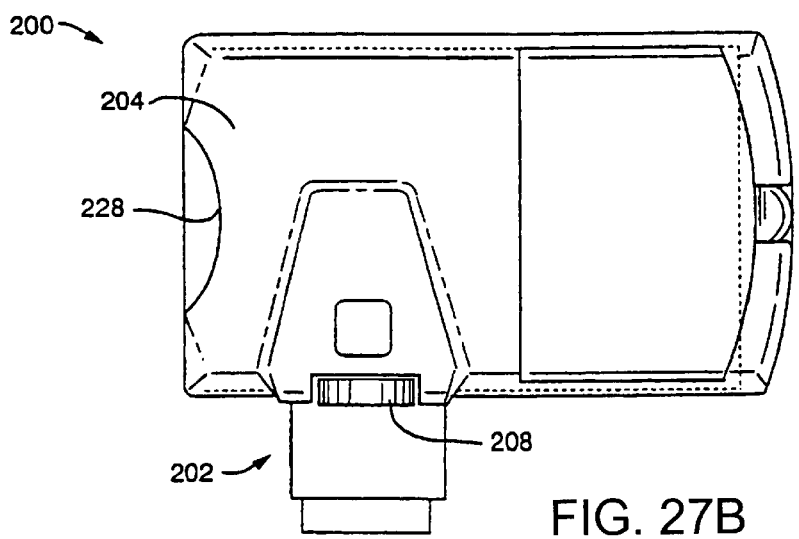
FIG. 27B is a top view of the portable display system.

As illustrated by FIG. 27B, the size of the portable display system 200 is defined predominately by the size of the smart card 210, which is shown in hidden line inserted in the portable display system 200. A small portion of the smart card extends out of the housing 204 to allow removal of the card. The smart cards, having credit card dimensions (i.e. about 3⅜ inches by 2⅛ inches, or about 85.6×53.98×0.76 mm). The housing material 204 in a preferred embodiment is approximately 4 inches by ½ inches by 1 inch. The battery has a clasp to secure it to the housing.

Figure 27C:
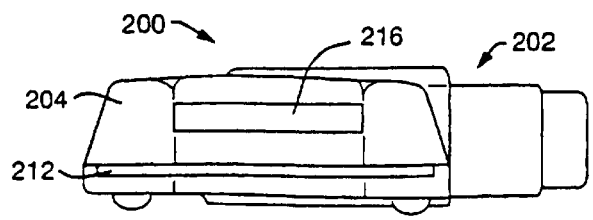
FIG. 27C is a side view of the portable display system.

Referring to FIGS. 27B and FIG. 27C, the housing 204 has a curved face 228 around the openings, slot 212 and 216, for receiving the smart card 210 and the memory card 214 so that a small portion of each extends out of the housing 204. The memory card 214 is narrow and thicker than smart card 210.

Figure 27D:
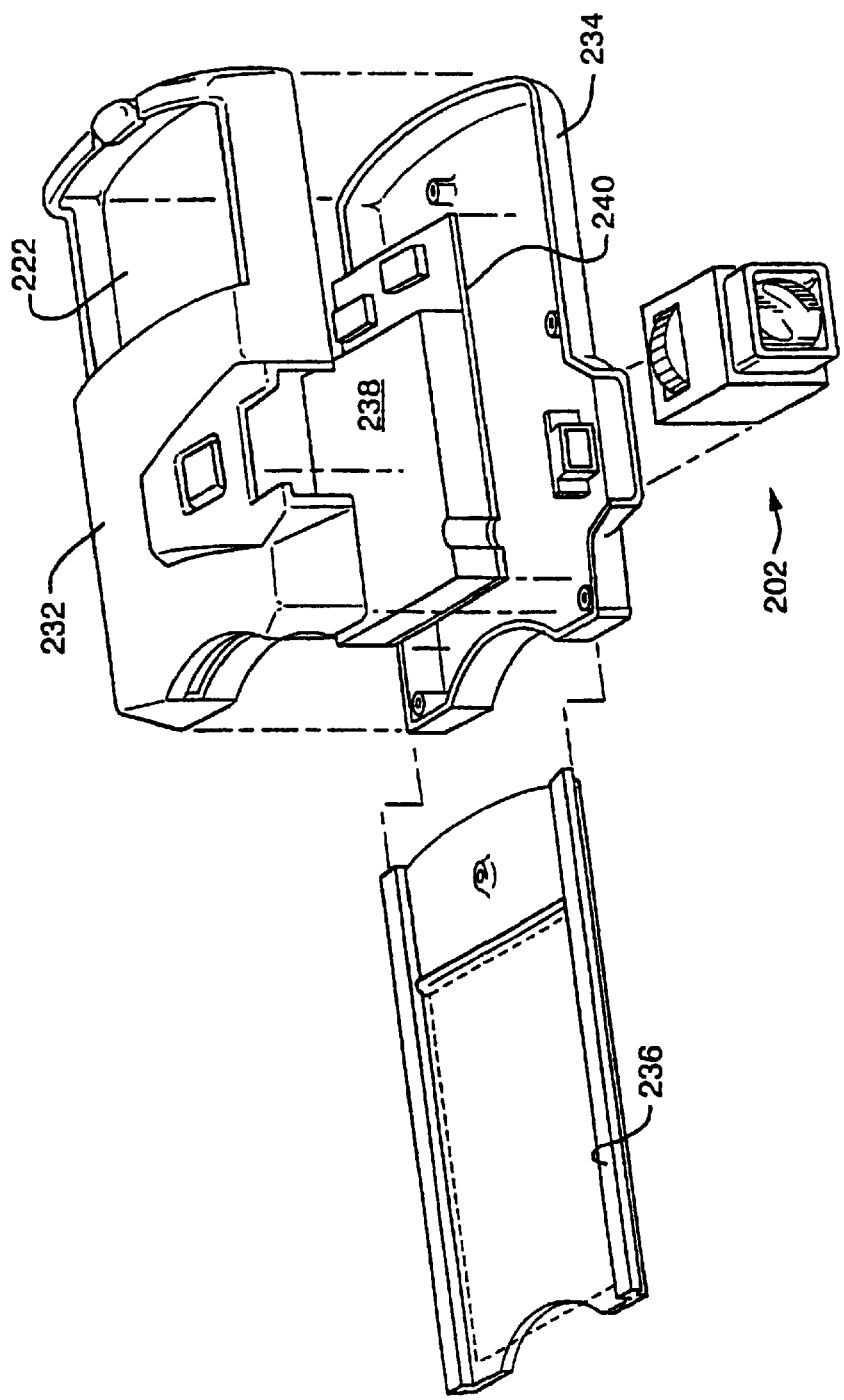
FIG. 27D is an exploded view of the portable display.

An exploded view of the portable display system 200 is shown in FIG. 27D. The housing 204 has a top housing 232, a bottom housing 234, and a lower smart card housing 236, which attaches to the bottom housing 234 in a sliding dovetail arrangement. The lower smart card housing 236 covers the assembly screws.

The memory card is received in a mating connector carried by a memory card housing 238 on a circuit board 240. The circuitry can be identical or similar to that shown in and described in relation FIGS. 25A–25C, FIG. 26, or FIGS. 29Aa and 29Ab. The memory card can be similar to that disclosed in FIGS. 24A and 24B, or FIGS. 29Ba and 29Bb.

Wherein the display system in FIGS. 27A–27D has no wireless receiver to receive information, FIGS. 28A–28D is a portable pager/display system 300. Similar to the previous embodiment, the portable pager/display system 300 has a display viewing area 302 within a housing 304. The viewing area 302 has a lens 306 through which the user views a microdisplay as described previously. The microdisplay magnification can be adjusted using a knob 308 located on top of the housing 304.

The portable pager display system 300 receives the information for the image to display on the microdisplay from either a smart card 210 shown in phantom, which can be inserted in to a slot 312 in the housing 304 of the portable pager/display system 300 or a memory card 214, shown in phantom which is inserted in to a second slot 316 in the housing.

The portable pager/display system 300 has a five way selection switch 318 located on top of the housing 304 in proximity to the magnification knob 308. The four outer buttons 350 allow movement of a cursor on the microdisplay and the center button 352 for selecting an item. The user can select information from menu on the microdisplay. The information that is selected can be transmitted wirelessly. The system 300 is turned on and off with a switch 320 accessible through an opening on the housing.

The portable pager/display system 300 has a set of speakers 354 on the front face. The sound, similar to the image, can come from three sources, the smart card 210, the memory card 214 or by wireless transmission. The user could view and listen to a video clip stored on a memory card or smart card. Depending on the transmission rate, the sound received by the wireless transceiver located in the housing could be heard real time or if the transceiver transmits at a slower rate, the sound can be store in memory in the portable pager/display system 300 and played back to the user at a faster rate.

While a smart cart and a memory card are shown, an alternative embodiment can include miniature CD ROMs, or other insertable storage medium.

In addition to inputting data and commanding the portable pager/display system using the five way selection switch 318 and the microdisplay as a virtual keyboard, the portable pager display system has a microphone, accessible through opening 356 in the housing 304, for use with voice commands, recording on the memory card or other insertable storage medium or for transmission wirelessly.

The portable pager/display system 300 has an infrared transceiver 358. The infrared transceiver 358 can be used to transmit information between the portable pager/display system 300 and a computer with a similar infrared transceiver. The infrared transceiver 358 can also be used with a wireless keyboard having a mouse track point joy stick and a pair of mouse buttons. The keyboard is capable of folding such that its thickness is less than 15 millimeters. The keyboard can have a touch pad on one side for taking notes or drawing inputs. It is recognized that the infrared transceiver can be used for a wireless headset in place of the speakers.

Figure 28A:
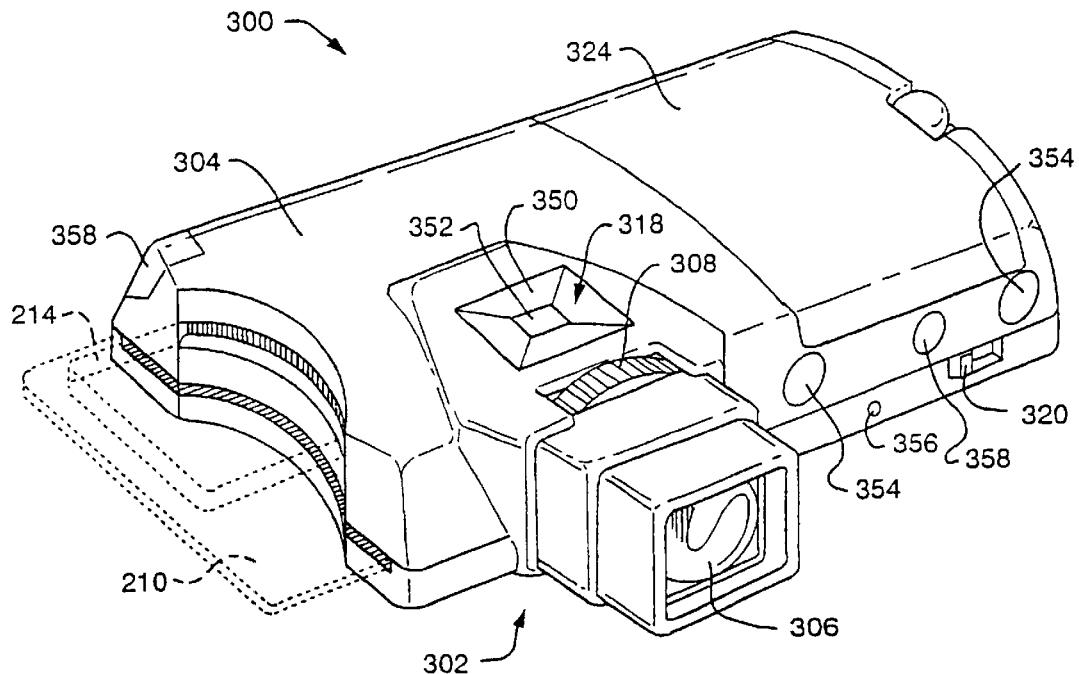
FIG. 28A is a perspective view of a portable display system.
Figure 28B:
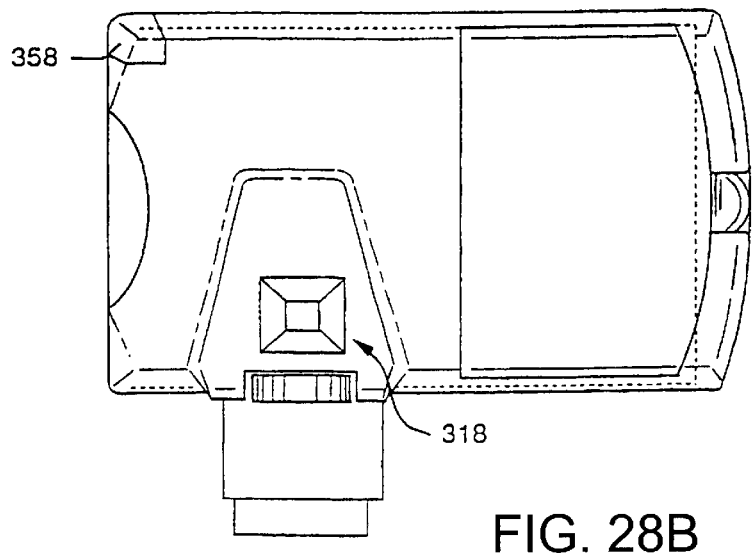
FIG. 28B is a top view of the portable display system.
Figure 28C:
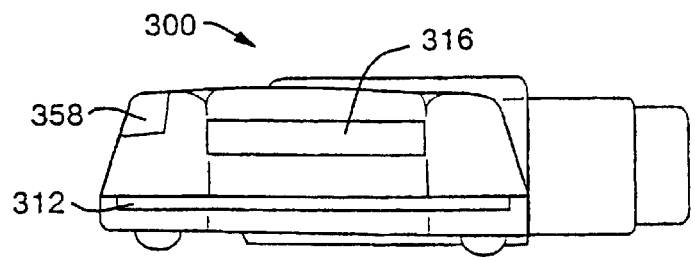
FIG. 28C is a side view of the portable display system.
Figure 28D:
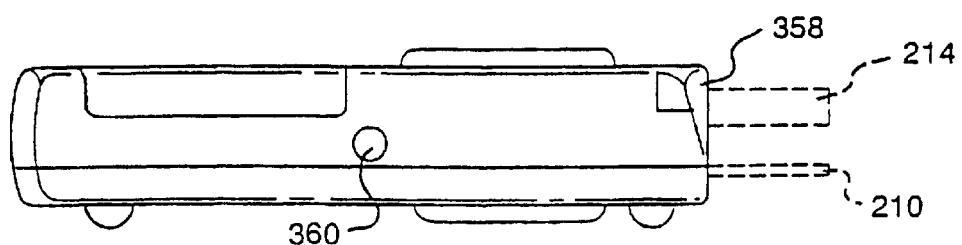
FIG. 28D is a back view of the portable display system.

The portable pager/display system 300 has a camera system with a pair of CCD cameras 358 and 360. One of the cameras 358 is on the front face such that it is aimed at the user when the user holds the system 300 to view the microdisplay. The other camera 360 is located on the back face as illustrated in FIG. 28D. The user can use this camera to take a picture of notes, an object, a building or other item that the user wants to store in memory or transmit.

The portable pager/display system 300 can be used to play games in addition to being used to play video clips and music. A television and/or radio receiver can also be added to the portable pager / display system. The portable pager/display system is slightly larger than the portable display system and has a volume of less than 330 cm³ and in a preferred embodiment a volume of approximately 250 cm³.

Figure 29A:
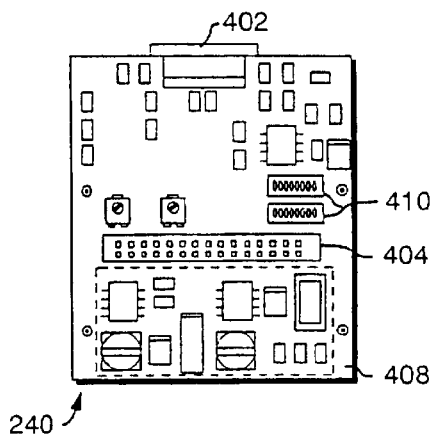
FIG. 29Aa illustrates a top view of a circuit board for the portable display system of FIGS. 27A–27D.
Figure 29A:
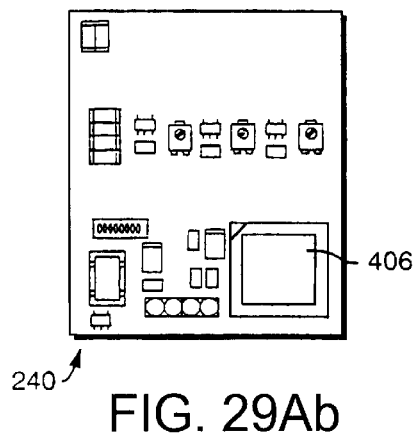

The circuit board 240 for the portable display system 300 of FIGS. 27A–27D is shown in FIGS. 29Aa and 29Ab. The circuit board has a display connector 402 to connect the microdisplay, a mating connector 404 for receiving the memory card, a programable logic device (PLD) 406, a power supply 408, and a digital to analog converter 410.

Figure 29B:
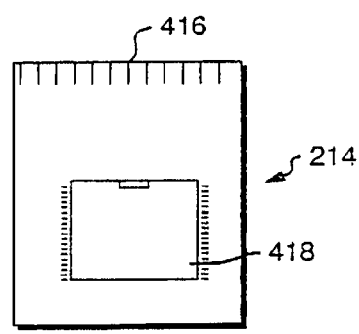
FIG. 29Ba illustrates a top view of a memory card.
Figure 29B:
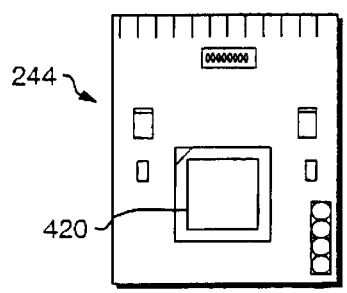

FIGS. 29Ba and 29Bb shows the memory card 214. The card has a thirty pin connector 416 for connecting to the mating connector 404 of the circuit board 240 of FIGS. 28Aa. The card has a complex programable logic device (CPLD) 418, and a memory chip 420. The memory card can operate at above 15 MHz for video.

Figure 29C:
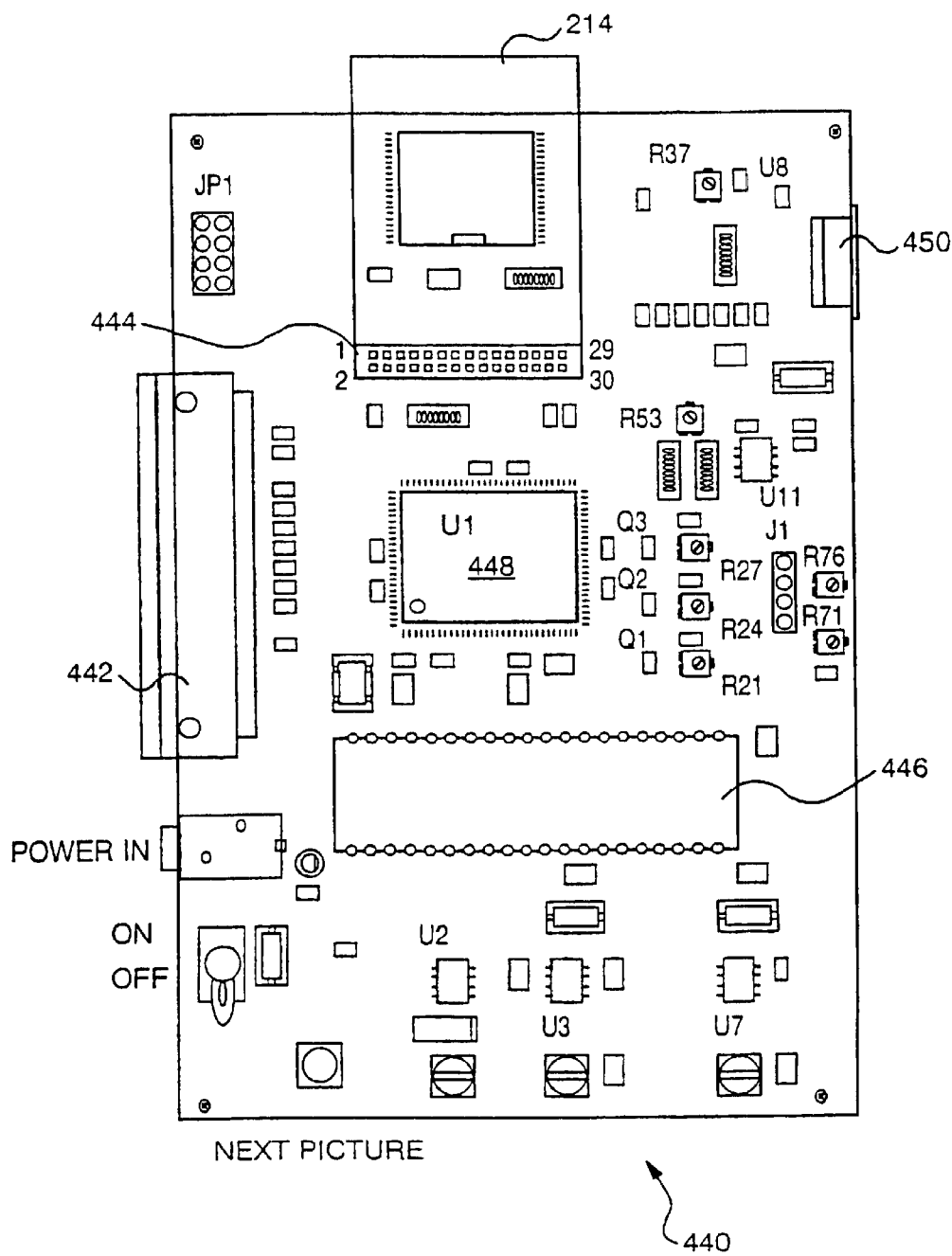
FIG. 29C illustrates the layout of a memory card programer.

While the memory chip can be written to in the portable pager/display system 300 as shown in FIGS. 28A–28D, the memory card 214 can also be written to directly from a personnel computer. FIG. 29C illustrates the interface board 440 between the memory card 214 and the personnel computer. The personnel computer is connected using a parallel interface port 442. The memory card 214 is connected at a mating connector 444 similar to that shown in FIG. 29Ab. The interface board 440 in addition has a microprocessor 446 for reading the data from the computer into the memory card 214. A complex programmable logic device (CPLD) 448 is used to address memory out of the memory card.

In addition to programming the memory card 214, the interface board 440 can be used to view the images on the memory card 214 with an optional microdisplay connected at connector 450.

Equivalents

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A portable display system comprising:
   a housing having a volume of less than 300 cm³;
   a color sequential liquid crystal display mounted to the housing, the color sequential liquid crystal display including an array of pixel electrodes in a first plane, and a counter electrode panel extending ina second plane that is parallel to the first plane;
   a light source positioned within the housing to illuminate the array of pixel electrodes;
   a lens that focuses an image on the display for viewing by a user;
   an audio transducer device mounted to the housing that generates an audio sound;
   a memory card reader positioned within the housing that receives input to be displayed on the display from a memory card that docks with the card reader; and
   a display circuit that generates images from the input to be displayed on the liquid crystal display and connected to the liquid crystal display, the counter electrode panel receiving an applied voltage such that the display circuit actuates the pixel electrodes to write an image, flashes the light source to illuminate the image, and switches the applied voltage to the counter electrode to erase the image.

2. The portable display system of claim 1 wherein the audio device is an acoustic speaker mounted to the housing.

3. The portable display system of claim 1 wherein the audio device is a headset that connects to the housing.

4. The system of claim 1 wherein the display is an active matrix liquid crystal display including an array of at least 75,000 pixel electrodes, and the light source is a light emitting diode device that illuminates the array of pixel electrodes.

5. The system of claim 4 wherein the array of pixel electrodes comprises an array of at least 320×240.

6. The system of claim 4 wherein the array of pixel electrodes comprises an array of at least 640×480.

7. The system of claim 4 wherein the active matrix liquid crystal display further comprises an array of transistor circuits formed with single crystal silicon, the array of transistor circuits being bonded to an optically transmissive substrate with an adhesive layer.

8. The system of claim 1 wherein the housing has a volume of less than 250 cm³.

9. The system of claim 8 wherein the housing has a volume of less than 165 cm³.

10. A portable display system comprising:
    a housing;
    a liquid crystal display mounted to the housing, the liquid crystal display including an array of pixel electrodes in a first plane, and a counter electrode panel extending in a second plane that is parallel to the first plane;
    a light source positioned within the housing to illuminate the array of pixel electrodes;
    a lens that focuses an image on the display for viewing by a user;
    an audio transducer device mounted to the housing that generates an audio sound;
    a memory card reader operating at least at 15 MHZ positioned within the housing that receives video input to be displayed on the display from a memory card that docks with the card reader; and
    a display circuit that generates images from the input to be displayed on the liquid crystal display and connected to the liquid crystal display, the counter electrode panel receiving an applied voltage such that the display circuit actuates the pixel electrodes to write an image, flashes the light source to illuminate the image, and switches the applied voltage to the counter electrode to erase the image.

11. The portable display system of claim 10 wherein the audio transducer device is an acoustic speaker mounted to the housing.

12. The portable display system of claim 10 further comprising a battery within the housing.

13. The system of claim 10 wherein the display is an active matrix liquid crystal display including an array of at least 75,000 pixel electrodes, and the light source is a light emitting diode device that illuminates the array of pixel electrodes.

14. The system of claim 10 wherein the card reader operates at least at 20 MHz.

15. The system of claim 13 wherein the array of pixel electrodes comprises an array of at least 640×480.

16. The system of claim 13 wherein the active matrix liquid crystal display further comprises an array of transistor circuits formed with single crystal silicon on an insulating layer, the array of transistor circuits being bonded to an optically transmissive substrate with an adhesive layer.

17. The system of claim 10 wherein the housing has a volume of less than 330 cm³.

18. A portable display system comprising:

a housing;

a liquid crystal display mounted to the housing, the liquid crystal display including an array of pixel electrodes in a first plane, and a counter electrode panel extending in a second plane that is parallel to the first plane;

a light source positioned within the housing to illuminate the array of pixel electrodes;

a liquid crystal sensor that measures a property of the liquid crystal;

a heater connected to the sensor and thermally coupled to the liquid crystal display;

a lens that focuses an image on the display for viewing by a user;

an audio transducer device mounted to the housing that generates an audio sound;

a memory card reader within the housing that receives input to be displayed on the display from a memory card that docks with the card reader; and a display circuit that generates images from the input to be displayed on the, liquid crystal display and connected to the liquid crystal display, the counter electrode panel receiving an applied voltage such that the display circuit actuates the pixel electrodes to write an image, flashes the light source to illuminate the image, and switches the applied voltage to the counter electrode to erase the image.

19. The portable display system of claim 18 wherein the liquid crystal sensor comprises a sensor circuit including a plurality of pixels that measures a capacitance of the liquid crystal.

20. The portable display system of claim 1 wherein the display circuit includes a switch that switches the setting of a common voltage that enters the display.

21. The portable display system of claim 20 wherein the display circuit includes a timing circuit that controls the switch.

22. The portable display system of claim 20 wherein at a first setting of the common voltage the image is presented on the display, and at a second setting the image is erased.

23. The portable display system of claim 10 wherein the display circuit includes a switch that switches the setting of a common voltage that enters the display.

24. The portable display system of claim 23 wherein the display circuit includes a timing circuit that controls the switch.

25. The portable display system of claim 23 wherein at a first setting of the common voltage the image is presented on the display, and at a second setting the image is erased.

26. The portable display system of claim 18 wherein the display circuit includes a switch that switches the setting of a common voltage that enters the display.

27. The portable display system of claim 26 wherein the display circuit includes a timing circuit that controls the switch.

28. The portable display system of claim 26 wherein at a first setting of the common voltage the image is presented on the display, and at a second setting the image is erased.

29. The portable display of claim 1 wherein the liquid crystal display has an active area of less than 158 mm$^2$.

30. The portable display of claim 10 wherein the liquid crystal display has an active area of less than 158 mm$^2$.

31. The portable display of claim 18 wherein the liquid crystal display has an active area of less than 158 mm$^2$.

* * * * *